US012193124B2

(12) United States Patent
Zhu et al.

(10) Patent No.: US 12,193,124 B2
(45) **Date of Patent: *Jan. 7, 2025**

(54) SYSTEMS AND METHODS FOR BLEEDER CONTROL RELATED TO TRIAC DIMMERS ASSOCIATED WITH LED LIGHTING

(71) Applicant: ON-BRIGHT ELECTRONICS (SHANGHAI) CO., LTD., Shanghai (CN)

(72) Inventors: Liqiang Zhu, Shanghai (CN); Jun Zhou, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,474

(22) Filed: Sep. 5, 2023

(65) Prior Publication Data

US 2024/0147591 A1 May 2, 2024

Related U.S. Application Data

(63) Continuation of application No. 17/578,706, filed on Jan. 19, 2022, now Pat. No. 11,792,901, which is a (Continued)

(30) Foreign Application Priority Data

Aug. 6, 2019 (CN) ........................ 201910719931.X

(51) Int. Cl.
*H05B 45/39* (2020.01)
*H05B 45/3575* (2020.01)
*H05B 45/397* (2020.01)

(52) U.S. Cl.
CPC ....... *H05B 45/397* (2020.01); *H05B 45/3575* (2020.01)

(58) Field of Classification Search
CPC ........ H05B 45/37; H05B 45/44; H05B 45/46; H05B 45/50; H05B 45/395; H05B 45/3575
See application file for complete search history.

(56) References Cited

U.S. PATENT DOCUMENTS 3,803,452 A 4/1974 Goldschmied
3,899,713 A 8/1975 Barkan et al.
(Continued)

FOREIGN PATENT DOCUMENTS

CN 1448005 A 10/2003
CN 101040570 A 9/2007
(Continued)

OTHER PUBLICATIONS

China Patent Office, Notice of Allowance mailed Sep. 1, 2021, in Application No. 201911371960.8.
(Continued)

*Primary Examiner* — Tung X Le
(74) *Attorney, Agent, or Firm* — Faegre Drinker Biddle & Reath LLP

(57) ABSTRACT

System and method for controlling one or more light emitting diodes. For example, the system includes: a current regulator including a first regulator terminal and a second regulator terminal, the first regulator terminal being configured to receive a diode current flowing through the one or more light emitting diodes, the current regulator being configured to generate a sensing signal representing the diode current, the second regulator terminal being configured to output the sensing signal; a bleeder controller including a first controller terminal and a second controller terminal, the first controller terminal being configured to receive the sensing signal from the second regulator terminal, the bleeder controller being configured to generate a first bleeder control signal based at least in part on the sensing
(Continued)

signal, the second controller terminal being configured to output the first bleeder control signal.

20 Claims, 15 Drawing Sheets

Related U.S. Application Data continuation of application No. 16/944,665, filed on Jul. 31, 2020, now Pat. No. 11,297,704.

(56) References Cited

U.S. PATENT DOCUMENTS 4,253,045 A 2/1981 Weber
5,144,205 A 9/1992 Motto et al.
5,249,298 A 9/1993 Bolan et al.
5,504,398 A 4/1996 Rothenbuhler
5,949,197 A 9/1999 Kastner
6,196,208 B1 3/2001 Masters
6,218,788 B1 4/2001 Chen et al.
6,229,271 B1 5/2001 Liu
6,278,245 B1 8/2001 Li et al.
7,038,399 B2 5/2006 Lys et al.
7,649,327 B2 1/2010 Peng
7,759,881 B1 7/2010 Melanson
7,825,715 B1 11/2010 Greenberg
7,880,400 B2 2/2011 Zhou et al.
7,944,153 B2 5/2011 Greenfeld
8,018,171 B1 9/2011 Melanson et al.
8,098,021 B2 1/2012 Wang et al.
8,129,976 B2 3/2012 Blakeley
8,134,302 B2 3/2012 Yang et al.
8,278,832 B2 10/2012 Hung et al.
8,373,313 B2 2/2013 Garcia et al.
8,378,583 B2 2/2013 Hying et al.
8,378,588 B2 2/2013 Kuo et al.
8,378,589 B2 2/2013 Kuo et al.
8,415,901 B2 4/2013 Recker et al.
8,432,438 B2 4/2013 Ryan et al.
8,497,637 B2 7/2013 Liu
8,558,477 B2 10/2013 Bordin et al.
8,569,956 B2 10/2013 Shteynberg et al.
8,644,041 B2 2/2014 Pansier
8,653,750 B2 2/2014 Deurenberg et al.
8,686,668 B2 4/2014 Grotkowski et al.
8,698,407 B1 4/2014 Chen et al.
8,698,419 B2 4/2014 Yan et al.
8,716,882 B2 5/2014 Pettler et al.
8,742,674 B2 6/2014 Shteynberg et al.
8,829,819 B1 9/2014 Angeles et al.
8,890,440 B2 11/2014 Yan et al.
8,896,288 B2 11/2014 Choi et al.
8,941,323 B1 1/2015 Wu et al.
8,941,324 B2 1/2015 Zhou et al.
8,941,328 B2 1/2015 Wu et al.
8,947,010 B2 2/2015 Barrow et al.
9,030,122 B2 5/2015 Yan et al.
9,084,316 B2 7/2015 Melanson et al.
9,131,581 B1 9/2015 Hsia et al.
9,148,050 B2 9/2015 Chiang
9,167,638 B2 10/2015 Le
9,173,258 B2 10/2015 Ekbote
9,207,265 B1 12/2015 Grisamore et al.
9,220,133 B2 12/2015 Salvestrini et al.
9,220,136 B2 12/2015 Zhang et al.
9,247,623 B2 1/2016 Recker et al.
9,247,625 B2 1/2016 Recker et al.
9,301,349 B2 3/2016 Zhu et al.
9,332,609 B1 5/2016 Rhodes et al.
9,402,293 B2 7/2016 Vaughan et al.
9,408,269 B2 8/2016 Zhu et al.
9,414,455 B2 8/2016 Zhou et al.
9,467,137 B2 10/2016 Eum et al.
9,480,118 B2 10/2016 Liao et al.
9,485,833 B2 11/2016 Datta et al.
9,554,432 B2 1/2017 Zhu et al.
9,572,224 B2 2/2017 Gaknoki et al.
9,585,222 B2 2/2017 Zhu et al.
9,655,188 B1 5/2017 Lewis et al.
9,661,702 B2 5/2017 Mednik et al.
9,723,676 B2 8/2017 Ganick et al.
9,750,107 B2 8/2017 Zhu et al.
9,781,786 B2 10/2017 Ho et al.
9,820,344 B1 11/2017 Papanicolaou
9,883,561 B1 1/2018 Liang et al.
9,883,562 B2 1/2018 Zhu et al.
9,961,734 B2 5/2018 Zhu et al.
10,054,271 B2 8/2018 Xiong et al.
10,143,051 B2 * 11/2018 Liu ........................ H05B 45/10
10,153,684 B2 12/2018 Liu et al.
10,194,500 B2 1/2019 Zhu et al.
10,264,642 B2 4/2019 Liang et al.
10,292,217 B2 5/2019 Zhu et al.
10,299,328 B2 5/2019 Fu et al.
10,334,677 B2 6/2019 Zhu et al.
10,342,087 B2 7/2019 Zhu et al.
10,362,643 B2 7/2019 Kim et al.
10,375,785 B2 8/2019 Li et al.
10,383,187 B2 8/2019 Liao et al.
10,405,392 B1 * 9/2019 Shi .................... H05B 45/3575
10,447,171 B2 10/2019 Newman et al.
10,448,469 B2 10/2019 Zhu et al.
10,448,470 B2 10/2019 Zhu et al.
10,455,657 B2 10/2019 Zhu et al.
10,499,467 B2 12/2019 Wang
10,512,131 B2 12/2019 Zhu et al.
10,530,268 B2 1/2020 Newman et al.
10,531,534 B1 1/2020 Zhou
10,568,185 B1 2/2020 Ostrovsky et al.
10,616,975 B2 4/2020 Gotou et al.
10,687,397 B2 6/2020 Zhu et al.
10,785,837 B2 9/2020 Li et al.
10,827,588 B2 11/2020 Zhu et al.
10,973,095 B2 4/2021 Zhu et al.
10,999,903 B2 5/2021 Li et al.
10,999,904 B2 5/2021 Zhu et al.
11,026,304 B2 6/2021 Li et al.
11,183,996 B2 11/2021 Zhu et al.
11,201,612 B2 12/2021 Zhu et al.
11,206,015 B2 12/2021 Zhu et al.
11,212,885 B2 12/2021 Liao et al.
11,224,105 B2 1/2022 Yang et al.
11,252,799 B2 2/2022 Li et al.
11,297,704 B2 4/2022 Zhu et al.
11,405,992 B2 8/2022 Li et al.
11,564,299 B2 1/2023 Li et al.
11,570,859 B2 1/2023 Zhu et al.
11,638,335 B2 4/2023 Zhu et al.
11,678,417 B2 6/2023 Yang et al.
11,695,401 B2 7/2023 Zhu et al.
11,723,128 B2 8/2023 Li et al.
11,743,984 B2 8/2023 Li et al.
11,784,638 B2 10/2023 Zhu et al.
11,792,901 B2 10/2023 Zhu et al.
11,856,670 B2 12/2023 Li et al.
11,937,350 B2 3/2024 Zhu et al.
2006/0022648 A1 2/2006 Ben-Yaakov et al.
2007/0182338 A1 8/2007 Shteynberg et al.
2007/0182699 A1 8/2007 Ha et al.
2007/0267978 A1 11/2007 Shteynberg et al.
2008/0224629 A1 9/2008 Melanson
2008/0224633 A1 9/2008 Melanson et al.
2008/0278092 A1 11/2008 Lys et al.
2009/0021469 A1 1/2009 Yeo et al.
2009/0085494 A1 4/2009 Summerland
2009/0251059 A1 10/2009 Veltman
2010/0141153 A1 6/2010 Recker et al.
2010/0148691 A1 6/2010 Kuo et al.
2010/0156319 A1 6/2010 Melanson
2010/0164406 A1 7/2010 Kost et al.
2010/0176733 A1 7/2010 King
2010/0207536 A1 8/2010 Burdalski et al.
2010/0213859 A1 8/2010 Shteynberg et al.
2010/0219766 A1 9/2010 Kuo et al.

(56) References Cited

U.S. PATENT DOCUMENTS

2010/0231136 A1 9/2010 Reisenauer et al.
2011/0012530 A1 1/2011 Zheng et al.
2011/0037399 A1 2/2011 Hung et al.
2011/0074302 A1 3/2011 Draper et al.
2011/0080110 A1 4/2011 Nuhfer et al.
2011/0080111 A1 4/2011 Nuhfer et al.
2011/0080112 A1 4/2011 Shearer et al.
2011/0101867 A1 5/2011 Wang et al.
2011/0121744 A1 5/2011 Salvestrini et al.
2011/0121754 A1 5/2011 Shteynberg et al.
2011/0133662 A1 6/2011 Yan et al.
2011/0140620 A1 6/2011 Lin et al.
2011/0140621 A1 6/2011 Yi et al.
2011/0187283 A1 8/2011 Wang et al.
2011/0227490 A1 9/2011 Huynh
2011/0260619 A1 10/2011 Sadwick et al.
2011/0285301 A1 11/2011 Kuang et al.
2011/0291583 A1 12/2011 Shen
2011/0309759 A1 12/2011 Shteynberg et al.
2012/0001548 A1 1/2012 Recker et al.
2012/0032604 A1 2/2012 Hontele
2012/0056553 A1 3/2012 Koolen et al.
2012/0069616 A1 3/2012 Kitamura et al.
2012/0080944 A1 4/2012 Recker et al.
2012/0081009 A1 4/2012 Shteynberg et al.
2012/0081032 A1 4/2012 Huang
2012/0081035 A1 4/2012 McCune, Jr.
2012/0146526 A1 6/2012 Lam et al.
2012/0181944 A1 7/2012 Jacobs et al.
2012/0181946 A1 7/2012 Melanson
2012/0187857 A1 7/2012 Ulmann et al.
2012/0242237 A1 9/2012 Chen et al.
2012/0242238 A1* 9/2012 Chen .................. H05B 45/3725
315/200 R
2012/0262093 A1 10/2012 Recker et al.
2012/0268031 A1 10/2012 Zhou et al.
2012/0274227 A1 11/2012 Zheng et al.
2012/0286663 A1 11/2012 Puvanakijjakorn et al.
2012/0286679 A1 11/2012 Liu
2012/0299500 A1 11/2012 Sadwick et al.
2012/0299501 A1 11/2012 Kost et al.
2012/0299511 A1 11/2012 Montante et al.
2012/0319604 A1 12/2012 Walters
2012/0326616 A1 12/2012 Sumitani et al.
2013/0009561 A1 1/2013 Briggs
2013/0020965 A1 1/2013 Kang et al.
2013/0026942 A1 1/2013 Ryan et al.
2013/0026945 A1 1/2013 Ganick et al.
2013/0027528 A1 1/2013 Staats et al.
2013/0034172 A1 2/2013 Pettler et al.
2013/0043726 A1 2/2013 Krishnamoorthy et al.
2013/0049631 A1 2/2013 Riesebosch
2013/0063047 A1 3/2013 Veskovic
2013/0134904 A1 5/2013 Yau et al.
2013/0141001 A1 6/2013 Datta et al.
2013/0154487 A1 6/2013 Kuang et al.
2013/0162155 A1 6/2013 Matsuda et al.
2013/0162158 A1 6/2013 Pollischansky
2013/0169177 A1 7/2013 Liao et al.
2013/0175931 A1 7/2013 Sadwick
2013/0181630 A1 7/2013 Taipale et al.
2013/0187568 A1 7/2013 Jelaca et al.
2013/0193866 A1 8/2013 Datta et al.
2013/0193879 A1 8/2013 Sadwick et al.
2013/0194848 A1 8/2013 Bernardinis et al.
2013/0215655 A1 8/2013 Yang et al.
2013/0223107 A1 8/2013 Zhang et al.
2013/0229121 A1 9/2013 Otake et al.
2013/0241427 A1 9/2013 Kesterson et al.
2013/0241428 A1 9/2013 Takeda
2013/0241441 A1 9/2013 Myers et al.
2013/0242622 A1 9/2013 Peng et al.
2013/0249431 A1 9/2013 Shteynberg et al.
2013/0278159 A1 10/2013 Del et al.
2013/0307430 A1 11/2013 Blom
2013/0307431 A1 11/2013 Zhu et al.
2013/0307434 A1 11/2013 Zhang et al.
2013/0342127 A1 12/2013 Pan et al.
2013/0343090 A1 12/2013 Eom et al.
2014/0009082 A1 1/2014 King et al.
2014/0029315 A1 1/2014 Zhang et al.
2014/0049177 A1 2/2014 Kulczycki et al.
2014/0063857 A1 3/2014 Peng et al.
2014/0078790 A1 3/2014 Lin et al.
2014/0103829 A1 4/2014 Kang
2014/0132172 A1 5/2014 Zhu et al.
2014/0160809 A1 6/2014 Lin et al.
2014/0176016 A1 6/2014 Li et al.
2014/0177280 A1 6/2014 Yang et al.
2014/0197760 A1 7/2014 Radermacher
2014/0265898 A1 9/2014 Del et al.
2014/0265907 A1 9/2014 Su et al.
2014/0265935 A1 9/2014 Sadwick et al.
2014/0268935 A1 9/2014 Chiang
2014/0300274 A1 10/2014 Acatrinei
2014/0320031 A1 10/2014 Wu et al.
2014/0333228 A1 11/2014 Angeles et al.
2014/0346973 A1 11/2014 Zhu et al.
2014/0354157 A1 12/2014 Morales
2014/0354165 A1 12/2014 Malyna et al.
2014/0354170 A1 12/2014 Gredler et al.
2015/0015159 A1 1/2015 Wang et al.
2015/0035450 A1 2/2015 Werner
2015/0048757 A1 2/2015 Boonen et al.
2015/0062981 A1 3/2015 Fang et al.
2015/0077009 A1 3/2015 Kunimatsu
2015/0091470 A1 4/2015 Zhou et al.
2015/0137704 A1 5/2015 Angeles et al.
2015/0173140 A1 6/2015 Wu et al.
2015/0312978 A1 10/2015 Vaughan et al.
2015/0312982 A1 10/2015 Melanson
2015/0312988 A1 10/2015 Liao et al.
2015/0318789 A1 11/2015 Yang et al.
2015/0333764 A1 11/2015 Pastore et al.
2015/0357910 A1 12/2015 Murakami et al.
2015/0359054 A1 12/2015 Lin et al.
2015/0366010 A1 12/2015 Mao et al.
2015/0382424 A1 12/2015 Knapp et al.
2016/0014861 A1 1/2016 Zhu et al.
2016/0014865 A1 1/2016 Zhu et al.
2016/0037604 A1 2/2016 Zhu et al.
2016/0113077 A1 4/2016 Akiyama
2016/0119998 A1 4/2016 Linnartz et al.
2016/0128142 A1 5/2016 Arulandu et al.
2016/0134187 A1 5/2016 Pregitzer et al.
2016/0277411 A1 9/2016 Dani et al.
2016/0286617 A1 9/2016 Takahashi et al.
2016/0323957 A1 11/2016 Hu et al.
2016/0338163 A1 11/2016 Zhu et al.
2017/0006684 A1 1/2017 Tu et al.
2017/0027029 A1 1/2017 Hu et al.
2017/0055323 A1 2/2017 Lim et al.
2017/0064787 A1 3/2017 Liao et al.
2017/0099712 A1 4/2017 Hilgers et al.
2017/0181235 A1 6/2017 Zhu et al.
2017/0196063 A1 7/2017 Zhu et al.
2017/0251532 A1 8/2017 Wang et al.
2017/0311409 A1 10/2017 Zhu et al.
2017/0354008 A1 12/2017 Eum et al.
2017/0359880 A1 12/2017 Zhu et al.
2018/0035507 A1 2/2018 Kumada et al.
2018/0103520 A1 4/2018 Zhu et al.
2018/0110104 A1 4/2018 Liang et al.
2018/0115234 A1 4/2018 Liu et al.
2018/0139816 A1* 5/2018 Liu .................... H05B 45/3575
2018/0263089 A1 9/2018 Seyler et al.
2018/0288845 A1 10/2018 Zhu et al.
2018/0310376 A1 10/2018 Huang et al.
2019/0069364 A1 2/2019 Zhu et al.
2019/0069366 A1 2/2019 Liao et al.
2019/0082507 A1 3/2019 Zhu et al.
2019/0104583 A1 4/2019 Konishi et al.
2019/0124736 A1 4/2019 Zhu et al.
2019/0166667 A1 5/2019 Li et al.

(56) References Cited

U.S. PATENT DOCUMENTS

| | | | | |
|---|---|---|---|---|
| 2019/0230755 | A1 | 7/2019 | Zhu et al. | |
| 2019/0327810 | A1 | 10/2019 | Zhu et al. | |
| 2019/0350055 | A1 | 11/2019 | Wu et al. | |
| 2019/0350060 | A1 | 11/2019 | Li et al. | |
| 2019/0364628 | A1* | 11/2019 | Chen | H05B 45/31 |
| 2019/0380183 | A1 | 12/2019 | Li et al. | |
| 2020/0100340 | A1 | 3/2020 | Zhu et al. | |
| 2020/0146121 | A1 | 5/2020 | Zhu et al. | |
| 2020/0205263 | A1 | 6/2020 | Zhu et al. | |
| 2020/0205264 | A1 | 6/2020 | Zhu et al. | |
| 2020/0267817 | A1 | 8/2020 | Yang et al. | |
| 2020/0305247 | A1 | 9/2020 | Li et al. | |
| 2020/0375001 | A1 | 11/2020 | Jung et al. | |
| 2021/0007195 | A1 | 1/2021 | Zhu et al. | |
| 2021/0007196 | A1 | 1/2021 | Zhu et al. | |
| 2021/0045213 | A1 | 2/2021 | Zhu et al. | |
| 2021/0153313 | A1 | 5/2021 | Li et al. | |
| 2021/0195709 | A1 | 6/2021 | Li et al. | |
| 2021/0204375 | A1 | 7/2021 | Li et al. | |
| 2022/0038085 | A1 | 2/2022 | Zhu et al. | |
| 2022/0149829 | A1 | 5/2022 | Zhu et al. | |
| 2022/0209762 | A1 | 6/2022 | Zhu et al. | |
| 2022/0210880 | A1 | 6/2022 | Li et al. | |
| 2022/0217824 | A1 | 7/2022 | Zhu et al. | |
| 2022/0225480 | A1 | 7/2022 | Li et al. | |
| 2022/0225483 | A1 | 7/2022 | Yang et al. | |
| 2023/0180360 | A1 | 6/2023 | Zhu et al. | |
| 2023/0225028 | A1 | 7/2023 | Li et al. | |
| 2024/0008151 | A1 | 1/2024 | Li et al. | |
| 2024/0049371 | A1 | 2/2024 | Li et al. | |
| 2024/0097665 | A1 | 3/2024 | Zhu et al. | |

FOREIGN PATENT DOCUMENTS

| | | | |
|---|---|---|---|
| CN | 101657057 | A | 2/2010 |
| CN | 101868090 | A | 10/2010 |
| CN | 101896022 | A | 11/2010 |
| CN | 101917804 | A | 12/2010 |
| CN | 101938865 | A | 1/2011 |
| CN | 101998734 | A | 3/2011 |
| CN | 102014540 | A | 4/2011 |
| CN | 102014551 | A | 4/2011 |
| CN | 102056378 | A | 5/2011 |
| CN | 102209412 | A | 10/2011 |
| CN | 102300375 | A | 12/2011 |
| CN | 102347607 | A | 2/2012 |
| CN | 102387634 | A | 3/2012 |
| CN | 102474953 | A | 5/2012 |
| CN | 102497706 | A | 6/2012 |
| CN | 102612194 | A | 7/2012 |
| CN | 202353859 | U | 7/2012 |
| CN | 102668717 | A | 9/2012 |
| CN | 102695330 | A | 9/2012 |
| CN | 102791056 | A | 11/2012 |
| CN | 102843836 | A | 12/2012 |
| CN | 202632722 | U | 12/2012 |
| CN | 102870497 | A | 1/2013 |
| CN | 102946674 | A | 2/2013 |
| CN | 103004290 | A | 3/2013 |
| CN | 103024994 | A | 4/2013 |
| CN | 103096606 | A | 5/2013 |
| CN | 103108470 | A | 5/2013 |
| CN | 103260302 | A | 8/2013 |
| CN | 103313472 | A | 9/2013 |
| CN | 103369802 | A | 10/2013 |
| CN | 103379712 | A | 10/2013 |
| CN | 103428953 | A | 12/2013 |
| CN | 103458579 | A | 12/2013 |
| CN | 103547014 | A | 1/2014 |
| CN | 103648219 | A | 3/2014 |
| CN | 103716934 | A | 4/2014 |
| CN | 103781229 | A | 5/2014 |
| CN | 103858524 | A | 6/2014 |
| CN | 203675408 | U | 6/2014 |
| CN | 103945614 | A | 7/2014 |
| CN | 103957634 | A | 7/2014 |
| CN | 104066254 | A | 9/2014 |
| CN | 104619077 | A | 5/2015 |
| CN | 204392621 | U | 6/2015 |
| CN | 104768265 | A | 7/2015 |
| CN | 104902653 | A | 9/2015 |
| CN | 105072742 | A | 11/2015 |
| CN | 105246218 | A | 1/2016 |
| CN | 105265019 | A | 1/2016 |
| CN | 105423140 | A | 3/2016 |
| CN | 105591553 | A | 5/2016 |
| CN | 105873269 | A | 8/2016 |
| CN | 105992440 | A | 10/2016 |
| CN | 106105395 | A | 11/2016 |
| CN | 106163009 | A | 11/2016 |
| CN | 205812458 | U | 12/2016 |
| CN | 106332374 | A | 1/2017 |
| CN | 106332390 | A | 1/2017 |
| CN | 106358337 | A | 1/2017 |
| CN | 106413189 | A | 2/2017 |
| CN | 206042434 | U | 3/2017 |
| CN | 106604460 | A | 4/2017 |
| CN | 106793246 | A | 5/2017 |
| CN | 106888524 | A | 6/2017 |
| CN | 106912144 | A | 6/2017 |
| CN | 107046751 | A | 8/2017 |
| CN | 107069726 | A | 8/2017 |
| CN | 107645804 | A | 1/2018 |
| CN | 107995747 | A | 5/2018 |
| CN | 107995750 | A | 5/2018 |
| CN | 207460551 | U | 6/2018 |
| CN | 108337764 | A | 7/2018 |
| CN | 108366460 | A | 8/2018 |
| CN | 207744191 | U | 8/2018 |
| CN | 207910676 | U | 9/2018 |
| CN | 108834259 | A | 11/2018 |
| CN | 109246885 | A | 1/2019 |
| CN | 208572500 | U | 3/2019 |
| CN | 109729621 | A | 5/2019 |
| CN | 110086362 | A | 8/2019 |
| CN | 110099495 | A | 8/2019 |
| CN | 110493913 | A | 11/2019 |
| EP | 2403318 | A1 | 1/2012 |
| EP | 2590477 | A1 | 5/2013 |
| EP | 2938164 | A2 | 10/2015 |
| JP | 2008-010152 | A | 1/2008 |
| JP | 2011-249328 | A | 12/2011 |
| TW | 201125441 | A | 7/2011 |
| TW | 201132241 | A | 9/2011 |
| TW | 201143501 | A | 12/2011 |
| TW | 201143530 | A | 12/2011 |
| TW | 201146087 | A | 12/2011 |
| TW | 201204168 | A | 1/2012 |
| TW | 201208463 | A | 2/2012 |
| TW | 201208481 | A | 2/2012 |
| TW | 201208486 | A | 2/2012 |
| TW | 201215228 | A | 4/2012 |
| TW | 201233021 | A | 8/2012 |
| TW | 201244543 | A | 11/2012 |
| TW | I387396 | B | 2/2013 |
| TW | 201315118 | A | 4/2013 |
| TW | 201322825 | A | 6/2013 |
| TW | 201336345 | A | 9/2013 |
| TW | 201342987 | A | 10/2013 |
| TW | 201348909 | A | 12/2013 |
| TW | I422130 | B | 1/2014 |
| TW | I423732 | B | 1/2014 |
| TW | 201412189 | A | 3/2014 |
| TW | I434616 | B | 4/2014 |
| TW | 201414146 | A | 4/2014 |
| TW | M477115 | U | 4/2014 |
| TW | 201417626 | A | 5/2014 |
| TW | 201417631 | A | 5/2014 |
| TW | 201422045 | A | 6/2014 |
| TW | 201424454 | A | 6/2014 |
| TW | I441428 | B | 6/2014 |
| TW | I448198 | B | 8/2014 |
| TW | 201503756 | A | 1/2015 |
| TW | 201515514 | A | 4/2015 |

(56) References Cited

FOREIGN PATENT DOCUMENTS

| | | | |
|---|---|---|---|
| TW | I496502 | B | 8/2015 |
| TW | 201603644 | A | 1/2016 |
| TW | 201607368 | A | 2/2016 |
| TW | I524814 | B | 3/2016 |
| TW | I535175 | B | 5/2016 |
| TW | I540809 | B | 7/2016 |
| TW | 201630468 | A | 8/2016 |
| TW | 201639415 | A | 11/2016 |
| TW | I630842 | B | 7/2018 |
| TW | 201909699 | A | 3/2019 |
| TW | 201927074 | A | 7/2019 |
| WO | 2008/112820 | A2 | 9/2008 |

OTHER PUBLICATIONS

China Patent Office, Office Action mailed Apr. 15, 2021, in Application No. 201911371960.8.
China Patent Office, Office Action mailed Apr. 30, 2021, in Application No. 201910719931.X.
China Patent Office, Office Action mailed Aug. 28, 2015, in Application No. 201410322602.9.
China Patent Office, Office Action mailed Aug. 8, 2015, in Application No. 201410172086.6.
China Patent Office, Office Action mailed Dec. 14, 2015, in Application No. 201210166672.0.
China Patent Office, Office Action mailed Dec. 3, 2018, in Application No. 201710557179.4.
China Patent Office, Office Action mailed Feb. 1, 2021, in Application No. 201911140844.5.
China Patent Office, Office Action mailed Feb. 3, 2021, in Application No. 201911316902.5.
China Patent Office, Office Action mailed Jan. 17, 2022, in Application No. 201910124049.0.
China Patent Office, Office Action mailed Jan. 9, 2020, in Application No. 201710828263.5.
China Patent Office, Office Action mailed Jul. 7, 2014, in Application No. 201210468505.1.
China Patent Office, Office Action mailed Jun. 3, 2014, in Application No. 201110103130.4.
China Patent Office, Office Action mailed Jun. 30, 2015, in Application No. 201410171893.6.
China Patent Office, Office Action mailed Mar. 2, 2016, in Application No. 201410172086.6.
China Patent Office, Office Action mailed Mar. 22, 2016, in Application No. 201410322612.2.
China Patent Office, Office Action mailed Mar. 22, 2019, in Application No. 201711464007.9.
China Patent Office, Office Action mailed May 26, 2021, in Application No. 201910124049.0.
China Patent Office, Office Action mailed Nov. 15, 2014, in Application No. 201210166672.0.
China Patent Office, Office Action mailed Nov. 15, 2021, in Application No. 201911316902.5.
China Patent Office, Office Action mailed Nov. 2, 2020, in Application No. 201910124049.0.
China Patent Office, Office Action mailed Nov. 23, 2021, in Application No. 201911140844.5.
China Patent Office, Office Action mailed Nov. 29, 2018, in Application No. 201710828263.5.
China Patent Office, Office Action mailed Oct. 19, 2015, in Application No. 201410322612.2.
China Patent Office, Office Action mailed Sep. 2, 2016, in Application No. 201510103579.9.
Qi et al., "Sine Wave Dimming Circuit Based on PIC16 MCU," Electronic Technology Application in 2014, vol. 10, (2014).
Taiwan Intellectual Property Office, Office Action mailed Apr. 18, 2016, in Application No. 103140989.
Taiwan Intellectual Property Office, Office Action mailed Apr. 27, 2020, in Application No. 108116002.
Taiwan Intellectual Property Office, Office Action mailed Apr. 7, 2021, in Application No. 109111042.
Taiwan Intellectual Property Office, Office Action mailed Aug. 23, 2017, in Application No. 106103535.
Taiwan Intellectual Property Office, Office Action mailed Aug. 27, 2020, in Application No. 107107508.
Taiwan Intellectual Property Office, Office Action mailed Dec. 27, 2019, in Application No. 108116002.
Taiwan Intellectual Property Office, Office Action mailed Feb. 11, 2020, in Application No. 107107508.
Taiwan Intellectual Property Office, Office Action mailed Feb. 27, 2018, in Application No. 106136242.
Taiwan Intellectual Property Office, Office Action mailed Feb. 6, 2018, in Application No. 106130686.
Taiwan Intellectual Property Office, Office Action mailed Jan. 14, 2019, in Application No. 107107508.
Taiwan Intellectual Property Office, Office Action mailed Jan. 21, 2021, in Application No. 109108798.
Taiwan Intellectual Property Office, Office Action mailed Jan. 4, 2021, in Application No. 109111042.
Taiwan Intellectual Property Office, Office Action mailed Jan. 7, 2014, in Application No. 100119272.
Taiwan Intellectual Property Office, Office Action mailed Jun. 16, 2020, in Application No. 108136083.
Taiwan Intellectual Property Office, Office Action mailed Jun. 9, 2014, in Application No. 101124982.
Taiwan Intellectual Property Office, Office Action mailed May 28, 2019, in Application No. 107112306.
Taiwan Intellectual Property Office, Office Action mailed Nov. 13, 2015, in Application No. 103141628.
Taiwan Intellectual Property Office, Office Action mailed Nov. 30, 2020, in Application No. 107107508.
Taiwan Intellectual Property Office, Office Action mailed Oct. 31, 2019, in Application No. 107107508.
Taiwan Intellectual Property Office, Office Action mailed Sep. 17, 2015, in Application No. 103127108.
Taiwan Intellectual Property Office, Office Action mailed Sep. 17, 2015, in Application No. 103127620.
Taiwan Intellectual Property Office, Office Action mailed Sep. 25, 2014, in Application No. 101148716.
Taiwan Intellectual Property Office, Office Action mailed Sep. 9, 2020, in Application No. 108148566.
United States Patent and Trademark Office, Notice of Allowance mailed Aug. 3, 2023, in U.S. Appl. No. 18/081,528.
United States Patent and Trademark Office, Notice of Allowance mailed Nov. 6, 2023, in U.S. Appl. No. 18/103,971.
United States Patent and Trademark Office, Office Action mailed Jun. 12, 2023, in U.S. Appl. No. 18/103,971.
United States Patent and Trademark Office, Office Action mailed Mar. 22, 2023, in U.S. Appl. No. 17/502,916.
United States Patent and Trademark Office, Office Action mailed Oct. 5, 2022, in U.S. Appl. No. 17/502,916.
United States Patent and Trademark Office, Office Action mailed Sep. 19, 2023, in U.S. Appl. No. 17/502,916.
United States Patent and Trademark Office, Notice of Allowance mailed Feb. 7, 2024, in U.S. Appl. No. 17/502,916.
United States Patent and Trademark Office, Office Action mailed Jan. 22, 2024, in U.S. Appl. No. 18/220,584.
United States Patent and Trademark Office, Office Action mailed Mar. 21, 2024, in U.S. Appl. No. 18/238,990.
United States Patent and Trademark Office, Office Action mailed Aug. 20, 2024, in U.S. Appl. No. 18/238,990.
United States Patent and Trademark Office, Office Action mailed Aug. 21, 2024, in U.S. Appl. No. 18/429,816.

* cited by examiner

SYSTEMS AND METHODS FOR BLEEDER CONTROL RELATED TO TRIAC DIMMERS ASSOCIATED WITH LED LIGHTING

1. CROSS-REFERENCES TO RELATED APPLICATIONS

This application is a continuation of U.S. patent application Ser. No. 17/578,706, filed Jan. 19, 2022, which is a continuation of U.S. patent application Ser. No. 16/944,665, filed Jul. 31, 2020, which claims priority to Chinese Patent Application No. 201910719931.X, filed Aug. 6, 2019, all of the above applications being incorporated by reference herein for all purposes.

2. BACKGROUND OF THE INVENTION

Certain embodiments of the present invention are directed to circuits. More particularly, some embodiments of the invention provide systems and methods for bleeder control related to Triode for Alternating Current (TRIAC) dimmers. Merely by way of example, some embodiments of the invention have been applied to light emitting diodes (LEDs). But it would be recognized that the invention has a much broader range of applicability.

With development in the light-emitting diode (LED) lighting market, many LED manufacturers have placed LED lighting products at an important position in market development. LED lighting products often need dimmer technology to provide consumers with a unique visual experience. Since Triode for Alternating Current (TRIAC) dimmers have been widely used in conventional lighting systems such as incandescent lighting systems, the TRIAC dimmers are also increasingly being used in LED lighting systems.

Conventionally, the TRIAC dimmers usually are designed primarily for incandescent lights with pure resistive loads and low luminous efficiency. Such characteristics of incandescent lights often help to meet the requirements of TRIAC dimmers in holding currents. Therefore, the TRIAC dimmers usually are suitable for light dimming when used with incandescent lights.

However, when the TRIAC dimmers are used with more efficient LEDs, it is often difficult to meet the requirements of TRIAC dimmers in holding currents due to the reduced input power needed to achieve equivalent illumination to that of incandescent lights. Therefore, conventional LED lighting systems often utilize bleeder units to provide compensation in order to satisfy the requirements of TRIAC dimmers in holding currents.

FIG. 1 is a simplified diagram showing a conventional LED lighting system using a TRIAC dimmer. As shown in FIG. 1, the main control unit of the LED lighting system 100 includes a constant current unit 110 (e.g., a current regulator), a bleeder unit 120, and a bleeder control unit 130. The bleeder unit 120 includes an amplifier 122, a transistor 124, a resistor 126, and a switch 128. A bleeder current 190 is determined by the resistance value of the resistor 126 and the reference voltage 192 received by the amplifier 122. For example, if the transistor 124 is in the saturation region, the bleeder current 190 is determined as follows:

$$I_{bleed} = \frac{V_{ref}}{R} \quad \text{(Equation 1)}$$

where $I_{bleed}$ represents the bleeder current 190, $V_{ref}$ represents the reference voltage 192, and R represents the resistance value of the resistor 126.

The bleeder control unit 130 is configured to detect the change of an LED current 194 that flows through one or more LEDs 140. If the LED current 194 is relatively high, the bleeder control unit 130 does not allow the bleeder unit 120 to generate the bleeder current 190 according to Equation 1, such as by closing the switch 128 and thus biasing the gate terminal of the transistor 124 to the ground. If the LED current 194 is relatively low, the bleeder control unit 130 allows the bleeder unit 120 to generate the bleeder current 190 according to Equation 1, so that a TRIAC dimmer 150 can operate normally.

FIG. 2 shows simplified timing diagrams for the conventional LED lighting system using the TRIAC dimmer as shown in FIG. 1. The waveform 298 represents a rectified voltage 198 (e.g., VIN) as a function of time, the waveform 294 represents the LED current 194 (e.g., $I_{LED}$) as a function of time, the waveform 296 represents a control signal 196 that is used to control the switch 128 (e.g., SW1), and the waveform 290 represents the bleeder current 190 (e.g., $I_{bleed}$).

When the LED lighting system 100 works properly, the TRIAC dimmer 150 clips parts of a waveform for an AC input voltage 180 (e.g., VAC). From time $t_0$ to time $t_1$, the rectified voltage 198 (e.g., VIN) is at a voltage level that is close or equal to zero volts as shown by the waveform 298, the LED current 194 (e.g., $I_{LED}$) is equal to zero in magnitude as shown by the waveform 294, the control signal 196 is at a logic low level in order to open the switch 128 (e.g., SW1) as shown by the waveform 296, and the bleeder current 190 is allowed to be generated as shown by the waveform 290. As an example, from time $t_0$ to time $t_1$, the bleeder current 190 is allowed to be generated as shown by the waveform 290, so the bleeder current 190 remains at zero and then increases in magnitude as shown by the waveform 290. From time $t_1$ to time $t_2$, the rectified voltage 198 (e.g., VIN) is at a high voltage level (e.g., a high voltage level that is not constant) as shown by the waveform 298, the LED current 194 (e.g., $I_{LED}$) is at a high current level as shown by the waveform 294, the control signal 196 is at a logic high level in order to close the switch 128 (e.g., SW1) as shown by the waveform 296, and the bleeder current 190 is not allowed to be generated as shown by the waveform 290. As an example, from time $t_1$ to time $t_2$, the bleeder current 190 drops to zero and then remains at zero in magnitude.

From time $t_2$ to time $t_3$, the rectified voltage 198 (e.g., VIN) changes from the high voltage level to a low voltage level (e.g., a low voltage level that is not constant but larger than zero volts) as shown by the waveform 298, the LED current 194 (e.g., $I_{LED}$) is at the low current level as shown by the waveform 294, the control signal 196 is at the logic low level in order to open the switch 128 (e.g., SW1) as shown by the waveform 296, and the bleeder current 190 is allowed to be generated as shown by the waveform 290. As shown by the waveform 290, the bleeder current 190 increases but then becomes smaller with the decreasing rectified voltage 198 (e.g., VIN) from time $t_2$ to time $t_3$. From time $t_3$ to time $t_4$, similar to from time $t_0$ to time $t_1$, the rectified voltage 198 (e.g., VIN) is at the voltage level that is close or equal to zero volts as shown by the waveform 298, the LED current 194 (e.g., $I_{LED}$) is equal to zero in magnitude as shown by the waveform 294, the control signal 196 is at the logic low level in order to open the switch 128 (e.g., SW1) as shown by the waveform 296, and the bleeder current 190 is allowed to be generated as shown by the waveform 290. As an example, from time $t_3$ to time $t_4$, the bleeder current 190 remains at zero and then increases in magnitude as shown by the waveform 290.

As shown in FIG. 2, when the bleeder current 190 drops to zero in magnitude, the rectified voltage 198 (e.g., VIN) oscillates as shown by the waveform 298 and the LED current 194 also oscillates as shown by the waveform 294. Consequently, the LED current 194 (e.g., $I_{LED}$) is not stabile, causing the one or more LEDs 140 to blink.

Hence it is highly desirable to improve the techniques related to LED lighting systems.

3. BRIEF SUMMARY OF THE INVENTION

Certain embodiments of the present invention are directed to circuits. More particularly, some embodiments of the invention provide systems and methods for bleeder control related to Triode for Alternating Current (TRIAC) dimmers. Merely by way of example, some embodiments of the invention have been applied to light emitting diodes (LEDs). But it would be recognized that the invention has a much broader range of applicability.

According to some embodiments, a system for controlling one or more light emitting diodes includes: a current regulator including a first regulator terminal and a second regulator terminal, the first regulator terminal being configured to receive a diode current flowing through the one or more light emitting diodes, the current regulator being configured to generate a sensing signal representing the diode current, the second regulator terminal being configured to output the sensing signal; a bleeder controller including a first controller terminal and a second controller terminal, the first controller terminal being configured to receive the sensing signal from the second regulator terminal, the bleeder controller being configured to generate a first bleeder control signal based at least in part on the sensing signal, the second controller terminal being configured to output the first bleeder control signal, the first bleeder control signal indicating whether a bleeder current is allowed or not allowed to be generated; and a bleeder including a first bleeder terminal and a second bleeder terminal, the first bleeder terminal being configured to receive the first bleeder control signal from the second controller terminal, the second bleeder terminal being configured to receive a rectified voltage associated with a TRIAC dimmer and generated by a rectifying bridge; wherein: the bleeder includes a current controller and a current generator; the current controller is configured to receive the first bleeder control signal and generate an input voltage based at least in part on the first bleeder control signal; and the current generator is configured to receive the rectified voltage and the input voltage and generate the bleeder current based at least in part on the input voltage; wherein, if the first bleeder control signal indicates that the bleeder current is not allowed to be generated: the current controller is configured to gradually reduce the input voltage from a first voltage magnitude at a first time to a second voltage magnitude at a second time; and the current generator is configured to gradually reduce the bleeder current from a first current magnitude at the first time to a second current magnitude at the second time; wherein the second time follows the first time by a predetermined duration of time.

According to certain embodiments, a system for controlling one or more light emitting diodes includes: a current regulator including a first regulator terminal and a second regulator terminal, the first regulator terminal being configured to receive a diode current flowing through the one or more light emitting diodes, the current regulator being configured to generate a sensing signal representing the diode current, the second regulator terminal being configured to output the sensing signal; a voltage divider including a first divider terminal and a second divider terminal, the first divider terminal being configured to receive a rectified voltage associated with a TRIAC dimmer and generated by a rectifying bridge, the voltage divider being configured to generate a converted voltage proportional to the rectified voltage, the second divider terminal being configured to output the converted voltage; a bleeder controller including a first controller terminal, a second controller terminal and a third controller terminal, the first controller terminal being configured to receive the converted voltage from the second divider terminal, the second controller terminal being configured to receive the sensing signal from the second regulator terminal, the bleeder controller being configured to generate a first bleeder control signal based at least in part on the converted voltage, the third controller terminal being configured to output the first bleeder control signal, the first bleeder control signal indicating whether a bleeder current is allowed or not allowed to be generated; and a bleeder including a first bleeder terminal and a second bleeder terminal, the first bleeder terminal being configured to receive the first bleeder control signal from the third controller terminal, the second bleeder terminal being configured to receive the rectified voltage; wherein: the bleeder includes a current controller and a current generator; the current controller is configured to receive the first bleeder control signal and generate an input voltage based at least in part on the first bleeder control signal; and the current generator is configured to receive the rectified voltage and the input voltage and generate the bleeder current based at least in part on the input voltage; wherein, if the first bleeder control signal indicates that the bleeder current is not allowed to be generated: the current controller is configured to gradually reduce the input voltage from a first voltage magnitude at a first time to a second voltage magnitude at a second time; and the current generator is configured to gradually reduce the bleeder current from a first current magnitude at the first time to a second current magnitude at the second time; wherein the second time follows the first time by a predetermined duration of time.

According to some embodiments, a system for controlling one or more light emitting diodes includes: a current regulator including a first regulator terminal and a second regulator terminal, the first regulator terminal being configured to receive a diode current flowing through the one or more light emitting diodes, the current regulator being configured to generate a sensing signal representing the diode current, the second regulator terminal being configured to output the sensing signal; a voltage divider including a first divider terminal and a second divider terminal, the first divider terminal being configured to receive a rectified voltage associated with a TRIAC dimmer and generated by a rectifying bridge, the voltage divider being configured to generate a converted voltage proportional to the rectified voltage, the second divider terminal being configured to output the converted voltage; a bleeder controller including a first controller terminal, a second controller terminal and a third controller terminal, the first controller terminal being configured to receive the converted voltage from the second divider terminal, the second controller terminal being configured to receive the sensing signal from the second regulator terminal, the bleeder controller being configured to generate a first bleeder control signal based at least in part on the converted voltage, the third controller terminal being configured to output the first bleeder control signal, the first bleeder control signal indicating whether a bleeder current is allowed or not allowed to be generated; and a bleeder including a first bleeder terminal and a second bleeder terminal, the first bleeder terminal being configured to receive the first bleeder control signal from the third controller terminal, the second bleeder terminal being configured to receive the rectified voltage, the bleeder being configured to generate the bleeder current based at least in part on the first bleeder control signal; wherein the bleeder controller is configured to: determine a phase range within which the TRIAC dimmer is in a conduction state based on at least information associated with the converted voltage; and generate a detection signal by comparing a predetermined conduction phase threshold and the phase range within which the TRIAC dimmer is in the conduction state; wherein the bleeder controller is further configured to: if the detection signal indicates that the phase range within which the TRIAC dimmer is in the conduction state is larger than the predetermined conduction phase threshold, generate the first bleeder control signal based at least in part on the sensing signal; and if the detection signal indicates that the phase range within which the TRIAC dimmer is in the conduction state is determined to be smaller than the predetermined conduction phase threshold, generate the first bleeder control signal based at least in part on the converted voltage; wherein: if the first bleeder control signal indicates that the bleeder current is not allowed to be generated, the current generator is configured to gradually reduce the bleeder current from a first current magnitude at a first time to a second current magnitude at a second time; wherein the second time follows the first time by a predetermined duration of time.

According to certain embodiments, a method for controlling one or more light emitting diodes includes: receiving a diode current flowing through the one or more light emitting diodes; generating a sensing signal representing the diode current; outputting the sensing signal; receiving the sensing signal; generating a first bleeder control signal based at least in part on the sensing signal, the first bleeder control signal indicating whether a bleeder current is allowed or not allowed to be generated; outputting the first bleeder control signal; receiving the first bleeder control signal; generating an input voltage based at least in part on the first bleeder control signal; receiving the input voltage and a rectified voltage associated with a TRIAC dimmer; generating the bleeder current based at least in part on the input voltage; wherein: the generating an input voltage based at least in part on the first bleeder control signal includes, if the first bleeder control signal indicates that the bleeder current is not allowed to be generated, gradually reducing the input voltage from a first voltage magnitude at a first time to a second voltage magnitude at a second time; and the generating the bleeder current based at least in part on the input voltage includes, if the first bleeder control signal indicates that the bleeder current is not allowed to be generated, gradually reducing the bleeder current from a first current magnitude at the first time to a second current magnitude at the second time; wherein the second time follows the first time by a predetermined duration of time.

According to some embodiments, a method for controlling one or more light emitting diodes includes: receiving a diode current flowing through the one or more light emitting diodes; generating a sensing signal representing the diode current; outputting the sensing signal; receiving a rectified voltage associated with a TRIAC dimmer; generating a converted voltage proportional to the rectified voltage; outputting the converted voltage; receiving the converted voltage and the sensing signal; generating a first bleeder control signal based at least in part on the converted voltage, the first bleeder control signal indicating whether a bleeder current is allowed or not allowed to be generated; outputting the first bleeder control signal; receiving the first bleeder control signal; generating an input voltage based at least in part on the first bleeder control signal; receiving the input voltage and the rectified voltage; and generating the bleeder current based at least in part on the input voltage; wherein: the generating an input voltage based at least in part on the first bleeder control signal includes, if the first bleeder control signal indicates that the bleeder current is not allowed to be generated, gradually reducing the input voltage from a first voltage magnitude at a first time to a second voltage magnitude at a second time; and the generating the bleeder current based at least in part on the input voltage includes, if the first bleeder control signal indicates that the bleeder current is not allowed to be generated, gradually reducing the bleeder current from a first current magnitude at the first time to a second current magnitude at the second time; wherein the second time follows the first time by a predetermined duration of time.

According to certain embodiments, a method for controlling one or more light emitting diodes, the method comprising: receiving a diode current flowing through the one or more light emitting diodes; generating a sensing signal representing the diode current; outputting the sensing signal; receiving a rectified voltage associated with a TRIAC dimmer; generating a converted voltage proportional to the rectified voltage; outputting the converted voltage; receive the converted voltage and the sensing signal; generating a first bleeder control signal based at least in part on the converted voltage, the first bleeder control signal indicating whether a bleeder current is allowed or not allowed to be generated; outputting the first bleeder control signal; receiving the first bleeder control signal and the rectified voltage; and generating the bleeder current based at least in part on the input voltage; wherein the generating a first bleeder control signal based at least in part on the converted voltage includes: determining a phase range within which the TRIAC dimmer is in a conduction state based on at least information associated with the converted voltage; generating a detection signal by comparing a predetermined conduction phase threshold and the phase range within which the TRIAC dimmer is in the conduction state; if the detection signal indicates that the phase range within which the TRIAC dimmer is in the conduction state is larger than the predetermined conduction phase threshold, generating the first bleeder control signal based at least in part on the sensing signal; and if the detection signal indicates that the phase range within which the TRIAC dimmer is in the conduction state is smaller than the predetermined conduction phase threshold, generating the first bleeder control signal based at least in part on the converted voltage; wherein the generating the bleeder current based at least in part on the input voltage includes, if the first bleeder control signal indicates that the bleeder current is not allowed to be generated, gradually reducing the bleeder current from a first current magnitude at a first time to a second current magnitude at a second time; wherein the second time follows the first time by a predetermined duration of time.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for bleeder control related to Triode for Alternating Current (TRIAC) dimmers. Merely by way of example, some embodiments of the invention have been applied to light emitting diodes (LEDs). But it would be recognized that the invention has a much broader range of applicability.

Figure 1:
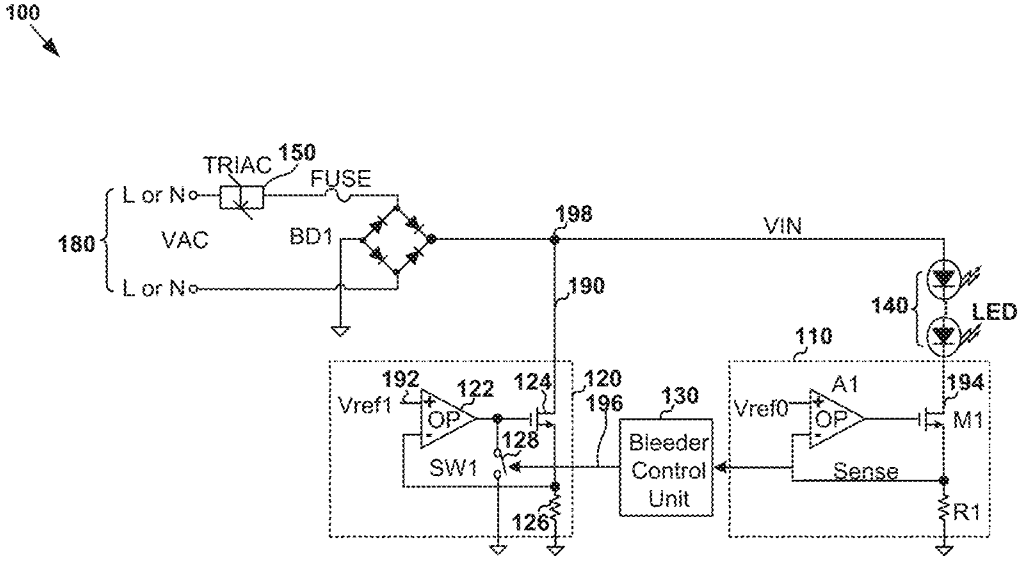
FIG. 1 Prior Art
FIG. 1 is a simplified diagram showing a conventional LED lighting system using a TRIAC dimmer.
Figure 2:
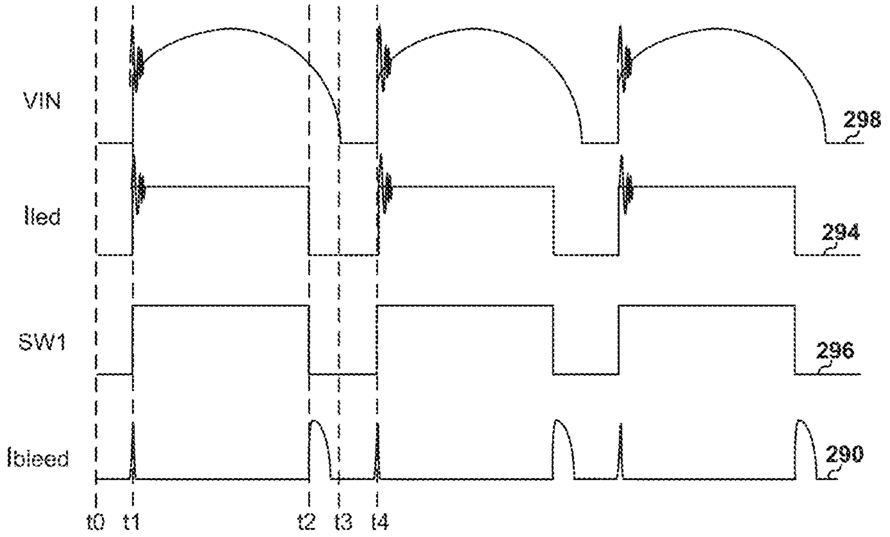
FIG. 2 Prior Art
FIG. 2 shows simplified timing diagrams for the conventional LED lighting system using the TRIAC dimmer as shown in FIG. 1.

Referring to FIG. 1 and FIG. 2, the input circuit for the rectified voltage 198 (e.g., VIN) includes one or more parasitic capacitors for generating the bleeder current 190 (e.g., $I_{bleed}$) according to some embodiments. For example, when the bleeder current 190 drops to zero in magnitude, the current of the input circuit oscillates, causing the rectified voltage 198 (e.g., VIN) to also oscillate as shown by the waveform 298. As an example, the oscillation in the rectified voltage 198 (e.g., VIN) leads to oscillation in the LED current 194 as shown by the waveform 294, causing instability in the conduction state (e.g., on state) and also change in the conduction phase angle of the TRIAC dimmer 150. Consequently, the LED current 194 (e.g., $I_{LED}$) is not stabile, causing the one or more LEDs 140 to blink, according to certain embodiments.

Figure 3:
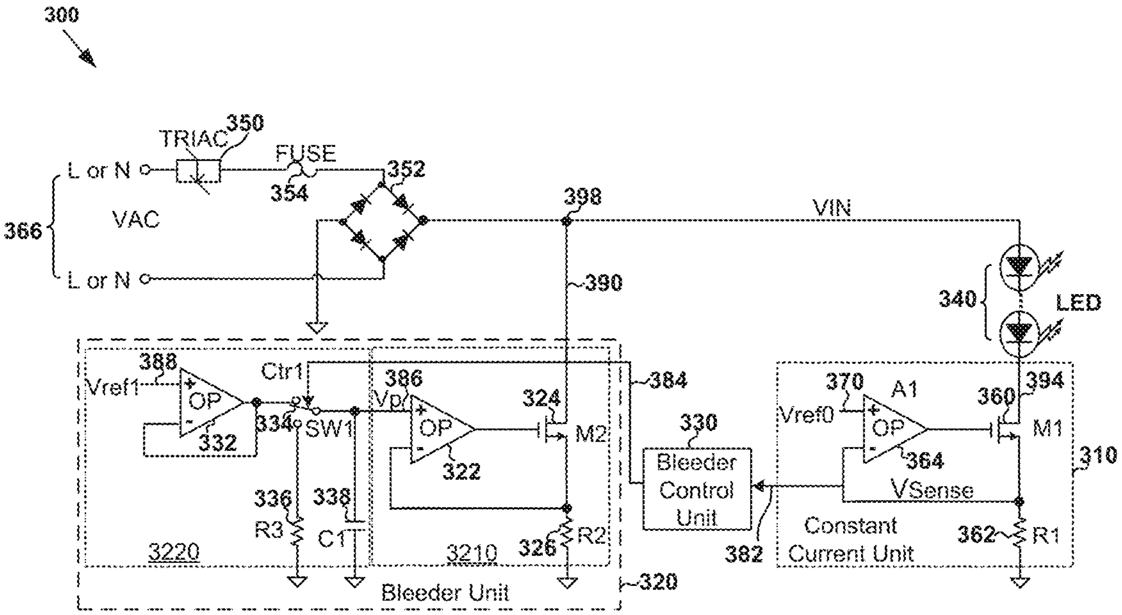
FIG. 3 is a simplified circuit diagram showing an LED lighting system according to some embodiments of the present invention.

FIG. 3 is a simplified circuit diagram showing an LED lighting system according to some embodiments of the present invention. This diagram is merely an example, which should not unduly limit the scope of the claims. One of ordinary skill in the art would recognize many variations, alternatives, and modifications. As shown in FIG. 3, the LED lighting system 300 includes a TRIAC dimmer 350, a rectifying bridge 352 (e.g., a full wave rectifying bridge), a fuse 354, one or more LEDs 340, and a control system. As an example, the control system of the LED lighting system 300 includes a constant current unit 310 (e.g., a current regulator), a bleeder unit 320, and a bleeder control unit 330. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 3, the rectifying bridge 352 (e.g., a full wave rectifying bridge) is coupled to the TRIAC dimmer 350 through the fuse 354, and an AC input voltage 366 (e.g., VAC) is received by the TRIAC dimmer 350 and is also rectified by the rectifying bridge 352 to generate a rectified voltage 398 (e.g., VIN) according to certain embodiments. As an example, the rectified voltage 398 does not fall below the ground voltage (e.g., zero volts).

According to some embodiments, the constant current unit 310 includes two terminals, one of which is coupled to the one or more LEDs 340 and the other of which is coupled to the bleeder control unit 330. As an example, the bleeder control unit 330 includes two terminals, one of which is coupled to the constant current unit 310 and the other of which is coupled to the bleeder unit 320. For example, the bleeder unit 320 includes two terminals, one of which is coupled to the bleeder control unit 330 and the other of which is configured to receive the rectified voltage 398 (e.g., VIN).

According to certain embodiments, the bleeder control unit 330 is configured to detect a change of an LED current 394 (e.g., $I_{LED}$) that flows through the one or more LEDs 340, and based at least in part on the change of the LED current 394, to allow or not allow the bleeder unit 320 to generate a bleeder current 390. For example, the bleeder control unit 330 receives from the constant current unit 310 a sensing voltage 382 (e.g., $V_{sense}$) that represents the LED current 394 (e.g., $I_{LED}$), and the bleeder control unit 330 generates, based at least in part on the sensing voltage 382, a control signal 384 to allow or not allow the bleeder unit 320 to generate the bleeder current 390.

In some embodiments, the constant current unit 310 includes a transistor 360, a resistor 362, and an amplifier 364. For example, the amplifier 364 includes two input terminal and an output terminal. As an example, one of the two input terminals receives a reference voltage 370 (e.g., $V_{ref0}$), and the other of the two input terminals is coupled to the resistor 362 and configured to generate the sensing voltage 382 (e.g., $V_{sense}$). For example, the sensing voltage 382 (e.g., $V_{sense}$) is equal to the LED current 394 (e.g., $I_{LED}$) multiplied by the resistance (e.g., $R_1$) of the resistor 362.

In certain embodiments, if the sensing voltage 382 (e.g., $V_{sense}$) indicates that the LED current 394 is higher than a threshold current (e.g., a holding current of the TRIAC dimmer 350), the bleeder control unit 330 outputs the control signal 384 to the bleeder unit 320, and the control signal 384 does not allow the bleeder unit 320 to generate the bleeder current 390. In some embodiments, if the sensing voltage 382 indicates that the LED current 394 is lower than the threshold current (e.g., a holding current of the TRIAC dimmer 350), the bleeder control unit 330 outputs the control signal 384 to the bleeder unit 320, and the control signal 384 allows the bleeder unit 320 to generate the bleeder current 390. As an example, the bleeder unit 320 receives the control signal 384 from the bleeder control unit 330, and if the control signal 384 allows the bleeder unit 320 to generate the bleeder current 390, the bleeder unit 320 generates the bleeder current 390 so that the TRIAC dimmer 350 can operate properly.

As shown in FIG. 3, the bleeder unit 320 includes a bleeder-current generation sub-unit 3210 and a bleeder-current control sub-unit 3220 according to certain embodiments. In some embodiments, the bleeder-current generation sub-unit 3210 includes an amplifier 322, a transistor 324, and a resistor 326. In certain embodiments, the bleeder-current control sub-unit 3220 includes an amplifier 332, a switch 334, a resistor 336, and a capacitor 338.

In some examples, if the transistor 324 is in the saturation region, the bleeder current 390 is determined as follows:

$$I_{bleed} = \frac{V_p}{R_2} \quad \text{(Equation 2)}$$

where $I_{bleed}$ represents the bleeder current 390, $V_p$ represents a voltage 386 received by the amplifier 322, and $R_2$ represents the resistance value of the resistor 326. In certain examples, the amplifier 322 includes a positive input terminal (e.g., the "+" terminal) and a negative input terminal (e.g., the "−" terminal). For example, the voltage 386 is received by the positive input terminal of the amplifier 322. As an example, the voltage 386 is controlled by the switch 334, which makes the voltage 386 equal to either the ground voltage (e.g., zero volts) or a reference voltage 388 (e.g., $V_{ref1}$). For example, the reference voltage 388 is received by the amplifier 332 and is larger than zero volts.

According to some embodiments, if the sensing voltage 382 indicates that the LED current 394 is lower than the threshold current, the control signal 384 received by the bleeder unit 320 sets the switch 334 so that the positive input terminal (e.g., the "+" terminal) of the amplifier 322 is biased to the reference voltage 388 through the amplifier 332. For example, if the sensing voltage 382 indicates that the LED current 394 is lower than the threshold current, the voltage 386 is equal to the reference voltage 388 and the bleeder current 390 is generated (e.g., the bleeder current 390 being larger than zero in magnitude).

According to certain embodiments, if the sensing voltage 382 indicates that the LED current 394 is higher than the threshold current, the control signal 384 received by the bleeder unit 320 sets the switch 334 so that the positive input terminal (e.g., the "+" terminal) of the amplifier 322 is biased to the ground voltage through the resistor 336. For example, if the sensing voltage 382 indicates that the LED current 394 is higher than the threshold current, the voltage 386 is equal to the ground voltage (e.g., zero volts) and the bleeder current 390 is not generated (e.g., the bleeder current 390 being equal to zero).

In certain embodiments, if the LED current 394 changes from being lower than the threshold current to being higher than the threshold current, the control signal 384, through the switch 334, changes the voltage 386 from being equal to the reference voltage 388 (e.g., larger than zero volts) to being equal to the ground voltage (e.g., equal to zero volts) so that the bleeder current 390 changes from being larger than zero to being equal to zero. As shown in FIG. 3, the resistor 336 and the capacitor 338 are parts of an RC filtering circuit, which slows down the decrease of the voltage 386 from the reference voltage 388 (e.g., larger than zero volts) to the ground voltage (e.g., equal to zero volts) and also slows down the decrease of the bleeder current 390 from being larger than zero to being equal to zero according to some embodiments. For example, the bleeder unit 320 is configured to turning off the bleeder current 390 gradually (e.g., slowly) during a predetermined time duration, and the length of the predetermined time duration depends on the resistance of the resistor 336 and the capacitance of the capacitor 338.

In certain embodiments, if the LED current 394 changes from being higher than the threshold current to being lower than the threshold current, the control signal 384, through the switch 334, changes the voltage 386 from being equal to the ground voltage (e.g., equal to zero volts) to being equal to the reference voltage 388 (e.g., larger than zero volts) so that the bleeder current 390 changes from being equal to zero to being larger than zero in order to for the TRIAC dimmer 350 to operate properly. In some examples, when the voltage 386 is biased to the reference voltage 388 (e.g., larger than zero volts), if the transistor 324 is in the saturation region, the bleeder current 390 is determined as follows:

$$I_{bleed} = \frac{V_{ref1}}{R_2} \quad \text{(Equation 3)}$$

where $I_{bleed}$ represents the bleeder current 390, $V_{ref1}$ represents the reference voltage 388, and $R_2$ represents the resistance value of the resistor 326.

Figure 4:
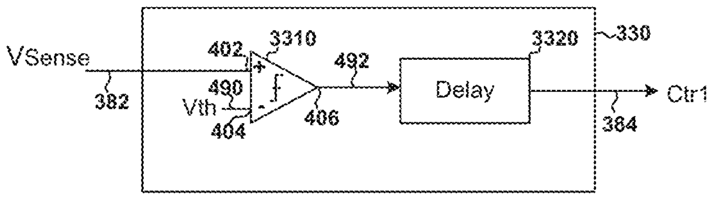
FIG. 4 is a simplified circuit diagram showing the bleeder control unit of the LED lighting system as shown in FIG. 3 according to certain embodiments of the present invention.

FIG. 4 is a simplified circuit diagram showing the bleeder control unit 330 of the LED lighting system 300 as shown in FIG. 3 according to certain embodiments of the present invention. This diagram is merely an example, which should not unduly limit the scope of the claims. One of ordinary skill in the art would recognize many variations, alternatives, and modifications. As shown in FIG. 4, the bleeder control unit 330 includes a comparator 3310 and a delay sub-unit 3320. Although the above has been shown using a selected group of components for the bleeder control unit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the comparator 3310 includes input terminals 402 and 404 and an output terminal 406. As an example, the input terminal 402 receives the sensing voltage 382 (e.g., $V_{sense}$), and the input terminal 404 receives a threshold voltage 490 (e.g., $V_{th}$). For example, the threshold voltage 490 (e.g., $V_{th}$) is smaller than the reference voltage 370 (e.g., $V_{ref0}$) for the constant current unit 310. As an example, the threshold voltage 490 (e.g., $V_{th}$) is equal to the threshold current (e.g., the holding current of the TRIAC dimmer 350) multiplied by the resistance (e.g., $R_1$) of the resistor 362. In certain examples, if the sensing voltage 382 (e.g., $V_{sense}$) is larger than the threshold voltage 490 (e.g., $V_{th}$), the LED current 394 is larger than the threshold current (e.g., the holding current of the TRIAC dimmer 350). In some examples, if the sensing voltage 382 (e.g., $V_{sense}$) is smaller than the threshold voltage 490 (e.g., $V_{th}$), the LED current 394 is smaller than the threshold current (e.g., the holding current of the TRIAC dimmer 350).

In certain embodiments, the comparator 3310 compares the sensing voltage 382 (e.g., $V_{sense}$) and the threshold voltage 490 (e.g., $V_{th}$) and generates a comparison signal 492. For example, if the sensing voltage 382 (e.g., $V_{sense}$) is larger than the threshold voltage 490 (e.g., $V_{th}$), the comparator 3310 generates the comparison signal 492 at a logic high level. As an example, if the sensing voltage 382 (e.g., $V_{sense}$) is smaller than the threshold voltage 490 (e.g., $V_{th}$), the comparator 3310 generates the comparison signal 492 at a logic low level. In some embodiments, if the sensing voltage 382 (e.g., $V_{sense}$) changes from being smaller than the threshold voltage 490 (e.g., $V_{th}$) to being larger than the threshold voltage 490 (e.g., $V_{th}$), the comparison signal 492 changes from the logic low level to the logic high level. As an example, the comparator 3310 outputs the comparison signal 492 at the output terminal 406.

According to certain embodiments, the comparison signal 492 is received by the delay sub-unit 3320, which in response generates the control signal 384. For example, if the comparison signal 492 changes from the logic low level to the logic high level, the delay sub-unit 3320, after a predetermined delay (e.g., after $t_d$), changes the control signal 384 from the logic low level to the logic high level. As an example, if the comparison signal 492 changes from the logic high level to the logic low level, the delay sub-unit 3320, without any predetermined delay (e.g., without $t_d$), changes the control signal 384 from the logic high level to the logic low level.

As shown in FIG. 3, if the control signal 384 is at the logic high level, the switch 334 is set to bias the voltage 386 to the ground voltage (e.g., being equal to zero volts), and if the control signal 384 is at the logic low level, the switch 334 is set to bias the voltage 386 to the reference voltage 388 (e.g., being larger than zero volts), according to some embodiments. For example, if the control signal 384 changes from the logic high level to the logic low level, the voltage 386 changes from the ground voltage (e.g., being equal to zero volts) to the reference voltage 388 (e.g., being larger than zero volts). As an example, if the control signal 384 changes from the logic low level to the logic high level, the voltage 386 changes from the reference voltage 388 (e.g., being larger than zero volts) to the ground voltage (e.g., being equal to zero volts).

In certain embodiments, if the LED current 394 changes from being lower than the threshold current to being higher than the threshold current, the bleeder current 390, after the predetermined delay (e.g., after $t_d$), changes gradually (e.g., slowly) from being larger than zero to being equal to zero during the predetermined time duration. For example, the predetermined delay (e.g., $t_d$) is provided by the delay sub-unit 3320. As an example, the length of the predetermined time duration depends on the resistance of the resistor 336 and the capacitance of the capacitor 338. In some embodiments, if the LED current 394 changes from being higher than the threshold current to being lower than the threshold current, the bleeder current 390, without any predetermined delay (e.g., without $t_d$), changes from being equal to zero to being larger than zero.

Figure 5:
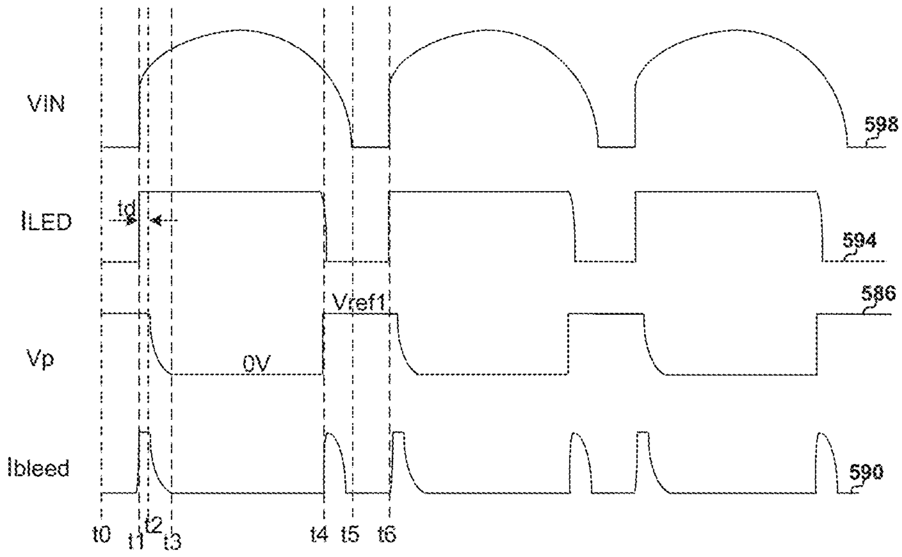
FIG. 5 shows simplified timing diagrams for the LED lighting system as shown in FIG. 3 according to certain embodiments of the present invention.

FIG. 5 shows simplified timing diagrams for the LED lighting system 300 as shown in FIG. 3 according to certain embodiments of the present invention. These diagrams are merely examples, which should not unduly limit the scope of the claims. One of ordinary skill in the art would recognize many variations, alternatives, and modifications. The waveform 598 represents the rectified voltage 398 (e.g., VIN) as a function of time, the waveform 594 represents the LED current 394 (e.g., $I_{LED}$) as a function of time, the waveform 586 represents the voltage 386 (e.g., $V_p$) as a function of time, and the waveform 590 represents the bleeder current 390 (e.g., $I_{bleed}$) as a function of time.

In some embodiments, when the LED lighting system 300 works properly, the TRIAC dimmer 350 clips parts of a waveform for the AC input voltage 366 (e.g., VAC). As an example, from time $t_0$ to time $t_1$, the rectified voltage 398 (e.g., VIN) is at a voltage level that is close or equal to zero volts as shown by the waveform 598, the LED current 394 (e.g., $I_{LED}$) is equal to zero in magnitude as shown by the waveform 594, the voltage 386 (e.g., $V_p$) is equal to the reference voltage 388 and larger than zero in magnitude as shown by the waveform 586, and the bleeder current 390 is allowed to be generated as shown by the waveform 590. As an example, from time $t_0$ to time $t_1$, the bleeder current 390 is allowed to be generated as shown by the waveform 590, so the bleeder current 390 remains at zero and then increases in magnitude as shown by the waveform 590.

As shown in FIG. 5, from time $t_1$ to time $t_4$, the rectified voltage 398 (e.g., VIN) is at a high voltage level (e.g., a high voltage level that is not constant) as shown by the waveform 598, and the LED current 394 (e.g., $I_{LED}$) is at a high current level as shown by the waveform 594 according to some embodiments. In certain examples, from time $t_1$ to time $t_2$, the voltage 386 (e.g., $V_p$) remains equal to the reference voltage 388 and larger than zero in magnitude as shown by the waveform 586, and the bleeder current 390 is at a high current level (e.g., being larger than zero) as shown by the waveform 590. In some examples, the time duration from time $t_1$ to time $t_2$ is the predetermined delay (e.g., $t_d$) provided by the delay sub-unit 3320.

In some examples, from time $t_2$ to time $t_3$, the voltage 386 (e.g., $V_p$) changes from being equal to the reference voltage 388 (e.g., larger than zero volts) to being equal to the ground voltage (e.g., equal to zero volts) gradually (e.g., slowly) during the predetermined time duration as shown by the waveform 586, and the bleeder current 390 also changes from being equal to the high current level (e.g., being larger than zero) to being equal to zero gradually (e.g., slowly) during the predetermined time duration as shown by the waveform 590. As an example, the time duration from time $t_2$ to time $t_3$ is equal to the predetermined time duration, and the length of the predetermined time duration depends on the resistance of the resistor 336 and the capacitance of the capacitor 338. In some examples, from time $t_3$ to time $t_4$, the voltage 386 (e.g., $V_p$) remains equal to the ground voltage (e.g., equal to zero volts) as shown by the waveform 586, and the bleeder current 390 also remains equal to zero as shown by the waveform 590.

As shown in FIG. 5, from time $t_2$ to time $t_4$, the bleeder current 390 is not allowed to be generated as shown by the waveform 590, so the bleeder current 390 changes from being equal to the high current level (e.g., being larger than zero) to being equal to zero gradually (e.g., slowly) from time $t_2$ to time $t_3$ (e.g., during the predetermined time duration) and then the bleeder current 390 remains equal to zero from time $t_3$ to time $t_4$ according to certain embodiments.

From time $t_4$ to time $t_5$, the rectified voltage 398 (e.g., VIN) changes from the high voltage level to a low voltage level (e.g., a low voltage level that is not constant but larger than zero volts) as shown by the waveform 598, the LED current 394 (e.g., $I_{LED}$) is equal to zero in magnitude as shown by the waveform 594, the voltage 386 (e.g., $V_p$) is equal to the reference voltage 388 (e.g., larger than zero volts) as shown by the waveform 586, and the bleeder current 390 is allowed to be generated as shown by the waveform 590, according to some embodiments. For example, as shown by the waveform 590, the bleeder current 390 increases but then becomes smaller with the decreasing rectified voltage 398 (e.g., VIN) from time $t_4$ to time $t_5$. From time $t_5$ to time $t_6$, similar to from time $t_0$ to time $t_1$, the rectified voltage 398 (e.g., VIN) is at the voltage level that is close or equal to zero volts as shown by the waveform 598, the LED current 394 (e.g., $I_{LED}$) is equal to zero in magnitude as shown by the waveform 594, the voltage 386 (e.g., $V_p$) is equal to the reference voltage 388 and larger than zero in magnitude as shown by the waveform 586, and the bleeder current 390 is allowed to be generated as shown by the waveform 590. As an example, from time $t_5$ to time $t_6$, the bleeder current 390 remains at zero and then increases in magnitude as shown by the waveform 590.

As shown in FIG. 3 and FIG. 4, the LED lighting system 300 provides the RC filtering circuit that includes the resistor 336 and the capacitor 338 in order to control how fast the bleeder current 390 changes from being equal to the high current level (e.g., being larger than zero) to being equal to zero according to certain embodiments. In some examples, the bleeder current 390 changes from being equal to the high current level (e.g., being larger than zero) to being equal to zero gradually (e.g., slowly) during the predetermined time duration, and the length of the predetermined time duration depends on the resistance of the resistor 336 and the capacitance of the capacitor 338. In certain examples, the LED lighting system 300 uses the delay sub-unit 3320 as part of the bleeder control unit 330 in order to cause the predetermined delay (e.g., $t_d$) after the LED current 394 becomes higher than the threshold current (e.g., a holding current of the TRIAC dimmer 350) but before the voltage 386 starts decreasing from the reference voltage 388 and the bleeder current 390 also starts decreasing from the high current level (e.g., being larger than zero).

In some embodiments, the predetermined delay (e.g., $t_d$) helps to stabilize the conduction state (e.g., on state) of the TRIAC dimmer 350. In certain embodiments, the gradual (e.g., slow) reduction of the bleeder current 390 during the predetermined time duration helps to reduce (e.g., eliminate) the oscillation of the rectified voltage 398 (e.g., VIN) and also helps to stabilize the LED current 394 (e.g., $I_{LED}$) to reduce (e.g., eliminate) blinking of the one or more LEDs 340.

As discussed above and further emphasized here, FIG. 3, FIG. 4 and FIG. 5 are merely examples, which should not unduly limit the scope of the claims. One of ordinary skill in the art would recognize many variations, alternatives, and modifications. As an example, two or more levels of control mechanisms are used by the bleeder-current control sub-unit so that gradual (e.g., slow) reduction of the bleeder current 390 is accomplished in two or more stages respectively to further reduce (e.g., eliminate) the oscillation of the rectified voltage 398 (e.g., VIN) and further reduce (e.g., eliminate) blinking of the one or more LEDs 340.

Figure 6:
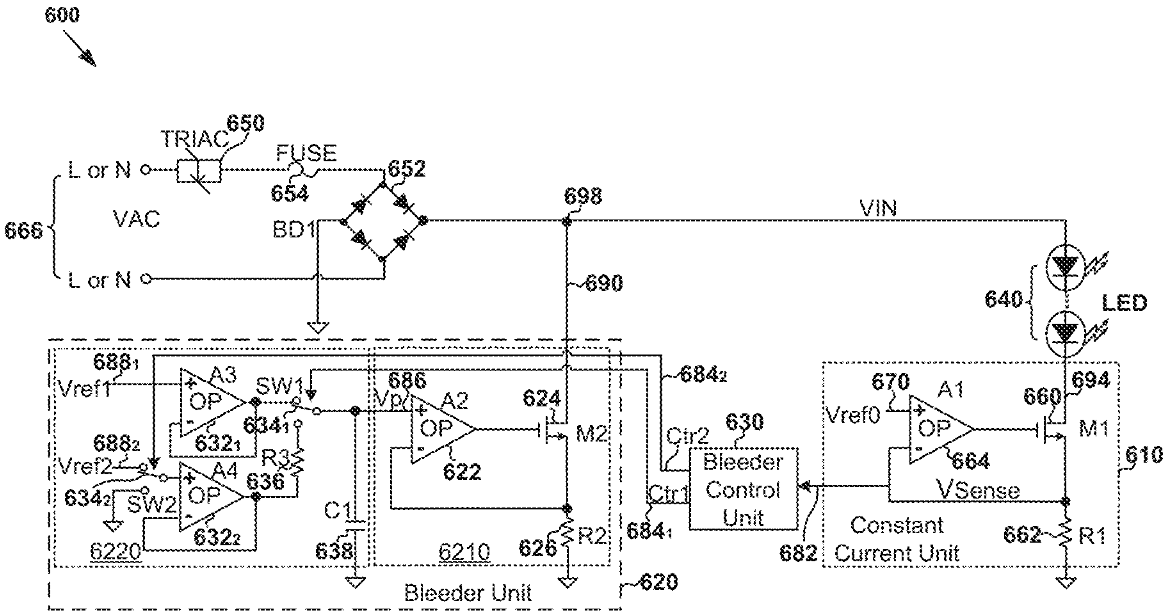
FIG. 6 is a simplified circuit diagram showing an LED lighting system according to certain embodiments of the present invention.

FIG. 6 is a simplified circuit diagram showing an LED lighting system according to certain embodiments of the present invention. This diagram is merely an example, which should not unduly limit the scope of the claims. One of ordinary skill in the art would recognize many variations, alternatives, and modifications. As shown in FIG. 6, the LED lighting system 600 includes a TRIAC dimmer 650, a rectifying bridge 652 (e.g., a full wave rectifying bridge), a fuse 654, one or more LEDs 640, and a control system. As an example, the control system of the LED lighting system 600 includes a constant current unit 610 (e.g., a current regulator), a bleeder unit 620, and a bleeder control unit 630. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 6, the rectifying bridge 652 (e.g., a full wave rectifying bridge) is coupled to the TRIAC dimmer 650 through the fuse 654, and an AC input voltage 666 (e.g., VAC) is received by the TRIAC dimmer 650 and is also rectified by the rectifying bridge 652 to generate a rectified voltage 698 (e.g., VIN) according to certain embodiments. As an example, the rectified voltage 698 does not fall below the ground voltage (e.g., zero volts).

According to some embodiments, the constant current unit 610 includes two terminals, one of which is coupled to the one or more LEDs 640 and the other of which is coupled to the bleeder control unit 630. As an example, the bleeder control unit 630 includes two terminals, one of which is coupled to the constant current unit 610 and the other of which is coupled to the bleeder unit 620. For example, the bleeder unit 620 includes two terminals, one of which is coupled to the bleeder control unit 630 and the other of which is configured to receive the rectified voltage 698 (e.g., VIN).

According to certain embodiments, the bleeder control unit 630 is configured to detect a change of an LED current 694 (e.g., $I_{LED}$) that flows through the one or more LEDs 640, and based at least in part on the change of the LED current 694, to allow or not allow the bleeder unit 620 to generate a bleeder current 690. For example, the bleeder control unit 630 receives from the constant current unit 610 a sensing voltage 682 (e.g., $V_{sense}$) that represents the LED current 694 (e.g., $I_{LED}$), and the bleeder control unit 630 generates, based at least in part on the sensing voltage 682, control signals 3841 and 3842 to allow or not allow the bleeder unit 620 to generate the bleeder current 690.

In some embodiments, the constant current unit 610 includes a transistor 660, a resistor 662, and an amplifier 664. For example, the amplifier 664 includes two input terminal and an output terminal. As an example, one of the two input terminals receives a reference voltage 670 (e.g., $V_{ref0}$), and the other of the two input terminals is coupled to the resistor 662 and configured to generate the sensing voltage 682 (e.g., $V_{sense}$). For example, the sensing voltage 682 (e.g., $V_{sense}$) is equal to the LED current 694 (e.g., $I_{LED}$) multiplied by the resistance (e.g., $R_1$) of the resistor 662.

In certain embodiments, if the sensing voltage 682 (e.g., $V_{sense}$) indicates that the LED current 694 is higher than a threshold current (e.g., a holding current of the TRIAC dimmer 650), the bleeder control unit 630 outputs the control signals 684$_1$ and 684$_2$ to the bleeder unit 620, and the control signals 684$_1$ and 684$_2$ do not allow the bleeder unit 620 to generate the bleeder current 690. In some embodiments, if the sensing voltage 682 indicates that the LED current 694 is lower than the threshold current (e.g., a holding current of the TRIAC dimmer 650), the bleeder control unit 630 outputs the control signals 684$_1$ and 684$_2$ to the bleeder unit 620, and the control signals 684$_1$ and 684$_2$ allow the bleeder unit 620 to generate the bleeder current 690. As an example, the bleeder unit 620 receives the control signals 684$_1$ and 684$_2$ from the bleeder control unit 630, and if the control signals 684$_1$ and 684$_2$ allow the bleeder unit 620 to generate the bleeder current 690, the bleeder unit 620 generates the bleeder current 690 so that the TRIAC dimmer 650 can operate properly.

As shown in FIG. 6, the bleeder unit 620 includes a bleeder-current generation sub-unit 6210 and a bleeder-current control sub-unit 6220 according to certain embodiments. In some embodiments, the bleeder-current generation sub-unit 6210 includes an amplifier 622, a transistor 624, and a resistor 626. In certain embodiments, the bleeder-current control sub-unit 6220 includes amplifiers 632$_1$ and 632$_2$, switches 634$_1$ and 634$_2$, a resistor 636, and a capacitor 638.

In certain examples, if the control signal 684$_1$ is at a logic low level, the positive input terminal (e.g., the "+" terminal) of the amplifier 622 is coupled to the output terminal of the amplifier 632$_1$ through the switch 634$_1$, and if the control signal 684$_1$ is at a logic high level, the positive input terminal (e.g., the "+" terminal) of the amplifier 622 is coupled to the output terminal of the amplifier 632$_2$ through the switch 634$_1$ and the resistor 636. In some examples, if the control signal 684$_2$ is at the logic high level, the positive input terminal (e.g., the "+" terminal) of the amplifier 632$_2$ is biased to the reference voltage 688$_2$ (e.g., $V_{ref2}$) through the switch 634$_2$, and if the control signal 684$_2$ is at the logic low level, the positive input terminal (e.g., the "+" terminal) of the amplifier 632$_2$ is biased to the ground voltage (e.g., zero volts) through the switch 634$_2$.

In some examples, if the transistor 624 is in the saturation region, the bleeder current 690 is determined as follows:

$$I_{bleed} = \frac{V_p}{R_2} \quad \text{(Equation 4)}$$

where $I_{bleed}$ represents the bleeder current 690, $V_p$ represents a voltage 686 received by the amplifier 622, and $R_2$ represents the resistance value of the resistor 626. In certain examples, the amplifier 622 includes a positive input terminal (e.g., the "+" terminal) and a negative input terminal (e.g., the "−" terminal). For example, the voltage 686 is received by the positive input terminal of the amplifier 622. As an example, the voltage 686 is controlled by the switch 634$_1$, which makes the voltage 686 equal to either the output voltage of the amplifier 632$_2$ or a reference voltage 688$_1$ (e.g., $V_{ref}$). For example, the reference voltage 688$_1$ is received by the amplifier 632$_1$ (e.g., received by the positive terminal of the amplifier 632$_1$) and is larger than zero volts.

According to some embodiments, if the sensing voltage 682 indicates that the LED current 694 is lower than the threshold current, the control signal 684$_1$ received by the bleeder unit 620 sets the switch 634$_1$ so that the positive input terminal (e.g., the "+" terminal) of the amplifier 622 is biased to the reference voltage 688$_1$ through the amplifier 632$_1$. For example, if the sensing voltage 682 indicates that the LED current 694 is lower than the threshold current, the voltage 686 is equal to the reference voltage 688$_1$ and the bleeder current 690 is generated (e.g., the bleeder current 690 being larger than zero in magnitude).

According to certain embodiments, if the sensing voltage 682 indicates that the LED current 694 is higher than the threshold current, the control signal 684$_1$ received by the bleeder unit 620 sets the switch 634$_1$ so that the positive input terminal (e.g., the "+" terminal) of the amplifier 622 is biased to the output voltage of the amplifier 632$_2$ through the resistor 636. For example, if the sensing voltage 682 indicates that the LED current 694 is higher than the threshold current, the voltage 686 is equal to the output voltage of the amplifier 632$_2$. As an example, the output voltage of the amplifier 632$_2$ is lower than the reference voltage 688$_1$ but still larger than zero volts. For example, if the voltage 686 is equal to the output voltage of the amplifier 632$_2$, the bleeder current 690 is generated (e.g., the bleeder current 690 being larger than zero in magnitude) but is smaller than the bleeder current 690 generated when the voltage 686 is equal to the reference voltage 688$_1$.

In certain embodiments, if the LED current 694 changes from being lower than the threshold current to being higher than the threshold current, the control signal 684$_1$, through the switch 634$_1$, changes the voltage 686 from being equal to the reference voltage 688$_1$ (e.g., larger than zero volts) to being equal to the output voltage of the amplifier 632$_2$ (e.g., lower than the reference voltage 688$_1$ but still larger than zero volts) so that the bleeder current 690 changes from being equal to a larger magnitude to being equal to a smaller magnitude (e.g., a smaller magnitude that is larger than zero). As shown in FIG. 6, the resistor 636 and the capacitor 638 are parts of an RC filtering circuit, which slows down the decrease of the voltage 686 from the reference voltage 688$_1$ to the output voltage of the amplifier 632$_2$ (e.g., lower than the reference voltage 688$_1$ but still larger than zero volts) and also slows down the decrease of the bleeder current 690 from being equal to the larger magnitude to being equal to the smaller magnitude (e.g., the smaller magnitude that is larger than zero) according to some embodiments. For example, the bleeder unit 620 is configured to reduce the bleeder current 690 gradually (e.g., slowly) during a predetermined time duration, and the length of the predetermined time duration depends on the resistance of the resistor 636 and the capacitance of the capacitor 638.

In certain embodiments, if the LED current 694 changes from being higher than the threshold current to being lower than the threshold current, the control signal 684$_1$, through the switch 634$_1$, changes the voltage 686 from being equal to the output voltage of the amplifier 632$_2$ (e.g., lower than the reference voltage 688$_1$) to being equal to the reference voltage 688$_1$ (e.g., larger than zero volts) so that the bleeder current 690 changes from being equal to the smaller magnitude to being equal to the larger magnitude in order to for the TRIAC dimmer 650 to operate properly. In some examples, when the voltage 686 is biased to the reference voltage $688_1$ (e.g., larger than zero volts), if the transistor 624 is in the saturation region, the bleeder current 690 is determined as follows:

$$I_{bleed} = \frac{V_{ref1}}{R_2} \quad \text{(Equation 5)}$$

where $I_{bleed}$ represents the bleeder current 690, $V_{ref1}$ represents the reference voltage $688_1$, and $R_2$ represents the resistance value of the resistor 626.

According to some embodiments, if the sensing voltage 682 indicates that the LED current 694 is lower than the threshold current, the control signal $684_2$ received by the bleeder unit 620 sets the switch $634_2$ so that the output terminal of the amplifier $632_2$ is biased to a reference voltage $688_2$ (e.g., $V_{ref2}$) through the amplifier $632_2$. For example, the reference voltage $688_2$ is received by the amplifier $632_2$ (e.g., received by the positive terminal of the amplifier $632_2$) and is larger than zero volts. As an example, the reference voltage $688_2$ is smaller than the reference voltage $688_1$. For example, if the voltage 686 is set to being equal to the output voltage of the amplifier $632_2$ and the output terminal of the amplifier $632_2$ is biased to the reference voltage $688_2$ through the amplifier $632_2$, the voltage 686 is equal to the reference voltage $688_2$.

In some examples, when the voltage 686 is biased to the reference voltage $688_2$ (e.g., larger than zero volts), if the transistor 624 is in the saturation region, the bleeder current 690 is determined as follows:

$$I_{bleed} = \frac{V_{ref2}}{R_2} \quad \text{(Equation 6)}$$

where $I_{bleed}$ represents the bleeder current 690, $V_{ref2}$ represents the reference voltage $688_2$, and $R_2$ represents the resistance value of the resistor 626.

According to certain embodiments, if the sensing voltage 682 indicates that the LED current 694 is higher than the threshold current, the control signal $684_2$ received by the bleeder unit 620 sets the switch $634_2$ so that the output terminal of the amplifier $632_2$ is biased to the ground voltage (e.g., zero volts). For example, if the sensing voltage 682 indicates that the LED current 694 is higher than the threshold current, the output voltage of the amplifier $632_2$ is equal to the ground voltage (e.g., zero volts). As an example, if the voltage 686 is set to being equal to the output voltage of the amplifier $632_2$ and the output terminal of the amplifier $632_2$ is biased to the ground voltage (e.g., zero volts), the voltage 686 is equal to the ground voltage (e.g., zero volts).

In certain embodiments, if the LED current 694 changes from being lower than the threshold current to being higher than the threshold current, the control signal $684_2$, through the switch $634_2$, changes the output voltage of the amplifier $632_2$ from being equal to the reference voltage $688_2$ to being equal to the ground voltage (e.g., zero volts). As shown in FIG. 6, if the voltage 686 is set to being equal to the output voltage of the amplifier $632_2$, the resistor 636 and the capacitor 638 are parts of the RC filtering circuit, which slows down the decrease of the voltage 686 from the reference voltage $688_2$ to the ground voltage (e.g., zero volts) and also slows down the decrease of the bleeder current 690 to zero according to some embodiments. For example, the bleeder unit 620 is configured to reduce the bleeder current 690 gradually (e.g., slowly) during a predetermined time duration, and the length of the predetermined time duration depends on the resistance of the resistor 636 and the capacitance of the capacitor 638.

Figure 7:
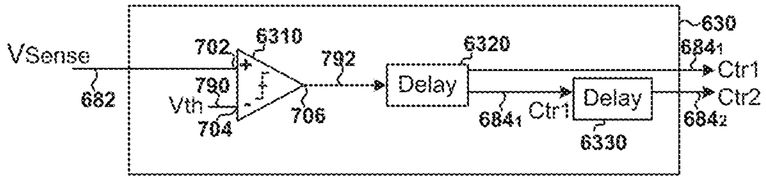
FIG. 7 is a simplified circuit diagram showing the bleeder control unit of the LED lighting system as shown in FIG. 6 according to some embodiments of the present invention.

FIG. 7 is a simplified circuit diagram showing the bleeder control unit 630 of the LED lighting system 600 as shown in FIG. 6 according to some embodiments of the present invention. This diagram is merely an example, which should not unduly limit the scope of the claims. One of ordinary skill in the art would recognize many variations, alternatives, and modifications. As shown in FIG. 7, the bleeder control unit 630 includes a comparator 6310 and delay sub-units 6320 and 6330. Although the above has been shown using a selected group of components for the bleeder control unit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the comparator 6310 includes input terminals 702 and 704 and an output terminal 706. As an example, the input terminal 702 receives the sensing voltage 682 (e.g., $V_{sense}$), and the input terminal 704 receives a threshold voltage 790 (e.g., $V_{th}$). For example, the threshold voltage 790 (e.g., $V_{th}$) is smaller than the reference voltage 670 (e.g., $V_{ref0}$) for the constant current unit 610. As an example, the threshold voltage 790 (e.g., $V_{th}$) is equal to the threshold current (e.g., the holding current of the TRIAC dimmer 650) multiplied by the resistance (e.g., $R_1$) of the resistor 662. In certain examples, if the sensing voltage 682 (e.g., $V_{sense}$) is larger than the threshold voltage 790 (e.g., $V_{th}$), the LED current 694 is larger than the threshold current (e.g., the holding current of the TRIAC dimmer 650). In some examples, if the sensing voltage 682 (e.g., $V_{sense}$) is smaller than the threshold voltage 790 (e.g., $V_{th}$), the LED current 694 is smaller than the threshold current (e.g., the holding current of the TRIAC dimmer 650).

In certain embodiments, the comparator 6310 compares the sensing voltage 682 (e.g., $V_{sense}$) and the threshold voltage 790 (e.g., $V_{th}$) and generates a comparison signal 792. For example, if the sensing voltage 682 (e.g., $V_{sense}$) is larger than the threshold voltage 790 (e.g., $V_{th}$), the comparator 6310 generates the comparison signal 792 at a logic high level. As an example, if the sensing voltage 682 (e.g., $V_{sense}$) is smaller than the threshold voltage 790 (e.g., $V_{th}$), the comparator 6310 generates the comparison signal 792 at a logic low level. In some embodiments, if the sensing voltage 682 (e.g., $V_{sense}$) changes from being smaller than the threshold voltage 790 (e.g., $V_{th}$) to being larger than the threshold voltage 790 (e.g., $V_{th}$), the comparison signal 792 changes from the logic low level to the logic high level. As an example, the comparator 6310 outputs the comparison signal 792 at the output terminal 706.

According to certain embodiments, the comparison signal 792 is received by the delay sub-unit 6320, which in response generates the control signal $684_1$. For example, if the comparison signal 792 changes from the logic low level to the logic high level, the delay sub-unit 6320, after a predetermined delay (e.g., after tai), changes the control signal $684_1$ from the logic low level to the logic high level. As an example, if the comparison signal 792 changes from the logic high level to the logic low level, the delay sub-unit 6320, without any predetermined delay (e.g., without $t_{d1}$), changes the control signal $684_1$ from the logic high level to the logic low level.

According to certain embodiments, the control signal $684_1$ is received by the delay sub-unit 6330, which in response generates the control signal $684_2$. For example, if the control signal $684_1$ changes from the logic low level to the logic high level, the delay sub-unit 6330, after a predetermined delay (e.g., after $t_{d2}$), changes the control signal $684_2$ from the logic high level to the logic low level. As an example, if the control signal $684_1$ changes from the logic high level to the logic low level, the delay sub-unit 6330, without any predetermined delay (e.g., without $t_{d2}$), changes the control signal $684_2$ from the logic low level to the logic high level.

According to some embodiments, if the comparison signal 792 changes from the logic low level to the logic high level, the control signal $684_1$, after a predetermined delay (e.g., after $t_{d1}$), changes from the logic low level to the logic high level, and the control signal $684_2$, after two predetermined delays (e.g., after both $t_{d1}$ and $t_{d2}$), changes from the logic high level to the logic low level. According to certain embodiments, if the comparison signal 792 changes from the logic high level to the logic low level, the control signal $684_1$, without any predetermined delay, changes from the logic high level to the logic low level, and the control signal $684_2$, without any predetermined delay, changes from the logic low level to the logic high level.

As shown in FIG. 6, if the control signal $684_1$ is at the logic high level, the switch $634_1$ is set to bias the voltage 686 to the output voltage of the amplifier $632_2$, and if the control signal $684_1$ is at the logic low level, the switch $634_1$ is set to bias the voltage 686 to the reference voltage $688_1$ (e.g., being larger than zero volts), according to some embodiments. For example, if the control signal $684_1$ changes from the logic high level to the logic low level, the voltage 686 changes from the output voltage of the amplifier $632_2$ to the reference voltage $688_1$ (e.g., being larger than zero volts). As an example, if the control signal $684_1$ changes from the logic low level to the logic high level, the voltage 686 changes from the reference voltage $688_1$ (e.g., being larger than zero volts) to the output voltage of the amplifier $632_2$.

In certain embodiments, if the LED current 694, at a time of change, changes from being lower than the threshold current to being higher than the threshold current, the bleeder current 690, after one predetermined delay (e.g., after $t_{d1}$) from the time of change, changes from the larger magnitude to the smaller magnitude (e.g., the smaller magnitude that is larger than zero) during the predetermined time duration, and after two predetermined delays (e.g., after tai and $t_{d2}$) from the time of change, further changes from the smaller magnitude (e.g., the smaller magnitude that is larger than zero) to zero during the predetermined time duration. For example, the predetermined delay $t_{d1}$ is provided by the delay sub-unit 6320, and the predetermined delay $t_{d2}$ is provided by the delay sub-unit 6330. As an example, the falling edge of the control signal $684_2$ is delayed from the rising edge of the control signal $684_1$ by the predetermined delay $t_{d2}$. For example, the length of the predetermined time duration depends on the resistance of the resistor 636 and the capacitance of the capacitor 638. In some embodiments, if the LED current 694 changes from being higher than the threshold current to being lower than the threshold current, the bleeder current 690, without any predetermined delay (e.g., without tai and without $t_{d2}$), changes to a magnitude according to Equation 5.

Figure 8:
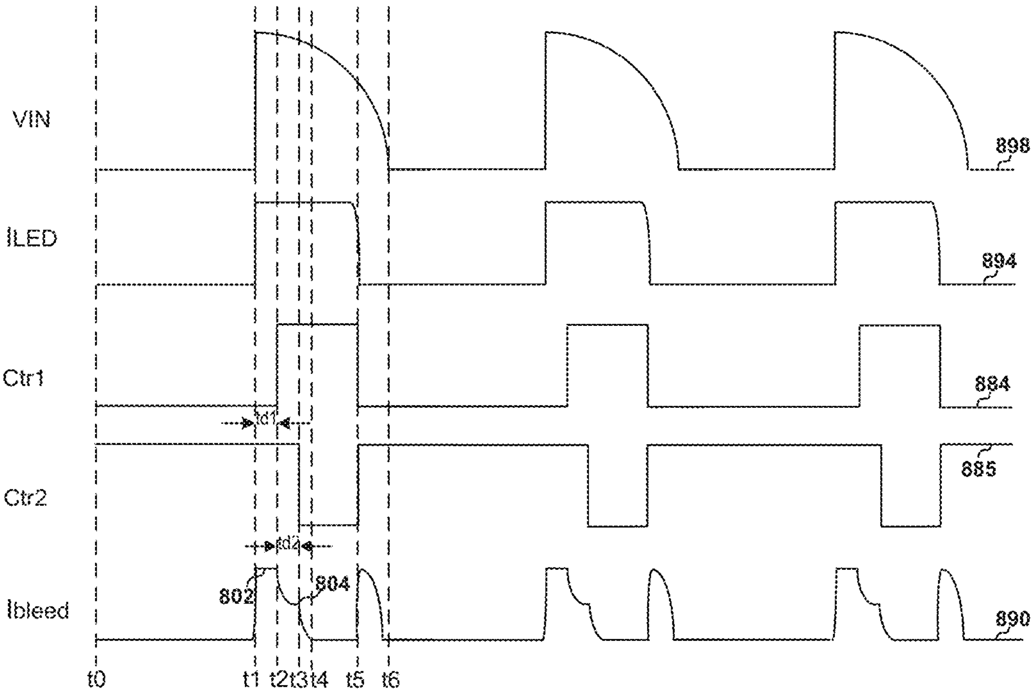
FIG. 8 shows simplified timing diagrams for the LED lighting system as shown in FIG. 6 according to certain embodiments of the present invention.

FIG. 8 shows simplified timing diagrams for the LED lighting system 600 as shown in FIG. 6 according to certain embodiments of the present invention. These diagrams are merely examples, which should not unduly limit the scope of the claims. One of ordinary skill in the art would recognize many variations, alternatives, and modifications. The waveform 898 represents the rectified voltage 698 (e.g., VIN) as a function of time, the waveform 894 represents the LED current 694 (e.g., $I_{LED}$) as a function of time, the waveform 884 represents the control signal $684_1$ (e.g., $Ctr_1$) as a function of time, the waveform 885 represents the control signal $684_2$ (e.g., $Ctr_2$) as a function of time, and the waveform 890 represents the bleeder current 690 (e.g., $I_{bleed}$) as a function of time.

In some embodiments, when the LED lighting system 600 works properly, the TRIAC dimmer 650 clips parts of a waveform for the AC input voltage 666 (e.g., VAC). As an example, from time $t_0$ to time $t_1$, the rectified voltage 698 (e.g., VIN) is at a voltage level that is close or equal to zero volts as shown by the waveform 898, the LED current 694 (e.g., $I_{LED}$) is equal to zero in magnitude as shown by the waveform 894, the control signal $684_1$ (e.g., $Ctr_1$) is at a logic low level as shown by the waveform 884, the control signal $684_2$ (e.g., $Ctr_2$) is at the logic high level as shown by the waveform 885, and the bleeder current 690 is allowed to be generated as shown by the waveform 890. As an example, from time $t_0$ to time $t_1$, the bleeder current 690 is allowed to be generated as shown by the waveform 890, so the bleeder current 690 remains at zero and then increases in magnitude as shown by the waveform 890.

As shown in FIG. 8, from time $t_1$ to time $t_5$, the rectified voltage 698 (e.g., VIN) is at a high voltage level (e.g., a high voltage level that is not constant) as shown by the waveform 898, and the LED current 694 (e.g., $I_{LED}$) is at a high current level as shown by the waveform 894 according to some embodiments. In certain examples, from time $t_1$ to time $t_2$, the control signal $684_1$ (e.g., $Ctr_1$) remains at the logic low level as shown by the waveform 884, the control signal $684_2$ (e.g., $Ctr_2$) remains at the logic high level as shown by the waveform 885, and the bleeder current 690 is at a current level 802 (e.g., being larger than zero) as shown by the waveform 890. For example, the time duration from time $t_1$ to time $t_2$ is the predetermined delay (e.g., $t_{d1}$) provided by the delay sub-unit 6320.

In some examples, from time $t_2$ to time 13, the control signal $684_1$ (e.g., $Ctr_1$) is at the logic high level as shown by the waveform 884, the control signal $684_2$ (e.g., $Ctr_2$) is at the logic high level as shown by the waveform 885, and the bleeder current 690 changes from being equal to the current level 802 (e.g., being larger than zero) to being equal to a current level 804 (e.g., being larger than zero) gradually (e.g., slowly) during the predetermined time duration that starts at time $t_2$ as shown by the waveform 890. For example, the time duration from time $t_2$ to time $t_3$ is the predetermined delay (e.g., $t_{d2}$) provided by the delay sub-unit 6330. As an example, the time duration from time $t_2$ to time $t_3$ is equal to the predetermined time duration, and the length of the predetermined time duration depends on the resistance of the resistor 336 and the capacitance of the capacitor 338.

In certain examples, from time $t_3$ to time $t_4$, the control signal $684_1$ (e.g., $Ctr_1$) is at the logic high level as shown by the waveform 884, the control signal $684_2$ (e.g., $Ctr_2$) is at the logic low level as shown by the waveform 885, and the bleeder current 690 changes from being equal to the current level 804 (e.g., being larger than zero) to being equal to zero gradually (e.g., slowly) during the predetermined time duration that starts at time $t_3$ as shown by the waveform 890. As an example, the time duration from time $t_3$ to time $t_4$ is equal to the predetermined time duration, and the length of the predetermined time duration depends on the resistance of the resistor 336 and the capacitance of the capacitor 338. In some examples, from time $t_4$ to time $t_5$, the control signal $684_1$ (e.g., $Ctr_1$) remains at the logic high level as shown by the waveform 884, the control signal $684_2$ (e.g., $Ctr_2$) remains at the logic low level as shown by the waveform 885, and the bleeder current 390 remains equal to zero.

As shown in FIG. 8, from time $t_3$ to time $t_5$, the bleeder current 690 is not allowed to be generated as shown by the waveform 890, so the bleeder current 690 changes from being equal to the current level 804 (e.g., being larger than zero) to being equal to zero gradually (e.g., slowly) from time $t_3$ to time $t_4$ (e.g., during the predetermined time duration) and then the bleeder current 690 remains equal to zero from time $t_4$ to time $t_5$ according to certain embodiments.

From time $t_5$ to time $t_6$, the rectified voltage 698 (e.g., VIN) changes from the high voltage level to a low voltage level (e.g., a low voltage level that is not constant but larger than zero volts) as shown by the waveform 898, the LED current 694 (e.g., $I_{LED}$) is equal to zero in magnitude as shown by the waveform 894, the control signal $684_1$ (e.g., $Ctr_1$) is at the logic low level as shown by the waveform 884, the control signal $684_2$ (e.g., $Ctr_2$) is at the logic high level as shown by the waveform 885, and the bleeder current 690 is allowed to be generated as shown by the waveform 890, according to some embodiments. For example, as shown by the waveform 890, the bleeder current 690 increases but then becomes smaller with the decreasing rectified voltage 698 (e.g., VIN) from time $t_5$ to time $t_6$.

As shown in FIG. 6, FIG. 7 and FIG. 8, two levels of control mechanisms are used by the bleeder-current control sub-unit 6220 so that gradual (e.g., slow) reduction of the bleeder current 690 is accomplished in two corresponding stages according to certain embodiments. In some examples, the amplifier $632_1$ and the switch $634_1$, together with the resistor 636 and the capacitor 638, are used to implement the first level of control mechanism for the first stage, and the amplifier $632_2$ and the switch $634_2$, together with the resistor 636 and the capacitor 638, are used to implement the second level of control mechanism for the second stage. In certain example, the switch $634_1$ is controlled by the control signal $684_1$ and the switch $634_2$ is controlled by the control signal $684_2$, so that the bleeder current 690 becomes zero in two stages. For example, in the first stage (e.g., from time $t_2$ to time $t_3$), the voltage 686 decreases from the reference voltage $688_1$ (e.g., $V_{ref1}$) to the reference voltage $688_2$ (e.g., $V_{ref2}$) and the bleeder current 690 decreases from the current level 802 as determined by Equation 5 to the current level 804 as determined by Equation 6. As an example, in the second stage (e.g., from time $t_3$ to time $t_4$), the voltage 686 further decreases from the reference voltage $688_2$ (e.g., $V_{ref2}$) to the ground voltage (e.g., zero volts) and the bleeder current 690 further decreases from the current level 804 as determined by Equation 6 to zero.

As discussed above and further emphasized here, FIG. 6, FIG. 7 and FIG. 8 are merely examples, which should not unduly limit the scope of the claims. One of ordinary skill in the art would recognize many variations, alternatives, and modifications. In some embodiments, N levels of control mechanisms are used by the bleeder-current control sub-unit 6220 so that gradual (e.g., slow) reduction of the bleeder current 690 is accomplished in N corresponding stages, where N is an integer larger than 1. For example, N is larger than 2. In certain examples, the change of a control signal $684_n$ occurs after a delay of tan from the time when the change of a control signal $684_{n-1}$ occurs in response to the LED current 694 (e.g., $I_{LED}$) becomes larger than a threshold current (e.g., the holding current of the TRIAC dimmer 650), where n is an integer larger than 1 but smaller than or equal to N. As an example, the change of the control signal $684_2$ occurs after the delay of $t_{d2}$ from the time when the change of the control signal $684_1$ occurs in response to the LED current 694 (e.g., $I_{LED}$) becomes larger than the threshold current (e.g., the holding current of the TRIAC dimmer 650). For example, the change of the control signal 6843 occurs after a delay of $t_{d3}$ from the time when the change of the control signal $684_2$ occurs in response to the LED current 694 (e.g., $I_{LED}$) becomes larger than the threshold current (e.g., the holding current of the TRIAC dimmer 650). As an example, the change of the control signal $684_N$ occurs after a delay of $t_{dN}$ from the time when the change of the control signal $684_{N-1}$ occurs in response to the LED current 694 (e.g., $I_{LED}$) becomes larger than the threshold current (e.g., the holding current of the TRIAC dimmer 650).

In certain embodiments, the bleeder-current control sub-unit 6220 includes amplifiers $632_1$, . . . , $632_k$, . . . , and $632_N$, switches $634_1$, . . . , $634_k$, . . . , and $634_N$, the resistor 636, and the capacitor 638, where k is an integer larger than 1 but smaller than N. For example, a negative input terminal of the amplifier $632_k$ is coupled to an output terminal of the amplifier $632_k$. As an example, the capacitor 638 is biased between the voltage 686 (e.g., $V_p$) and the ground voltage. In some examples, the positive input terminal of the amplifier $632_1$ is biased to the reference voltage $688_1$ (e.g., $V_{ref1}$). For example, the switch $634_1$ is controlled by the control signal $684_1$ (e.g., $Ctr_1$) so that the voltage 686 (e.g., $V_p$) either equals the reference voltage $688_1$ (e.g., $V_{ref1}$) to generate the bleeder current 690 (e.g., $I_{bleed}$) based at least in part on the reference voltage $688_1$ (e.g., $V_{ref1}$), or equals the output voltage of the amplifier $632_2$ (e.g., through the resistor 636) to generate the bleeder current 690 (e.g., $I_{bleed}$) based at least in part on the output voltage of the amplifier $632_2$. As an example, the switch $634_2$ is controlled by the control signal $684_2$ (e.g., $Ctr_2$) so that the voltage 686 (e.g., $V_p$) either equals the reference voltage $688_2$ (e.g., $V_{ref2}$) to generate the bleeder current 690 (e.g., $I_{bleed}$) based at least in part on the reference voltage $688_2$ (e.g., $V_{ref2}$), or equals the output voltage of the amplifier 6323 to generate the bleeder current 690 (e.g., $I_{bleed}$) based at least in part on the output voltage of the amplifier 6323. For example, the switch $634_k$ is controlled by the control signal $684_k$ (e.g., $Ctr_k$) so that the voltage 686 (e.g., $V_p$) either equals the reference voltage $688_k$ (e.g., $V_{refk}$) to generate the bleeder current 690 (e.g., $I_{bleed}$) based at least in part on the reference voltage $688_k$ (e.g., $V_{refk}$), or equals the output voltage of the amplifier $632_{k+1}$ to generate the bleeder current 690 (e.g., $I_{bleed}$) based at least in part on the output voltage of the amplifier $632_{k+1}$. As an example, the switch $634_N$ is controlled by the control signal $684_N$ (e.g., $Ctr_N$) so that the voltage 686 (e.g., $V_p$) either equals the reference voltage $688_N$ (e.g., $V_{refN}$) to generate the bleeder current 690 (e.g., $I_{bleed}$) based at least in part on the reference voltage $688_N$ (e.g., $V_{refN}$), or equals the ground voltage (e.g., zero volts) to reduce the bleeder current 690 (e.g., $I_{bleed}$) to zero. In certain examples, the reference voltage $688_j$ (e.g., $V_{refj}$) is larger than zero volts but smaller than the reference voltage $688_{j+1}$ (e.g., $V_{ref(j+1)}$), where j is an integer larger than 0 but smaller than N.

In some embodiments, the bleeder control unit 630 includes the comparator 6310 and delay sub-units $6320_1$, . . . $6320_m$, . . . and $6320_N$, where N is an integer larger than 1 and m is an integer larger than 1 but smaller than N. For example, the delay sub-unit $6320_1$ is the delay sub-unit 6320 as shown in FIG. 7. As an example, the delay sub-unit $6320_2$ is the delay sub-unit 6330 as shown in FIG.

7. In certain examples, the comparator 6310 compares the sensing voltage 682 (e.g., $V_{sense}$) and the threshold voltage 790 (e.g., $V_{th}$) and generates the comparison signal 792. For example, the change of the control signal $684_1$ occurs after a delay of tai from the time when the change of the comparison signal 792 in response to the sensing voltage 682 (e.g., $V_{sense}$) becoming larger than the threshold voltage 790 (e.g., $V_{th}$). As an example, the change of the control signal $684_m$ occurs after a delay of tam from the time when the change of the control signal $684_{m-1}$ occurs in response to the sensing voltage 682 (e.g., $V_{sense}$) becoming larger than the threshold voltage 790 (e.g., $V_{th}$). For example, the change of the control signal $684_N$ occurs after a delay of $t_{dN}$ from the time when the change of the control signal $684_{N-1}$ occurs in response to the sensing voltage 682 (e.g., $V_{sense}$) becoming larger than the threshold voltage 790 (e.g., $V_{th}$). In some examples, the bleeder control unit 630 outputs the control signal $684_1$, . . . the control signal $684_m$, . . . and the control signal $684_N$ to the bleeder-current control sub-unit 6220. For example, the control signal $684_1$, . . . the control signal $684_m$, . . . and the control signal $684_N$ are used to control the switch $634_1$, . . . the switch $634_m$, . . . and the switch $634_N$.

Figure 9:
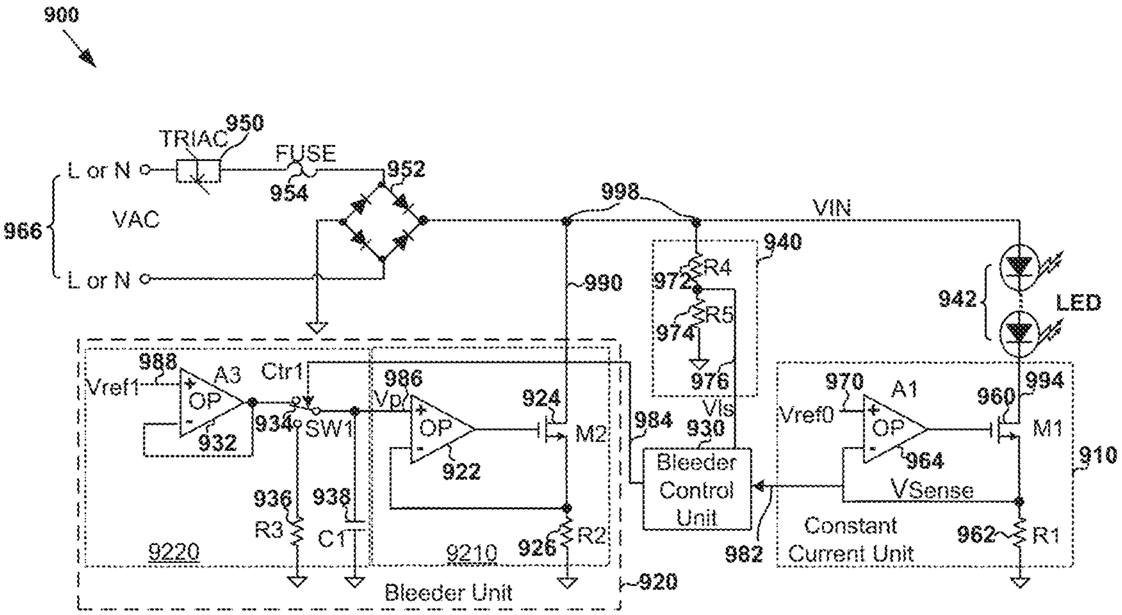
FIG. 9 is a simplified circuit diagram showing an LED lighting system according to some embodiments of the present invention.

FIG. 9 is a simplified circuit diagram showing an LED lighting system according to some embodiments of the present invention. This diagram is merely an example, which should not unduly limit the scope of the claims. One of ordinary skill in the art would recognize many variations, alternatives, and modifications. As shown in FIG. 9, the LED lighting system 900 includes a TRIAC dimmer 950, a rectifying bridge 952 (e.g., a full wave rectifying bridge), a fuse 954, one or more LEDs 942, and a control system. As an example, the control system of the LED lighting system 900 includes a constant current unit 910 (e.g., a current regulator), a bleeder unit 920, a bleeder control unit 930, and a voltage divider 940. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 9, the rectifying bridge 952 (e.g., a full wave rectifying bridge) is coupled to the TRIAC dimmer 950 through the fuse 954, and an AC input voltage 966 (e.g., VAC) is received by the TRIAC dimmer 950 and is also rectified by the rectifying bridge 952 to generate a rectified voltage 998 (e.g., VIN) according to certain embodiments. As an example, the rectified voltage 998 does not fall below the ground voltage (e.g., zero volts).

According to some embodiments, the constant current unit 910 includes two terminals, one of which is coupled to the one or more LEDs 942 and the other of which is coupled to the bleeder control unit 930. As an example, the bleeder control unit 930 includes three terminals, one of which is coupled to the constant current unit 910, one of which is coupled to the bleeder unit 920, and the other of which is coupled to the voltage divider 940. For example, the bleeder unit 920 includes two terminals, one of which is coupled to the bleeder control unit 930 and the other of which is configured to receive the rectified voltage 998 (e.g., VIN). As an example, the voltage divider 940 includes two terminals, one of which is coupled to the bleeder control unit 930 and the other of which is configured to receive the rectified voltage 998 (e.g., VIN).

According to certain embodiments, the bleeder control unit 930 is configured to detect a change of the rectified voltage 998 (e.g., VIN), to detect a phase range within which the TRIAC dimmer 950 is in the conduction state (e.g., on state), and to detect a change of an LED current 994 (e.g., $I_{LED}$) that flows through the one or more LEDs 942. As an example, the bleeder control unit 930 is further configured to allow or not allow the bleeder unit 920 to generate a bleeder current 990 based at least in part on the detected change of the rectified voltage 998 (e.g., VIN), the detected phase range, and the detected change of the LED current 994.

According to some embodiments, the bleeder control unit 930 receives a voltage 976 from the voltage divider 940 and a sensing voltage 982 (e.g., $V_{sense}$) from the constant current unit 310, and generates, based at least in part on the voltage 976 and the sensing voltage 982, a control signal 984 to allow or not allow the bleeder unit 920 to generate the bleeder current 990. As an example, the voltage 976 represents the rectified voltage 998 (e.g., VIN), and the sensing voltage 982 represents the LED current 994 (e.g., $I_{LED}$). For example, the voltage 976 is used to detect a phase range within which the TRIAC dimmer 950 is in the conduction state (e.g., on state) or a phase range within which the TRIAC dimmer 950 is not in the conduction state (e.g., is in the off state).

In certain embodiments, the constant current unit 910 includes a transistor 960, a resistor 962, and an amplifier 964. For example, the amplifier 964 includes two input terminal and an output terminal. As an example, one of the two input terminals receives a reference voltage 970 (e.g., $V_{ref0}$), and the other of the two input terminals is coupled to the resistor 962 and configured to generate the sensing voltage 982 (e.g., $V_{sense}$). For example, the sensing voltage 982 (e.g., $V_{sense}$) is equal to the LED current 994 (e.g., $I_{LED}$) multiplied by the resistance (e.g., $R_1$) of the resistor 962.

In some embodiments, the voltage divider 940 includes resistors 972 and 974. For example, the resistor 972 includes two terminals, and the resistor 974 also includes two terminals. As an example, one terminal of the resistor 972 receives the rectified voltage 998 (e.g., VIN), the other terminal of the resistor 972 is connected to one terminal of the resistor 974 and generates the voltage 976, and the other terminal of the resistor 974 is biased to the ground voltage (e.g., zero volts). For example, the voltage 976 is determined as follows:

$$V_{ls} = \frac{R_5}{R_4 + R_5} \times V_{IN} \quad \text{(Equation 7)}$$

where $V_{ls}$ represents the voltage 976, $R_4$ represents the resistance value of the resistor 972, $R_5$ represents the resistance value of the resistor 974, and $V_{IN}$ represents the rectified voltage 998.

According to certain embodiments, if the voltage 976 indicates that the phase range within which the TRIAC dimmer 950 is in the conduction state (e.g., on state) is smaller than a predetermined conduction phase threshold, the bleeder control unit 930 generates the control signal 984 to allow or not allow the bleeder unit 920 to generate the bleeder current 990 depending on the comparison between the voltage 976 (e.g., $V_{ls}$) and a predetermined threshold voltage (e.g., $V_{th1}$). For example, if the voltage 976 indicates that the phase range within which the TRIAC dimmer 950 is in the conduction state (e.g., on state) is smaller than the predetermined conduction phase threshold, the bleeder control unit 930 generates the control signal 984 to not allow the bleeder unit 920 to generate the bleeder current 990 if the voltage 976 (e.g., $V_{ls}$) is larger than the predetermined threshold voltage (e.g., $V_{th1}$). As an example, if the voltage 976 indicates that the phase range within which the TRIAC dimmer 950 is in the conduction state (e.g., on state) is smaller than the predetermined conduction phase threshold, the bleeder control unit 930 generates the control signal 984 to allow the bleeder unit 920 to generate the bleeder current 990 if the voltage 976 (e.g., $V_{ls}$) is smaller than the predetermined threshold voltage (e.g., $V_{th1}$).

According to some embodiments, if the voltage 976 indicates that the phase range within which the TRIAC dimmer 950 is in the conduction state (e.g., on state) is larger than the predetermined conduction phase threshold, the bleeder control unit 930 generates the control signal 984 to allow or not allow the bleeder unit 920 to generate the bleeder current 990 depending on the comparison between the sensing voltage 982 (e.g., $V_{sense}$) and a predetermined threshold voltage (e.g., $V_{th2}$). In certain examples, if the voltage 976 indicates that the phase range within which the TRIAC dimmer 950 is in the conduction state (e.g., on state) is larger than the predetermined conduction phase threshold, the bleeder control unit 930 generates the control signal 984 to not allow the bleeder unit 920 to generate the bleeder current 990 if the sensing voltage 982 (e.g., $V_{sense}$) is larger than the predetermined threshold voltage (e.g., $V_{th2}$). For example, the sensing voltage 982 (e.g., $V_{sense}$) being larger than the predetermined threshold voltage (e.g., $V_{th2}$) represents the LED current 994 being higher than a threshold current (e.g., a holding current of the TRIAC dimmer 950). As an example, the bleeder control unit 930 outputs the control signal 984 to the bleeder unit 920, and the control signal 984 does not allow the bleeder unit 920 to generate the bleeder current 990.

In some examples, if the voltage 976 indicates that the phase range within which the TRIAC dimmer 950 is in the conduction state (e.g., on state) is larger than the predetermined conduction phase threshold, the bleeder control unit 930 generates the control signal 984 to allow the bleeder unit 920 to generate the bleeder current 990 if the sensing voltage 982 (e.g., $V_{sense}$) is smaller than the predetermined threshold voltage (e.g., $V_{th2}$). For example, the sensing voltage 982 (e.g., $V_{sense}$) being smaller than the predetermined threshold voltage (e.g., $V_{th2}$) represents the LED current 994 being lower than the threshold current (e.g., a holding current of the TRIAC dimmer 950). As an example, the bleeder control unit 930 outputs the control signal 984 to the bleeder unit 920, and the control signal 984 allows the bleeder unit 920 to generate the bleeder current 990.

As shown in FIG. 9, the bleeder unit 920 receives the control signal 984 from the bleeder control unit 930, and if the control signal 984 allows the bleeder unit 920 to generate the bleeder current 990, the bleeder unit 920 generates the bleeder current 990 so that the TRIAC dimmer 950 can operate properly according to certain embodiments.

In some examples, the bleeder unit 920 includes a bleeder-current generation sub-unit 9210 and a bleeder-current control sub-unit 9220. As an example, the bleeder-current generation sub-unit 9210 includes an amplifier 922, a transistor 924, and a resistor 926. In certain examples, the bleeder-current control sub-unit 9220 includes an amplifier 932, a switch 934, a resistor 936, and a capacitor 938. For example, if the transistor 924 is in the saturation region, the bleeder current 990 is determined as follows:

$$I_{bleed} = \frac{V_p}{R_2} \quad \text{(Equation 8)}$$

where $I_{bleed}$ represents the bleeder current 990, $V_p$ represents a voltage 986 received by the amplifier 922, and $R_2$ represents the resistance value of the resistor 926.

In certain examples, the amplifier 922 includes a positive input terminal (e.g., the "+" terminal) and a negative input terminal (e.g., the "–" terminal). For example, the voltage 986 is received by the positive input terminal of the amplifier 922. As an example, the voltage 986 is controlled by the switch 934, which makes the voltage 986 equal to either the ground voltage (e.g., zero volts) or a reference voltage 988 (e.g., $V_{ref1}$). For example, the reference voltage 988 is received by the amplifier 932 and is larger than zero volts.

According to some embodiments, if the voltage 976 indicates that the phase range within which the TRIAC dimmer 950 is in the conduction state (e.g., on state) is smaller than the predetermined conduction phase threshold and the voltage 976 (e.g., $V_{ls}$) is smaller than the predetermined threshold voltage (e.g., $V_{th1}$) or if the voltage 976 indicates that the phase range within which the TRIAC dimmer 950 is in the conduction state (e.g., on state) is larger than the predetermined conduction phase threshold and the sensing voltage 982 (e.g., $V_{sense}$) is smaller than the predetermined threshold voltage (e.g., $V_{th2}$), the control signal 984 received by the bleeder unit 920 sets the switch 934 so that the positive input terminal (e.g., the "+" terminal) of the amplifier 922 is biased to the reference voltage 988 through the amplifier 932.

According to certain embodiments, if the voltage 976 indicates that the phase range within which the TRIAC dimmer 950 is in the conduction state (e.g., on state) is smaller than the predetermined conduction phase threshold and the voltage 976 (e.g., $V_{ls}$) is larger than the predetermined threshold voltage (e.g., $V_{th1}$) or if the voltage 976 indicates that the phase range within which the TRIAC dimmer 950 is in the conduction state (e.g., on state) is larger than the predetermined conduction phase threshold and the sensing voltage 982 (e.g., $V_{sense}$) is larger than the predetermined threshold voltage (e.g., $V_{th2}$), the control signal 984 received by the bleeder unit 920 sets the switch 934 so that the positive input terminal (e.g., the "+" terminal) of the amplifier 922 is biased to the ground voltage through the resistor 936.

In some embodiments, if the voltage 976 indicates that the phase range within which the TRIAC dimmer 950 is in the conduction state (e.g., on state) is larger than or equal to the predetermined conduction phase threshold and the sensing voltage 982 (e.g., $V_{sense}$) is smaller than the predetermined threshold voltage (e.g., $V_{th2}$), the control signal 984 received by the bleeder unit 920 sets the switch 934 so that the positive input terminal (e.g., the "+" terminal) of the amplifier 922 is biased to the reference voltage 988 through the amplifier 932. In certain embodiments, if the voltage 976 indicates that the phase range within which the TRIAC dimmer 950 is in the conduction state (e.g., on state) is larger than or equal to the predetermined conduction phase threshold and the sensing voltage 982 (e.g., $V_{sense}$) is larger than the predetermined threshold voltage (e.g., $V_{th2}$), the control signal 984 received by the bleeder unit 920 sets the switch 934 so that the positive input terminal (e.g., the "+" terminal) of the amplifier 922 is biased to the ground voltage through the resistor 936.

According to certain embodiments, the control signal 984, through the switch 934, changes the voltage 986 from being equal to the reference voltage 988 (e.g., larger than zero volts) to being equal to the ground voltage (e.g., equal to zero volts) so that the bleeder current 990 changes from being larger than zero to being equal to zero. As shown in FIG. 9, the resistor 936 and the capacitor 938 are parts of an RC filtering circuit, which slows down the decrease of the voltage 986 from the reference voltage 988 (e.g., larger than zero volts) to the ground voltage (e.g., equal to zero volts) and also slows down the decrease of the bleeder current 990 from being larger than zero to being equal to zero according to some embodiments. For example, the bleeder unit 920 is configured to turning off the bleeder current 990 gradually (e.g., slowly) during a predetermined time duration, and the length of the predetermined time duration depends on the resistance of the resistor 936 and the capacitance of the capacitor 938.

According to some embodiments, the control signal 984, through the switch 934, changes the voltage 986 from being equal to the ground voltage (e.g., equal to zero volts) to being equal to the reference voltage 988 (e.g., larger than zero volts) so that the bleeder current 990 changes from being equal to zero to being larger than zero in order to for the TRIAC dimmer 950 to operate properly. For example, when the voltage 986 is biased to the reference voltage 988 (e.g., larger than zero volts), if the transistor 924 is in the saturation region, the bleeder current 990 is determined as follows:

$$I_{bleed} = \frac{V_{ref1}}{R_2} \quad \text{(Equation 9)}$$

where $I_{bleed}$ represents the bleeder current 990, $V_{ref1}$ represents the reference voltage 988, and $R_2$ represents the resistance value of the resistor 926.

Figure 10:
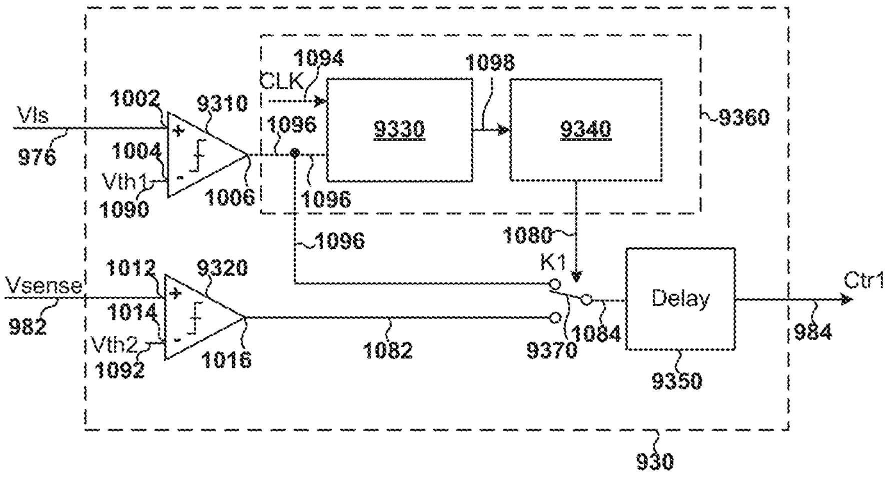
FIG. 10 is a simplified circuit diagram showing the bleeder control unit of the LED lighting system as shown in FIG. 9 according to certain embodiments of the present invention.

FIG. 10 is a simplified circuit diagram showing the bleeder control unit 930 of the LED lighting system 900 as shown in FIG. 9 according to certain embodiments of the present invention. This diagram is merely an example, which should not unduly limit the scope of the claims. One of ordinary skill in the art would recognize many variations, alternatives, and modifications. As shown in FIG. 10, the bleeder control unit 930 includes comparators 9310 and 9320, a delay sub-unit 9350, a conduction phase determination sub-unit 9360 (e.g., a conduction phase detector), and a switch 9370. Although the above has been shown using a selected group of components for the bleeder control unit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the comparator 9310 includes input terminals 1002 and 1004 and an output terminal 1006. As an example, the input terminal 1002 receives the voltage 976 (e.g., $V_{ls}$), and the input terminal 1004 receives a threshold voltage 1090 (e.g., $V_{th1}$). In certain examples, if the voltage 976 (e.g., $V_{ls}$) is larger than the threshold voltage 1090 (e.g., $V_{th1}$), the TRIAC dimmer 950 is in the conduction state (e.g., on state). In some examples, if the voltage 976 (e.g., $V_{ls}$) is smaller than the threshold voltage 1090 (e.g., $V_{th1}$), the TRIAC dimmer 950 is not in the conduction state (e.g., is in the off state).

In certain embodiments, the comparator 9310 compares the voltage 976 (e.g., $V_{ls}$) and the threshold voltage 1090 (e.g., $V_{th1}$) and generates a comparison signal 1096. For example, if the voltage 976 (e.g., $V_{ls}$) is larger than the threshold voltage 1090 (e.g., $V_{th1}$), the comparator 9310 generates the comparison signal 1096 at a logic high level. As an example, if the voltage 976 (e.g., $V_{ls}$) is smaller than the threshold voltage 1090 (e.g., $V_{th1}$), the comparator 9310 generates the comparison signal 1096 at a logic low level. In some embodiments, if the voltage 976 (e.g., $V_{ls}$) changes from being smaller than the threshold voltage 1090 (e.g., $V_{th1}$) to being larger than the threshold voltage 1090 (e.g., $V_{th1}$), the comparison signal 1096 changes from the logic low level to the logic high level. As an example, the comparator 9310 outputs the comparison signal 1096 at the output terminal 1006.

According to some embodiments, the comparator 9320 includes input terminals 1012 and 1014 and an output terminal 1016. As an example, the input terminal 1012 receives the sensing voltage 982 (e.g., $V_{sense}$), and the input terminal 1014 receives a threshold voltage 1092 (e.g., $V_{th2}$). For example, the threshold voltage 1092 (e.g., $V_{th2}$) is smaller than the reference voltage 970 (e.g., $V_{ref0}$) for the constant current unit 910. As an example, the threshold voltage 1092 (e.g., $V_{th2}$) is equal to the threshold current (e.g., the holding current of the TRIAC dimmer 950) multiplied by the resistance (e.g., $R_1$) of the resistor 962. In certain examples, if the sensing voltage 982 (e.g., $V_{sense}$) is larger than the threshold voltage 1092 (e.g., $V_{th2}$), the LED current 994 is larger than the threshold current (e.g., the holding current of the TRIAC dimmer 950). In some examples, if the sensing voltage 982 (e.g., $V_{sense}$) is smaller than the threshold voltage 1092 (e.g., $V_{th2}$), the LED current 994 is smaller than the threshold current (e.g., the holding current of the TRIAC dimmer 950).

According to certain embodiments, the comparator 9320 compares the sensing voltage 982 (e.g., $V_{sense}$) and the threshold voltage 1092 (e.g., $V_{th2}$) and generates a comparison signal 1082. For example, if the sensing voltage 982 (e.g., $V_{sense}$) is larger than the threshold voltage 1092 (e.g., $V_{th2}$), the comparator 9320 generates the comparison signal 1082 at a logic high level. As an example, if the sensing voltage 982 (e.g., $V_{sense}$) is smaller than the threshold voltage 1092 (e.g., $V_{th2}$), the comparator 9320 generates the comparison signal 1082 at a logic low level. In some embodiments, if the sensing voltage 982 (e.g., $V_{sense}$) changes from being smaller than the threshold voltage 1092 (e.g., $V_{th2}$) to being larger than the threshold voltage 1092 (e.g., $V_{th2}$), the comparison signal 1082 changes from the logic low level to the logic high level. As an example, the comparator 9320 outputs the comparison signal 1082 at the output terminal 1016.

As shown in FIG. 10, the conduction phase determination sub-unit 9360 is configured to receive the comparison signal 1096 from the comparator 9310, compare a predetermined conduction phase threshold and the phase range within which the TRIAC dimmer 950 is in the conduction state (e.g., on state) or compare a predetermined non-conduction phase threshold and the phase range within which the TRIAC dimmer 950 is not in the conduction state (e.g., is in the off state), and generate a detection signal 1080 based at least in part on the comparison, according to some embodiments. For example, the detection signal 1080 is received by the switch 9370, which controls whether the comparison signal 1096 or the comparison signal 1082 is received by the delay sub-unit 9350 as a signal 1084. In certain examples, if the phase range within which the TRIAC dimmer 950 is in the conduction state (e.g., on state) is smaller than the predetermined conduction phase threshold, the comparison signal 1096 is received by the delay sub-unit 9350 as the signal 1084. In some examples, if the phase range within which the TRIAC dimmer 950 is in the conduction state (e.g., on state) is larger than the predetermined conduction phase threshold, the comparison signal 1082 is received by the delay sub-unit 9350 as the signal 1084.

In certain embodiments, the conduction phase determination sub-unit 9360 includes a duration determination component 9330 (e.g., a duration determination device) and a phase detection component 9340 (e.g., a phase detection device). In some examples, the duration determination component 9330 is configured to receive a clock signal 1094 (e.g., CLK) and the comparison signal 1096, and determine, within each cycle of the rectified voltage 998 (e.g., VIN), the time duration during which the comparison signal 1096 indicates that the voltage 976 (e.g., $V_{ls}$) is smaller than the threshold voltage 1090 (e.g., $V_{th1}$) (e.g., during which the TRIAC dimmer 950 is not in the conduction state), and the duration determination component 9330 is further configured to generates a signal 1098 representing the determined time duration. For example, the signal 1098 is received by the phase detection component 9340.

In certain examples, the phase detection component 9340 is configured to receive the signal 1098 representing the determined time duration, determine whether the determined duration is larger than a predetermined duration threshold, and generates the detection signal 1080 based on at least the determined duration and the predetermined duration threshold. For example, the detection signal 1080 is received by the switch 9370. As an example, if the detection signal 1080 indicates that the determined duration is larger than the predetermined duration threshold, the switch 9370 sets the comparison signal 1096 to be the signal 1084 that is received by the delay sub-unit 9350. For example, if the detection signal 1080 indicates that the determined duration is smaller than the predetermined duration threshold, the switch 9370 sets the comparison signal 1082 to be the signal 1084 that is received by the delay sub-unit 9350.

According to certain embodiments, within each cycle of the rectified voltage 998 (e.g., VIN), the time duration during which the voltage 976 (e.g., $V_{ls}$) is smaller than the threshold voltage 1090 (e.g., $V_{th1}$) corresponds to the phase range within which the TRIAC dimmer 950 is not in the conduction state (e.g., is in the off state). According to some embodiments, within each cycle of the rectified voltage 998 (e.g., VIN), the time duration during which the voltage 976 (e.g., $V_{ls}$) is larger than the threshold voltage 1090 (e.g., $V_{th1}$) corresponds to the phase range within which the TRIAC dimmer 950 is in the conduction state (e.g., on state).

In some embodiments, the phase range within which the TRIAC dimmer 950 is in the conduction state (e.g., on state) being smaller than the predetermined conduction phase threshold corresponds to the phase range within which the TRIAC dimmer 950 is not in the conduction state (e.g., is in the off state) being larger than the predetermined non-conduction phase threshold. In certain embodiments, the phase range within which the TRIAC dimmer 950 is in the conduction state (e.g., on state) being larger than the predetermined conduction phase threshold corresponds to the phase range within which the TRIAC dimmer 950 is not in the conduction state (e.g., is in the off state) being smaller than the predetermined non-conduction phase threshold.

According to certain embodiments, the comparison signal 1084 is received by the delay sub-unit 9350, which in response generates the control signal 1084. For example, if the signal 1084 changes from the logic low level to the logic high level, the delay sub-unit 9350, after a predetermined delay (e.g., after $t_d$), changes the control signal 984 from the logic low level to the logic high level. As an example, if the signal 1084 changes from the logic high level to the logic low level, the delay sub-unit 9350, without any predetermined delay (e.g., without $t_d$), changes the control signal 984 from the logic high level to the logic low level.

As shown in FIG. 9, if the control signal 984 is at the logic high level, the switch 934 is set to bias the voltage 986 to the ground voltage (e.g., being equal to zero volts), and if the control signal 984 is at the logic low level, the switch 934 is set to bias the voltage 986 to the reference voltage 988 (e.g., being larger than zero volts), according to some embodiments. For example, if the control signal 984 changes from the logic high level to the logic low level, the voltage 986 changes from the ground voltage (e.g., being equal to zero volts) to the reference voltage 988 (e.g., being larger than zero volts). As an example, if the control signal 984 changes from the logic low level to the logic high level, the voltage 986 changes from the reference voltage 988 (e.g., being larger than zero volts) to the ground voltage (e.g., being equal to zero volts).

In certain embodiments, if the voltage 976 indicates that the phase range within which the TRIAC dimmer 950 is in the conduction state (e.g., on state) is smaller than the predetermined conduction phase threshold and the voltage 976 (e.g., $V_{ls}$) changes from being smaller than the predetermined threshold voltage (e.g., $V_{th1}$) to being larger than the predetermined threshold voltage (e.g., $V_{th1}$) or if the voltage 976 indicates that the phase range within which the TRIAC dimmer 950 is in the conduction state (e.g., on state) is larger than the predetermined conduction phase threshold and the sensing voltage 982 (e.g., $V_{sense}$) changes from being smaller than the predetermined threshold voltage (e.g., $V_{th2}$) to being larger than the predetermined threshold voltage (e.g., $V_{th2}$), the bleeder current 990, after the predetermined delay (e.g., after $t_d$), changes gradually (e.g., slowly) from being larger than zero to being equal to zero during the predetermined time duration. For example, the predetermined delay (e.g., $t_d$) is provided by the delay sub-unit 9350. As an example, the length of the predetermined time duration depends on the resistance of the resistor 936 and the capacitance of the capacitor 938.

In some embodiments, if the voltage 976 indicates that the phase range within which the TRIAC dimmer 950 is in the conduction state (e.g., on state) is smaller than the predetermined conduction phase threshold and the voltage 976 (e.g., $V_{ls}$) changes from being larger than the predetermined threshold voltage (e.g., $V_{th1}$) to being smaller than the predetermined threshold voltage (e.g., $V_{th1}$) or if the voltage 976 indicates that the phase range within which the TRIAC dimmer 950 is in the conduction state (e.g., on state) is larger than the predetermined conduction phase threshold and the sensing voltage 982 (e.g., $V_{sense}$) changes from being larger than the predetermined threshold voltage (e.g., $V_{th2}$) to being smaller than the predetermined threshold voltage (e.g., $V_{th2}$), the bleeder current 990, without any predetermined delay (e.g., without $t_d$), changes from being equal to zero to being larger than zero.

Figure 11:
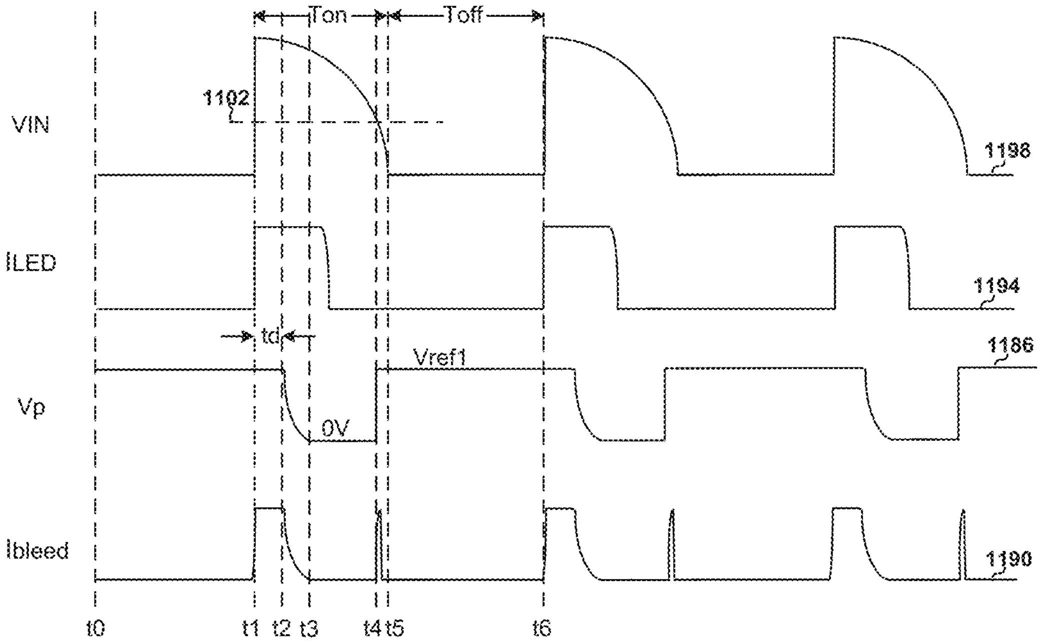
FIG. 11 shows simplified timing diagrams for the LED lighting system as shown in FIG. 9 if the phase range within which the TRIAC dimmer is in the conduction state (e.g., on state) is smaller than the predetermined conduction phase threshold according to certain embodiments of the present invention.

FIG. 11 shows simplified timing diagrams for the LED lighting system 900 as shown in FIG. 9 if the phase range within which the TRIAC dimmer 950 is in the conduction state is smaller than the predetermined conduction phase threshold according to certain embodiments of the present invention. These diagrams are merely examples, which should not unduly limit the scope of the claims. One of ordinary skill in the art would recognize many variations, alternatives, and modifications. For example, the waveform 1198 represents the rectified voltage 998 (e.g., VIN) as a function of time if the phase range within which the TRIAC dimmer 950 is in the conduction state (e.g., on state) is smaller than the predetermined conduction phase threshold, the waveform 1194 represents the LED current 994 (e.g., $I_{LED}$) as a function of time if the phase range within which the TRIAC dimmer 950 is in the conduction state (e.g., on state) is smaller than the predetermined conduction phase threshold, the waveform 1186 represents the voltage 986 (e.g., $V_p$) as a function of time if the phase range within which the TRIAC dimmer 950 is in the conduction state (e.g., on state) is smaller than the predetermined conduction phase threshold, and the waveform 1190 represents the bleeder current 990 (e.g., $I_{bleed}$) as a function of time if the phase range within which the TRIAC dimmer 950 is in the conduction state (e.g., on state) is smaller than the predetermined conduction phase threshold.

In some embodiments, when the LED lighting system 900 works properly, the TRIAC dimmer 950 clips parts of a waveform for the AC input voltage 966 (e.g., VAC). In certain examples, from time $t_0$ to time $t_1$, the rectified voltage 998 (e.g., VIN) is at a voltage level that is close or equal to zero volts and is smaller than a threshold voltage 1102, as shown by the waveform 1198, indicating that the voltage 976 (e.g., $V_{ls}$) is also smaller than the predetermined threshold voltage (e.g., $V_{th1}$). For example, the predetermined threshold voltage (e.g., $V_{th1}$) for the voltage 976 (e.g., $V_{ls}$) has the following relationship with the threshold voltage 1102 for the rectified voltage 998 (e.g., VIN):

$$V_{th1} = \frac{R_5}{R_4 + R_5} \times V_{th\_IN} \quad \text{(Equation 10)}$$

where $V_{th1}$ represents the predetermined threshold voltage for the voltage 976 (e.g., $V_{ls}$), $R_4$ represents the resistance value of the resistor 972, $R_5$ represents the resistance value of the resistor 974, and $V_{th\_IN}$ represents the threshold voltage 1102 for the rectified voltage 998 (e.g., VIN).

In some embodiments, at time $t_1$, the rectified voltage 998 (e.g., VIN) changes from being smaller than the threshold voltage 1102 to being larger than the threshold voltage 1102, as shown by the waveform 1198, indicating that the voltage 976 (e.g., $V_{ls}$) changes from being smaller than the predetermined threshold voltage (e.g., $V_{th1}$) to being larger than the predetermined threshold voltage (e.g., $V_{th1}$). In certain embodiments, from time $t_1$ to time $t_4$, the rectified voltage 998 (e.g., VIN) remains larger than the threshold voltage 1102, as shown by the waveform 1198, indicating that the voltage 976 (e.g., $V_{ls}$) also remains larger than the predetermined threshold voltage (e.g., $V_{th1}$).

According to some embodiments, at time $t_4$, the rectified voltage 998 (e.g., VIN) changes from being larger than the threshold voltage 1102 to being smaller than the threshold voltage 1102, as shown by the waveform 1198, indicating that the voltage 976 (e.g., $V_{ls}$) also changes from being larger than the predetermined threshold voltage (e.g., $V_{th1}$) to being smaller than the predetermined threshold voltage (e.g., $V_{th1}$). According to certain embodiments, from time $t_4$ to time $t_5$, the rectified voltage 998 (e.g., VIN) remains smaller than the threshold voltage 1102, as shown by the waveform 1198, indicating that the voltage 976 (e.g., $V_{ls}$) also remains smaller than the predetermined threshold voltage (e.g., $V_{th1}$).

In some embodiments, at time $t_5$, the rectified voltage 998 (e.g., VIN) reaches the voltage level that is close or equal to zero volts and is smaller than the threshold voltage 1102, as shown by the waveform 1198, indicating that the voltage 976 (e.g., $V_{ls}$) also reaches the voltage level that is close or equal to zero volts and is smaller than the predetermined threshold voltage (e.g., $V_{th1}$). In certain embodiments, from time $t_5$ to time $t_6$, similar to from time $t_0$ to time $t_1$, the rectified voltage 998 (e.g., VIN) remains at the voltage level that is close or equal to zero volts and is smaller than the threshold voltage 1102, as shown by the waveform 1198, indicating that the voltage 976 (e.g., $V_{ls}$) also remains smaller than the predetermined threshold voltage (e.g., $V_{th1}$).

As shown in FIG. 11, from time $t_0$ to time $t_1$, the LED current 994 (e.g., $I_{LED}$) is equal to zero in magnitude as shown by the waveform 1194, the voltage 986 (e.g., $V_p$) is equal to the reference voltage 988 and larger than zero in magnitude as shown by the waveform 1186, and the bleeder current 990 is allowed to be generated as shown by the waveform 1190, according to some embodiments. As an example, from time $t_0$ to time $t_1$, the bleeder current 990 is allowed to be generated as shown by the waveform 1190, so the bleeder current 990 remains at zero and then increases in magnitude to a high current level (e.g., being larger than zero) as shown by the waveform 1190.

According to certain embodiments, at time $t_1$, the LED current 994 (e.g., $I_{LED}$) changes from zero to a high current level as shown by the waveform 1194. According to some embodiments, from time $t_1$ to time $t_2$, the LED current 994 (e.g., $I_{LED}$) remains at the high current level as shown by the waveform 1194, the voltage 986 (e.g., $V_p$) remains equal to the reference voltage 988 and larger than zero in magnitude as shown by the waveform 1186, and the bleeder current 990 is at the high current level (e.g., being larger than zero) as shown by the waveform 1190. For example, the time duration from time $t_1$ to time $t_2$ is the predetermined delay (e.g., $t_d$) provided by the delay sub-unit 9350.

In some embodiments, from time $t_2$ to time $t_3$, the LED current 994 (e.g., $I_{LED}$) remains at the high current level as shown by the waveform 1194, the voltage 986 (e.g., $V_p$) changes from being equal to the reference voltage 988 (e.g., larger than zero volts) to being equal to the ground voltage (e.g., equal to zero volts) gradually (e.g., slowly) during the predetermined time duration as shown by the waveform 1186, and the bleeder current 990 also changes from being equal to the high current level (e.g., being larger than zero) to being equal to zero gradually (e.g., slowly) during the predetermined time duration as shown by the waveform 1190. As an example, the time duration from time $t_2$ to time $t_3$ is equal to the predetermined time duration, and the length of the predetermined time duration depends on the resistance of the resistor 936 and the capacitance of the capacitor 938. In certain embodiments, from time $t_3$ to time $t_4$, the LED current 994 (e.g., $I_{LED}$) changes from the high current level to zero as shown by the waveform 1194, the voltage 986 (e.g., $V_p$) remains equal to the ground voltage (e.g., equal to zero volts) as shown by the waveform 1186, and the bleeder current 990 also remains equal to zero as shown by the waveform 1190.

As shown in FIG. 11, from time $t_2$ to time $t_4$, the bleeder current 990 is not allowed to be generated as shown by the waveform 1190, so the bleeder current 990 changes from being equal to the high current level (e.g., being larger than zero) to being equal to zero gradually (e.g., slowly) from time $t_2$ to time $t_3$ (e.g., during the predetermined time duration) and then the bleeder current 990 remains equal to zero from time $t_3$ to time $t_4$ according to certain embodiments.

According to some embodiments, at time $t_4$, the voltage 986 (e.g., $V_p$) changes from being equal to the ground voltage (e.g., being equal to zero volts) to being equal to the reference voltage 988 (e.g., larger than zero volts) as shown by the waveform 1186. According to certain embodiments, from time $t_4$ to time $t_5$, the LED current 994 (e.g., $I_{LED}$) is equal to zero in magnitude as shown by the waveform 1194, the voltage 986 (e.g., $V_p$) remains equal to the reference voltage 988 (e.g., larger than zero volts) as shown by the waveform 1186, and the bleeder current 990 is allowed to be generated as shown by the waveform 1190. For example, from time $t_4$ to time $t_5$, the bleeder current 990 increases but then becomes smaller with the decreasing rectified voltage 998 (e.g., VIN), as shown by the waveform 1190.

According to certain embodiments, from time $t_5$ to time $t_6$, similar to from time $t_0$ to time $t_1$, the LED current 994 (e.g., $I_{LED}$) is equal to zero in magnitude as shown by the waveform 1194, the voltage 986 (e.g., $V_p$) remains equal to the reference voltage 988 and larger than zero in magnitude as shown by the waveform 1186, and the bleeder current 990 is allowed to be generated as shown by the waveform 1190. As an example, from time $t_5$ to time $t_6$, the bleeder current 990 is allowed to be generated as shown by the waveform 1190, so the bleeder current 990 remains at zero and then increases in magnitude to the high current level (e.g., being larger than zero) as shown by the waveform 1190.

As shown in FIG. 9 and FIG. 10, the LED lighting system 900 provides the RC filtering circuit that includes the resistor 936 and the capacitor 938 in order to control how fast the bleeder current 990 changes from being equal to the high current level (e.g., being larger than zero) to being equal to zero according to certain embodiments. In some examples, the bleeder current 990 changes from being equal to the high current level (e.g., being larger than zero) to being equal to zero gradually (e.g., slowly) during the predetermined time duration, and the length of the predetermined time duration depends on the resistance of the resistor 936 and the capacitance of the capacitor 938.

In certain examples, if the voltage 976 indicates that the phase range within which the TRIAC dimmer 950 is in the conduction state (e.g., on state) is smaller than the predetermined conduction phase threshold, the LED lighting system 900 uses the delay sub-unit 9350 as part of the bleeder control unit 930 in order to cause the predetermined delay (e.g., $t_d$) after the voltage 976 (e.g., $V_{ls}$) becomes larger than the predetermined threshold voltage (e.g., $V_{th1}$) but before the voltage 986 starts decreasing from the reference voltage 988 and the bleeder current 990 also starts decreasing from the high current level (e.g., being larger than zero). In some examples, if the voltage 976 indicates that the phase range within which the TRIAC dimmer 950 is in the conduction state (e.g., on state) is larger than the predetermined conduction phase threshold, the LED lighting system 900 uses the delay sub-unit 9350 as part of the bleeder control unit 930 in order to cause the predetermined delay (e.g., $t_d$) after the sensing voltage 982 (e.g., $V_{sense}$) becomes larger than the predetermined threshold voltage (e.g., $V_{th2}$) but before the voltage 986 starts decreasing from the reference voltage 988 and the bleeder current 990 also starts decreasing from the high current level (e.g., being larger than zero).

According to some embodiments, the predetermined delay (e.g., $t_d$) helps to stabilize the conduction state (e.g., on state) of the TRIAC dimmer 950. According to certain embodiments, the gradual (e.g., slow) reduction of the bleeder current 990 during the predetermined time duration helps to reduce (e.g., eliminate) the oscillation of the rectified voltage 998 (e.g., VIN) and also helps to stabilize the LED current 994 (e.g., $I_{LED}$) to reduce (e.g., eliminate) blinking of the one or more LEDs 942.

As shown in FIG. 11, the time duration from time $t_1$ to time $t_5$ (e.g., time duration $T_{on}$) corresponds to the phase range within which the TRIAC dimmer 950 is in the conduction state (e.g., on state), and the time duration from time $t_5$ to time $t_6$ (e.g., time duration $T_{off}$) corresponds to the phase range within which the TRIAC dimmer 950 is not in the conduction state (e.g., is in the off state), according to certain embodiments. In some examples, referring to Equation 10, the bleeder control unit 930 uses the threshold voltage 1090 (e.g., $V_{th1}$) to determine the time when the TRIAC dimmer 950 changes from the conduction state (e.g., on state) to the non-conduction state (e.g., off state). For example, the threshold voltage 1090 (e.g., $V_{th1}$) is larger than zero volts, so time $t_4$ is different from time $t_5$. As an example, for the bleeder control unit 930, the time duration from time $t_1$ to time $t_4$ is determined to represent the phase range within which the TRIAC dimmer 950 is in the conduction state (e.g., on state), and the time duration from time $t_4$ to time $t_6$ is determined to represent the phase range within which the TRIAC dimmer 950 is not in the conduction state (e.g., is in the off state).

In certain embodiments, the LED lighting system 900 as shown in FIGS. 9, 10, and 11 provides one or more advantages. For example, if the phase range within which the TRIAC dimmer 950 is in the conduction state (e.g., on state) is so small that the TRIAC dimmer 950 is in the conduction state (e.g., on state) only when the rectified voltage 998 (e.g., VIN) is small and the sensing voltage 982 (e.g., $V_{sense}$) is smaller than the threshold voltage 1092 (e.g., $V_{th2}$), the LED lighting system 900 does not allow the bleeder current 990 to be generated when the rectified voltage 998 (e.g., VIN) is larger than the threshold voltage 1102. As an example, if the phase range within which the TRIAC dimmer 950 is in the conduction state (e.g., on state) is smaller than the predetermined conduction phase threshold, the LED lighting system 900 allows or does not allow the bleeder current 990 to be generated based on the comparison between the voltage 976 (e.g., $V_{ls}$) and the threshold voltage 1090 (e.g., $V_{th1}$), in order to stabilize the conduction state (e.g., on state) of the TRIAC dimmer 950, stabilize the LED current 994 (e.g., $I_{LED}$), and/or reduce (e.g., eliminate) blinking of the one or more LEDs 942.

Figure 12:
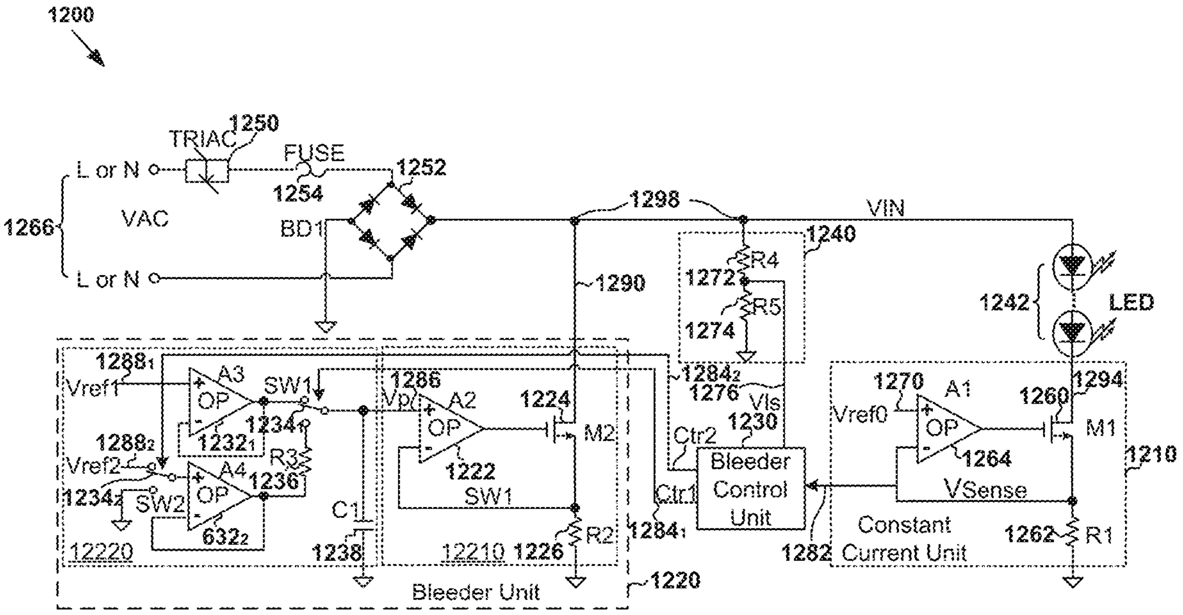
FIG. 12 is a simplified circuit diagram showing an LED lighting system according to certain embodiments of the present invention.

FIG. 12 is a simplified circuit diagram showing an LED lighting system according to certain embodiments of the present invention. This diagram is merely an example, which should not unduly limit the scope of the claims. One of ordinary skill in the art would recognize many variations, alternatives, and modifications. As shown in FIG. 12, the LED lighting system 1200 includes a TRIAC dimmer 1250, a rectifying bridge 1252 (e.g., a full wave rectifying bridge), a fuse 1254, one or more LEDs 1242, and a control system. As an example, the control system of the LED lighting system 1200 includes a constant current unit 1210 (e.g., a current regulator), a bleeder unit 1220, a bleeder control unit 1230, and a voltage divider 1240. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 12, the rectifying bridge 1252 (e.g., a full wave rectifying bridge) is coupled to the TRIAC dimmer 1250 through the fuse 1254, and an AC input voltage 1266 (e.g., VAC) is received by the TRIAC dimmer 1250 and is also rectified by the rectifying bridge 1252 to generate a rectified voltage 1298 (e.g., VIN) according to certain embodiments. As an example, the rectified voltage 1298 does not fall below the ground voltage (e.g., zero volts).

According to some embodiments, the constant current unit 1210 includes two terminals, one of which is coupled to the one or more LEDs 1242 and the other of which is coupled to the bleeder control unit 1230. As an example, the bleeder control unit 1230 includes three terminals, one of which is coupled to the constant current unit 1210, one of which is coupled to the bleeder unit 1220, and the other of which is coupled to the voltage divider 1240. For example, the bleeder unit 1220 includes two terminals, one of which is coupled to the bleeder control unit 1230 and the other of which is configured to receive the rectified voltage 1298 (e.g., VIN).

According to certain embodiments, the bleeder control unit 1230 is configured to detect a change of the rectified voltage 1298 (e.g., VIN), to detect a phase range within which the TRIAC dimmer 1250 is in the conduction state (e.g., on state), and to detect a change of an LED current 1294 (e.g., $I_{LED}$) that flows through the one or more LEDs 1242. As an example, the bleeder control unit 1230 is further configured to allow or not allow the bleeder unit 1220 to generate a bleeder current 1290 based at least in part on the detected change of the rectified voltage 1298 (e.g., VIN), the detected phase range, and the detected change of the LED current 1294.

According to some embodiments, the bleeder control unit 1230 receives a voltage 1276 from the voltage divider 1240 and a sensing voltage 1282 (e.g., $V_{sense}$) from the constant current unit 1210, and generates, based at least in part on the voltage 1276 and the sensing voltage 1282, control signals 1284$_1$ and 1284$_2$ to allow or not allow the bleeder unit 1220 to generate the bleeder current 1290. As an example, the voltage 1276 represents the rectified voltage 1298 (e.g., VIN), and the sensing voltage 1282 represents the LED current 1294 (e.g., $I_{LED}$). For example, the voltage 1276 is used to detect a phase range within which the TRIAC dimmer 1250 is in the conduction state (e.g., on state) or a phase range within which the TRIAC dimmer 1250 is not in the conduction state (e.g., is in the off state).

In some embodiments, the constant current unit 1210 includes a transistor 1260, a resistor 1262, and an amplifier 1264. For example, the amplifier 1264 includes two input terminal and an output terminal. As an example, one of the two input terminals receives a reference voltage 1270 (e.g., $V_{ref0}$), and the other of the two input terminals is coupled to the resistor 1262 and configured to generate the sensing voltage 1282 (e.g., $V_{sense}$). For example, the sensing voltage 1282 (e.g., $V_{sense}$) is equal to the LED current 1294 (e.g., $I_{LED}$) multiplied by the resistance (e.g., $R_1$) of the resistor 1262.

In certain embodiments, the voltage divider 1240 includes resistors 1272 and 1274. For example, the resistor 1272 includes two terminals, and the resistor 1274 also includes two terminals. As an example, one terminal of the resistor 1272 receives the rectified voltage 1298 (e.g., VIN), the other terminal of the resistor 1272 is connected to one terminal of the resistor 1274 and generates the voltage 1276, and the other terminal of the resistor 1274 is biased to the ground voltage (e.g., zero volts). For example, the voltage 1276 is determined as follows:

$$V_{ls} = \frac{R_5}{R_4 + R_5} \times V_{IN} \quad \text{(Equation 11)}$$

where $V_{ls}$ represents the voltage 1276, $R_4$ represents the resistance value of the resistor 1272, $R_5$ represents the resistance value of the resistor 1274, and VIN represents the rectified voltage 1298.

According to certain embodiments, if the voltage 1276 indicates that the phase range within which the TRIAC dimmer 1250 is in the conduction state (e.g., on state) is smaller than a predetermined conduction phase threshold, the bleeder control unit 1230 generates the control signals 1284$_1$ and 1284$_2$ to allow or not allow the bleeder unit 1220 to generate the bleeder current 1290 depending on the comparison between the voltage 1276 (e.g., $V_{ls}$) and a predetermined threshold voltage (e.g., $V_{th1}$). For example, if the voltage 1276 indicates that the phase range within which the TRIAC dimmer 1250 is in the conduction state (e.g., on state) is smaller than the predetermined conduction phase threshold, the bleeder control unit 1230 generates the control signals 1284$_1$ and 1284$_2$ to not allow the bleeder unit 1220 to generate the bleeder current 1290 if the voltage 1276 (e.g., $V_{ls}$) is larger than the predetermined threshold voltage (e.g., $V_{th1}$). As an example, if the voltage 1276 indicates that the phase range within which the TRIAC dimmer 1250 is in the conduction state (e.g., on state) is smaller than the predetermined conduction phase threshold, the bleeder control unit 1230 generates the control signals 1284$_1$ and 1284$_2$ to allow the bleeder unit 1220 to generate the bleeder current 1290 if the voltage 1276 (e.g., $V_{ls}$) is smaller than the predetermined threshold voltage (e.g., $V_{th1}$).

According to some embodiments, if the voltage 1276 indicates that the phase range within which the TRIAC dimmer 1250 is in the conduction state (e.g., on state) is larger than the predetermined conduction phase threshold, the bleeder control unit 1230 generates the control signals 1284$_1$ and 1284$_2$ to allow or not allow the bleeder unit 1220 to generate the bleeder current 1290 depending on the comparison between the sensing voltage 1282 (e.g., $V_{sense}$) and a predetermined threshold voltage (e.g., $V_{th2}$). In certain examples, if the voltage 1276 indicates that the phase range within which the TRIAC dimmer 1250 is in the conduction state (e.g., on state) is larger than the predetermined conduction phase threshold, the bleeder control unit 1230 generates the control signals 1284$_1$ and 1284$_2$ to not allow the bleeder unit 1220 to generate the bleeder current 1290 if the sensing voltage 1282 (e.g., $V_{sense}$) is larger than the predetermined threshold voltage (e.g., $V_{th2}$). For example, the sensing voltage 1282 (e.g., $V_{sense}$) being larger than the predetermined threshold voltage (e.g., $V_{th2}$) represents the LED current 1294 being higher than a threshold current (e.g., a holding current of the TRIAC dimmer 1250). As an example, the bleeder control unit 1230 outputs the control signals 1284$_1$ and 1284$_2$ to the bleeder unit 1220, and the control signals 1284$_1$ and 1284$_2$ do not allow the bleeder unit 1220 to generate the bleeder current 1290.

In some examples, if the voltage 1276 indicates that the phase range within which the TRIAC dimmer 1250 is in the conduction state (e.g., on state) is larger than the predetermined conduction phase threshold, the bleeder control unit 1230 generates the control signals 1284$_1$ and 1284$_2$ to allow the bleeder unit 1220 to generate the bleeder current 1290 if the sensing voltage 1282 (e.g., $V_{sense}$) is smaller than the predetermined threshold voltage (e.g., $V_{th2}$). For example, the sensing voltage 1282 (e.g., $V_{sense}$) being smaller than the predetermined threshold voltage (e.g., $V_{th2}$) represents the LED current 1294 being lower than the threshold current (e.g., a holding current of the TRIAC dimmer 1250). As an example, the bleeder control unit 1230 outputs the control signals 1284$_1$ and 1284$_2$ to the bleeder unit 1220, and the control signals 1284$_1$ and 1284$_2$ allow the bleeder unit 1220 to generate the bleeder current 1290.

In certain embodiments, if the sensing voltage 1282 (e.g., $V_{sense}$) indicates that the LED current 1294 is higher than a threshold current (e.g., a holding current of the TRIAC dimmer 1250), the bleeder control unit 1230 outputs the control signals 1284$_1$ and 1284$_2$ to the bleeder unit 1220, and the control signals 1284$_1$ and 1284$_2$ do not allow the bleeder unit 1220 to generate the bleeder current 1290. In some embodiments, if the sensing voltage 1282 indicates that the LED current 1294 is lower than the threshold current (e.g., a holding current of the TRIAC dimmer 1250), the bleeder control unit 1230 outputs the control signals 1284$_1$ and 1284$_2$ to the bleeder unit 1220, and the control signals 1284$_1$ and 1284$_2$ allow the bleeder unit 1220 to generate the bleeder current 1290. As an example, the bleeder unit 1220 receives the control signals 1284$_1$ and 1284$_2$ from the bleeder control unit 1230, and if the control signals 1284$_1$ and 1284$_2$ allow the bleeder unit 1220 to generate the bleeder current 1290, the bleeder unit 1220 generates the bleeder current 1290 so that the TRIAC dimmer 1250 can operate properly.

As shown in FIG. 12, the bleeder unit 1220 includes a bleeder-current generation sub-unit 12210 and a bleeder-current control sub-unit 12220 according to certain embodiments. In some embodiments, the bleeder-current generation sub-unit 12210 includes an amplifier 1222, a transistor 1224, and a resistor 1226. In certain embodiments, the bleeder-current control sub-unit 12220 includes amplifiers 1232$_1$ and 1232$_2$, switches 1234$_1$ and 1234$_2$, a resistor 1236, and a capacitor 1238.

In certain examples, if the control signal 1284$_1$ is at a logic low level, the positive input terminal (e.g., the "+" terminal) of the amplifier 1222 is coupled to the output terminal of the amplifier 1232$_1$ through the switch 1234$_1$, and if the control signal 1284$_1$ is at a logic high level, the positive input terminal (e.g., the "+" terminal) of the amplifier 1222 is coupled to the output terminal of the amplifier 1232$_2$ through the switch 1234$_1$ and the resistor 1236. In some examples, if the control signal 1284$_2$ is at the logic high level, the positive input terminal (e.g., the "+" terminal) of the amplifier 1232$_2$ is biased to the reference voltage 1288$_2$ (e.g., $V_{ref2}$) through the switch 1234$_2$, and if the control signal 1284$_2$ is at the logic low level, the positive input terminal (e.g., the "+" terminal) of the amplifier 1232$_2$ is biased to the ground voltage (e.g., zero volts) through the switch 1234$_2$.

In some examples, if the transistor 1224 is in the saturation region, the bleeder current 1290 is determined as follows:

$$I_{bleed} = \frac{V_p}{R_2} \quad \text{(Equation 12)}$$

where $I_{bleed}$ represents the bleeder current 1290, $V_p$ represents a voltage 1286 received by the amplifier 1222, and $R_2$ represents the resistance value of the resistor 1226. In certain examples, the amplifier 1222 includes a positive input terminal (e.g., the "+" terminal) and a negative input terminal (e.g., the "−" terminal). For example, the voltage 1286 is received by the positive input terminal of the amplifier 1222. As an example, the voltage 1286 is controlled by the switch 1234$_1$, which makes the voltage 686 equal to either the output voltage of the amplifier 1232$_2$ or a reference voltage 1288$_1$ (e.g., $V_{ref1}$). For example, the reference voltage 1288$_1$ is received by the amplifier 1232$_1$ (e.g., received by the positive terminal of the amplifier 1232$_1$) and is larger than zero volts.

According to some embodiments, if the voltage 1276 indicates that the phase range within which the TRIAC dimmer 1250 is in the conduction state (e.g., on state) is smaller than the predetermined conduction phase threshold and the voltage 1276 (e.g., $V_{ls}$) is smaller than the predetermined threshold voltage (e.g., $V_{th1}$) or if the voltage 1276 indicates that the phase range within which the TRIAC dimmer 1250 is in the conduction state (e.g., on state) is larger than the predetermined conduction phase threshold and the sensing voltage 1282 (e.g., $V_{sense}$) is smaller than the predetermined threshold voltage (e.g., $V_{th2}$), the control signal 1284$_1$ received by the bleeder unit 1220 sets the switch 1234$_1$ so that the positive input terminal (e.g., the "+" terminal) of the amplifier 1222 is biased to the reference voltage 1288$_1$ through the amplifier 1232$_1$ and the bleeder current 1290 is generated (e.g., the bleeder current 1290 being larger than zero in magnitude).

According to certain embodiments, if the voltage 1276 indicates that the phase range within which the TRIAC dimmer 1250 is in the conduction state (e.g., on state) is smaller than the predetermined conduction phase threshold and the voltage 1276 (e.g., $V_{ls}$) is larger than the predetermined threshold voltage (e.g., $V_{th1}$) or if the voltage 1276 indicates that the phase range within which the TRIAC dimmer 1250 is in the conduction state (e.g., on state) is larger than the predetermined conduction phase threshold and the sensing voltage 1282 (e.g., $V_{sense}$) is larger than the predetermined threshold voltage (e.g., $V_{th2}$), the control signal 1284$_1$ received by the bleeder unit 1220 sets the switch 1234$_1$ so that the positive input terminal (e.g., the "+" terminal) of the amplifier 1222 is biased to the output voltage of the amplifier 1232$_2$ through the resistor 1236. As an example, the output voltage of the amplifier 1232$_2$ is lower than the reference voltage 1288$_1$ but still larger than zero volts. For example, if the voltage 1286 is equal to the output voltage of the amplifier 1232$_2$, the bleeder current 1290 is generated (e.g., the bleeder current 1290 being larger than zero in magnitude) but is smaller than the bleeder current 1290 generated when the voltage 1286 is equal to the reference voltage 1288$_1$.

In some embodiments, if the voltage 1276 indicates that the phase range within which the TRIAC dimmer 1250 is in the conduction state (e.g., on state) is larger than or equal to the predetermined conduction phase threshold and the sensing voltage 1282 (e.g., $V_{sense}$) is smaller than the predetermined threshold voltage (e.g., $V_{th2}$), the control signal 1284$_1$ received by the bleeder unit 1220 sets the switch 1234$_1$ so that the positive input terminal (e.g., the "+" terminal) of the amplifier 1222 is biased to the reference voltage 1288$_1$ through the amplifier 1232$_1$ and the bleeder current 1290 is generated (e.g., the bleeder current 1290 being larger than zero in magnitude). In other embodiment, if the voltage 1276 indicates that the phase range within which the TRIAC dimmer 1250 is in the conduction state (e.g., on state) is larger than or equal to the predetermined conduction phase threshold and the sensing voltage 1282 (e.g., $V_{sense}$) is larger than the predetermined threshold voltage (e.g., $V_{th2}$), the control signal 1284$_1$ received by the bleeder unit 1220 sets the switch 1234$_1$ so that the positive input terminal (e.g., the "+" terminal) of the amplifier 1222 is biased to the output voltage of the amplifier 1232$_2$ through the resistor 1236.

In certain embodiments, the control signal 1284$_1$, through the switch 1234$_1$, changes the voltage 1286 from being equal to the reference voltage 1288$_1$ (e.g., larger than zero volts) to being equal to the output voltage of the amplifier 1232$_2$ (e.g., lower than the reference voltage 1288$_1$ but still larger than zero volts) so that the bleeder current 1290 changes from being equal to a larger magnitude to being equal to a smaller magnitude (e.g., a smaller magnitude that is larger than zero). As shown in FIG. 12, the resistor 1236 and the capacitor 1238 are parts of an RC filtering circuit, which slows down the decrease of the voltage 1286 from the reference voltage 1288$_1$ to the output voltage of the amplifier 1232$_2$ (e.g., lower than the reference voltage 1288$_1$ but still larger than zero volts) and also slows down the decrease of the bleeder current 1290 from being equal to the larger magnitude to being equal to the smaller magnitude (e.g., the smaller magnitude that is larger than zero) according to some embodiments. For example, the bleeder unit 1220 is configured to reduce the bleeder current 1290 gradually (e.g., slowly) during a predetermined time duration, and the length of the predetermined time duration depends on the resistance of the resistor 1236 and the capacitance of the capacitor 1238.

In certain embodiments, the control signal 1284$_1$, through the switch 1234$_1$, changes the voltage 1286 from being equal to the output voltage of the amplifier 1232$_2$ (e.g., lower than the reference voltage 1288$_1$) to being equal to the reference voltage 1288$_1$ (e.g., larger than zero volts) so that the bleeder current 1290 changes from being equal to the smaller magnitude to being equal to the larger magnitude in order to for the TRIAC dimmer 1250 to operate properly. In some examples, when the voltage 1286 is biased to the reference voltage 1288$_1$ (e.g., larger than zero volts), if the transistor 1224 is in the saturation region, the bleeder current 1290 is determined as follows:

$$I_{bleed} = \frac{V_{ref1}}{R_2} \quad \text{(Equation 13)}$$

where $I_{bleed}$ represents the bleeder current 1290, $V_{ref1}$ represents the reference voltage 1288$_1$, and $R_2$ represents the resistance value of the resistor 1226.

According to some embodiments, if the voltage 1276 indicates that the phase range within which the TRIAC dimmer 1250 is in the conduction state (e.g., on state) is smaller than the predetermined conduction phase threshold and the voltage 1276 (e.g., $V_{ls}$) is smaller than the predetermined threshold voltage (e.g., $V_{th1}$) or if the voltage 1276 indicates that the phase range within which the TRIAC dimmer 1250 is in the conduction state (e.g., on state) is larger than the predetermined conduction phase threshold and the sensing voltage 1282 (e.g., $V_{sense}$) is smaller than the predetermined threshold voltage (e.g., $V_{th2}$), the control signal 1284$_2$ received by the bleeder unit 1220 sets the switch 1234$_2$ so that the output terminal of the amplifier 1232$_2$ is biased to a reference voltage 1288$_2$ (e.g., $V_{ref2}$) through the amplifier 1232$_2$. For example, the reference voltage 1288$_2$ is received by the amplifier 1232$_2$ (e.g., received by the positive terminal of the amplifier 1232$_2$) and is larger than zero volts. As an example, the reference voltage 1288$_2$ is smaller than the reference voltage 1288$_1$. For example, if the voltage 1286 is set to being equal to the output voltage of the amplifier 1232$_2$ and the output terminal of the amplifier 1232$_2$ is biased to the reference voltage 1288$_2$ through the amplifier 1232$_2$, the voltage 1286 is equal to the reference voltage 1288$_2$.

In some examples, when the voltage 1286 is biased to the reference voltage 1288$_2$ (e.g., larger than zero volts), if the transistor 1224 is in the saturation region, the bleeder current 1290 is determined as follows:

$$I_{bleed} = \frac{V_{ref2}}{R_2} \quad \text{(Equation 14)}$$

where $I_{bleed}$ represents the bleeder current 1290, $V_{ref2}$ represents the reference voltage 1288$_2$, and $R_2$ represents the resistance value of the resistor 1226.

According to certain embodiments, if the voltage 1276 indicates that the phase range within which the TRIAC dimmer 1250 is in the conduction state (e.g., on state) is smaller than the predetermined conduction phase threshold and the voltage 1276 (e.g., $V_{ls}$) is larger than the predetermined threshold voltage (e.g., $V_{th1}$) or if the voltage 1276 indicates that the phase range within which the TRIAC dimmer 1250 is in the conduction state (e.g., on state) is larger than the predetermined conduction phase threshold and the sensing voltage 1282 (e.g., $V_{sense}$) is larger than the predetermined threshold voltage (e.g., $V_{th2}$), the control signal 1284$_2$ received by the bleeder unit 1220 sets the switch 1234$_2$ so that the output terminal of the amplifier 1232$_2$ is biased to the ground voltage (e.g., zero volts). For example, if the voltage 1286 is set to being equal to the output voltage of the amplifier 1232$_2$ and the output terminal of the amplifier 1232$_2$ is biased to the ground voltage (e.g., zero volts), the voltage 1286 is equal to the ground voltage (e.g., zero volts).

In certain embodiments, the control signal 1284$_2$, through the switch 1234$_2$, changes the output voltage of the amplifier 1232$_2$ from being equal to the reference voltage 1288$_2$ to being equal to the ground voltage (e.g., zero volts). As shown in FIG. 12, if the voltage 1286 is set to being equal to the output voltage of the amplifier 1232$_2$, the resistor 1236 and the capacitor 1238 are parts of the RC filtering circuit, which slows down the decrease of the voltage 1286 from the reference voltage 1288$_2$ to the ground voltage (e.g., zero volts) and also slows down the decrease of the bleeder current 1290 to zero according to some embodiments. For example, the bleeder unit 1220 is configured to reduce the bleeder current 1290 gradually (e.g., slowly) during a predetermined time duration, and the length of the predetermined time duration depends on the resistance of the resistor 1236 and the capacitance of the capacitor 1238.

Figure 13:
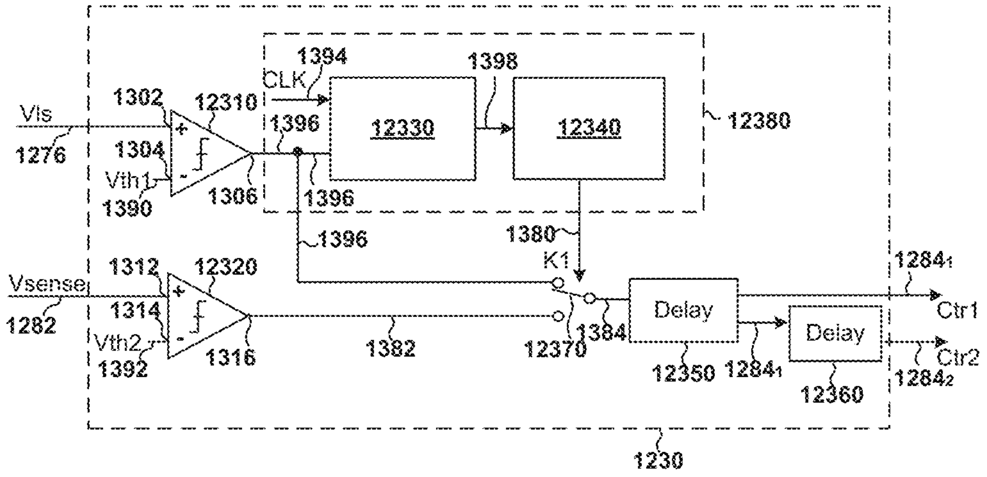
FIG. 13 is a simplified circuit diagram showing the bleeder control unit of the LED lighting system as shown in FIG. 12 according to certain embodiments of the present invention.

FIG. 13 is a simplified circuit diagram showing the bleeder control unit 1230 of the LED lighting system 1200 as shown in FIG. 12 according to certain embodiments of the present invention. This diagram is merely an example, which should not unduly limit the scope of the claims. One of ordinary skill in the art would recognize many variations, alternatives, and modifications. As shown in FIG. 13, the bleeder control unit 1230 includes comparators 12310 and 12320, delay sub-units 12350 and 12360, a conduction phase determination sub-unit 12380 (e.g., a conduction phase detector), and a switch 12370. Although the above has been shown using a selected group of components for the bleeder control unit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the comparator 12310 includes input terminals 1302 and 1304 and an output terminal 1306. As an example, the input terminal 1302 receives the voltage 1276 (e.g., $V_{ls}$), and the input terminal 1304 receives a threshold voltage 1390 (e.g., $V_{th1}$). In certain examples, if the voltage 1276 (e.g., $V_{ls}$) is larger than the threshold voltage 1390 (e.g., $V_{th1}$), the TRIAC dimmer 1250 is in the conduction state (e.g., on state). In some examples, if the voltage 1276 (e.g., $V_{ls}$) is smaller than the threshold voltage 1390 (e.g., $V_{th1}$), the TRIAC dimmer 1250 is not in the conduction state (e.g., is in the off state).

In certain embodiments, the comparator 12310 compares the voltage 1276 (e.g., $V_{ls}$) and the threshold voltage 1390 (e.g., $V_{th1}$) and generates a comparison signal 1396. For example, if the voltage 1276 (e.g., $V_{ls}$) is larger than the threshold voltage 1390 (e.g., $V_{th1}$), the comparator 12310 generates the comparison signal 1396 at a logic high level. As an example, if the voltage 1276 (e.g., $V_{ls}$) is smaller than the threshold voltage 1390 (e.g., $V_{th1}$), the comparator 12310 generates the comparison signal 1396 at a logic low level. In some embodiments, if the voltage 1276 (e.g., $V_{ls}$) changes from being smaller than the threshold voltage 1390 (e.g., $V_{th1}$) to being larger than the threshold voltage 1390 (e.g., $V_{th1}$), the comparison signal 1396 changes from the logic low level to the logic high level. As an example, the comparator 12310 outputs the comparison signal 1396 at the output terminal 1306.

According to some embodiments, the comparator 12320 includes input terminals 1312 and 1314 and an output terminal 1316. As an example, the input terminal 1312 receives the sensing voltage 1282 (e.g., $V_{sense}$), and the input terminal 1314 receives a threshold voltage 1392 (e.g., $V_{th2}$). For example, the threshold voltage 1392 (e.g., $V_{th2}$) is smaller than the reference voltage 1270 (e.g., $V_{ref0}$) for the constant current unit 1210. As an example, the threshold voltage 1392 (e.g., $V_{th2}$) is equal to the threshold current (e.g., the holding current of the TRIAC dimmer 1250) multiplied by the resistance (e.g., $R_1$) of the resistor 1262. In certain examples, if the sensing voltage 1282 (e.g., $V_{sense}$) is larger than the threshold voltage 1392 (e.g., $V_{th}$), the LED current 1294 is larger than the threshold current (e.g., the holding current of the TRIAC dimmer 1250). In some examples, if the sensing voltage 1282 (e.g., $V_{sense}$) is smaller than the threshold voltage 1392 (e.g., $V_{th2}$), the LED current 1294 is smaller than the threshold current (e.g., the holding current of the TRIAC dimmer 1250).

According to certain embodiments, the comparator 12320 compares the sensing voltage 1282 (e.g., $V_{sense}$) and the threshold voltage 1392 (e.g., $V_{th2}$) and generates a comparison signal 1382. For example, if the sensing voltage 1282 (e.g., $V_{sense}$) is larger than the threshold voltage 1392 (e.g., $V_{th2}$), the comparator 12320 generates the comparison signal 1382 at a logic high level. As an example, if the sensing voltage 1282 (e.g., $V_{sense}$) is smaller than the threshold voltage 1392 (e.g., $V_{th2}$), the comparator 12320 generates the comparison signal 1382 at a logic low level. In some embodiments, if the sensing voltage 1282 (e.g., $V_{sense}$) changes from being smaller than the threshold voltage 1392 (e.g., $V_{th2}$) to being larger than the threshold voltage 1392 (e.g., $V_{th2}$), the comparison signal 1382 changes from the logic low level to the logic high level. As an example, the comparator 12320 outputs the comparison signal 1382 at the output terminal 1316.

As shown in FIG. 13, the conduction phase determination sub-unit 12380 is configured to receive the comparison signal 1396 from the comparator 12310, compare a predetermined conduction phase threshold and the phase range within which the TRIAC dimmer 1250 is in the conduction state (e.g., on state) or compare a predetermined non-conduction phase threshold and the phase range within which the TRIAC dimmer 1250 is not in the conduction state (e.g., is in the off state), and generate a detection signal 1380 based at least in part on the comparison, according to some embodiments. For example, the detection signal 1380 is received by the switch 12370, which controls whether the comparison signal 1396 or the comparison signal 1382 is received by the delay sub-unit 12350 as a signal 1384. In certain examples, if the phase range within which the TRIAC dimmer 1250 is in the conduction state (e.g., on state) is smaller than the predetermined conduction phase threshold, the comparison signal 1396 is received by the delay sub-unit 12350 as the signal 1384. In some examples, if the phase range within which the TRIAC dimmer 1250 is in the conduction state (e.g., on state) is larger than the predetermined conduction phase threshold, the comparison signal 1382 is received by the delay sub-unit 12350 as the signal 1384.

In certain embodiments, the conduction phase determination sub-unit 12380 includes a duration determination component 12330 (e.g., a duration determination device) and a phase detection component 12340 (e.g., a phase detection device). In some examples, the duration determination component 12330 is configured to receive a clock signal 1394 (e.g., CLK) and the comparison signal 1396, and determine, within each cycle of the rectified voltage 1298 (e.g., VIN), the time duration during which the comparison signal 1396 indicates that the voltage 1276 (e.g., $V_{ls}$) is smaller than the threshold voltage 1390 (e.g., $V_{th1}$) (e.g., during which the TRIAC dimmer 1250 is not in the conduction state), and the duration determination component 12330 is further configured to generates a signal 1398 representing the determined time duration. For example, the signal 1398 is received by the phase detection component 12340.

In certain examples, the phase detection component 12340 is configured to receive the signal 1398 representing the determined time duration, determine whether the determined duration is larger than a predetermined duration threshold, and generates the detection signal 1380 based on at least the determined duration and the predetermined duration threshold. For example, the detection signal 1380 is received by the switch 12370. As an example, if the detection signal 1380 indicates that the determined duration is larger than the predetermined duration threshold, the switch 12370 sets the comparison signal 1396 to be the signal 1384 that is received by the delay sub-unit 12350. For example, if the detection signal 1380 indicates that the determined duration is smaller than the predetermined duration threshold, the switch 12370 sets the comparison signal 1382 to be the signal 1384 that is received by the delay sub-unit 12350.

According to certain embodiments, within each cycle of the rectified voltage 1298 (e.g., VIN), the time duration during which the voltage 1276 (e.g., $V_{ls}$) is smaller than the threshold voltage 1390 (e.g., $V_{th1}$) corresponds to the phase range within which the TRIAC dimmer 1250 is not in the conduction state (e.g., is in the off state). According to some embodiments, within each cycle of the rectified voltage 1298 (e.g., VIN), the time duration during which the voltage 1276 (e.g., $V_{ls}$) is larger than the threshold voltage 1390 (e.g., $V_{th1}$) corresponds to the phase range within which the TRIAC dimmer 1250 is in the conduction state (e.g., on state).

In some embodiments, the phase range within which the TRIAC dimmer 1250 is in the conduction state (e.g., on state) being smaller than the predetermined conduction phase threshold corresponds to the phase range within which the TRIAC dimmer 1250 is not in the conduction state (e.g., is in the off state) being larger than the predetermined non-conduction phase threshold. In certain embodiments, the phase range within which the TRIAC dimmer 1250 is in the conduction state (e.g., on state) being larger than the predetermined conduction phase threshold corresponds to the phase range within which the TRIAC dimmer 950 is not in the conduction state (e.g., is in the off state) being smaller than the predetermined non-conduction phase threshold.

According to certain embodiments, the signal 1384 is received by the delay sub-unit 12350, which in response generates the control signal 1284$_1$. For example, if the signal 1384 changes from the logic low level to the logic high level, the delay sub-unit 12350, after a predetermined delay (e.g., after tai), changes the control signal 1284$_1$ from the logic low level to the logic high level. As an example, if the signal 1384 changes from the logic high level to the logic low level, the delay sub-unit 12350, without any predetermined delay (e.g., without tai), changes the control signal 1284$_1$ from the logic high level to the logic low level.

According to certain embodiments, the control signal 1284$_1$ is received by the delay sub-unit 12360, which in response generates the control signal 1284$_2$. For example, if the control signal 1284$_1$ changes from the logic low level to the logic high level, the delay sub-unit 12360, after a predetermined delay (e.g., after $t_{d2}$), changes the control signal 1284$_2$ from the logic high level to the logic low level. As an example, if the control signal 1284$_1$ changes from the logic high level to the logic low level, the delay sub-unit 12360, without any predetermined delay (e.g., without $t_{d2}$), changes the control signal 1284$_2$ from the logic low level to the logic high level.

According to some embodiments, if the signal 1384 changes from the logic low level to the logic high level, the control signal 1284$_1$, after a predetermined delay (e.g., after $t_{d1}$), changes from the logic low level to the logic high level, and the control signal 1284$_2$, after two predetermined delays (e.g., after both tai and $t_{d2}$), changes from the logic high level to the logic low level. According to certain embodiments, if the signal 1384 changes from the logic high level to the logic low level, the control signal 1284$_1$, without any predetermined delay, changes from the logic high level to the logic low level, and the control signal 1284$_2$, without any predetermined delay, changes from the logic low level to the logic high level.

As shown in FIG. 12, if the control signal 1284$_1$ is at the logic high level, the switch 1234$_1$ is set to bias the voltage 1286 to the output voltage of the amplifier 1232$_2$, and if the control signal 1284$_1$ is at the logic low level, the switch 1234$_1$ is set to bias the voltage 1286 to the reference voltage 1288$_1$ (e.g., being larger than zero volts), according to some embodiments. For example, if the control signal 1284$_1$ changes from the logic high level to the logic low level, the voltage 1286 changes from the output voltage of the amplifier 1232$_2$ to the reference voltage 1288$_1$ (e.g., being larger than zero volts). As an example, if the control signal 1284$_1$ changes from the logic low level to the logic high level, the voltage 1286 changes from the reference voltage 1288$_1$ (e.g., being larger than zero volts) to the output voltage of the amplifier 1232$_2$.

In certain embodiments, if the voltage 1276 indicates that the phase range within which the TRIAC dimmer 1250 is in the conduction state (e.g., on state) is smaller than the predetermined conduction phase threshold and the voltage 1276 (e.g., $V_{ls}$) changes from being smaller than the predetermined threshold voltage (e.g., $V_{th1}$) to being larger than the predetermined threshold voltage (e.g., $V_{th1}$) or if the voltage 1276 indicates that the phase range within which the TRIAC dimmer 1250 is in the conduction state (e.g., on state) is larger than the predetermined conduction phase threshold and the sensing voltage 1282 (e.g., $V_{sense}$) changes from being smaller than the predetermined threshold voltage (e.g., $V_{th2}$) to being larger than the predetermined threshold voltage (e.g., $V_{th2}$), the bleeder current 1290, after one predetermined delay (e.g., after tai) from the time of change, changes from the larger magnitude to the smaller magnitude (e.g., the smaller magnitude that is larger than zero) during the predetermined time duration, and after two predetermined delays (e.g., after tai and $t_{d2}$) from the time of change, further changes from the smaller magnitude (e.g., the smaller magnitude that is larger than zero) to zero during the predetermined time duration. For example, the predetermined delay $t_{d1}$ is provided by the delay sub-unit 12350, and the predetermined delay $t_{d2}$ is provided by the delay sub-unit 12360. As an example, the falling edge of the control signal 1284$_2$ is delayed from the rising edge of the control signal 1284$_1$ by the predetermined delay $t_{d2}$. For example, the length of the predetermined time duration depends on the resistance of the resistor 1236 and the capacitance of the capacitor 1238.

In some embodiments, if the voltage 1276 indicates that the phase range within which the TRIAC dimmer 1250 is in the conduction state (e.g., on state) is smaller than the predetermined conduction phase threshold and the voltage 1276 (e.g., $V_{ls}$) changes from being larger than the predetermined threshold voltage (e.g., $V_{th1}$) to being smaller than the predetermined threshold voltage (e.g., $V_{th1}$) or if the voltage 1276 indicates that the phase range within which the TRIAC dimmer 1250 is in the conduction state (e.g., on state) is larger than the predetermined conduction phase threshold and the sensing voltage 1282 (e.g., $V_{sense}$) changes from being larger than the predetermined threshold voltage (e.g., $V_{th2}$) to being smaller than the predetermined threshold voltage (e.g., $V_{th2}$), the bleeder current 1290, without any predetermined delay (e.g., without $t_{d1}$ and without $t_{d2}$), changes to a magnitude according to Equation 13.

As shown in FIG. 12 and FIG. 13, two levels of control mechanisms are used by the bleeder-current control sub-unit 12220 so that gradual (e.g., slow) reduction of the bleeder current 1290 is accomplished in two corresponding stages according to certain embodiments. In some examples, the amplifier 1232$_1$ and the switch 1234$_1$, together with the resistor 1236 and the capacitor 1238, are used to implement the first level of control mechanism for the first stage, and the amplifier 1232$_2$ and the switch 1234$_2$, together with the resistor 1236 and the capacitor 1238, are used to implement the second level of control mechanism for the second stage. In certain example, the switch 1234$_1$ is controlled by the control signal 1284$_1$ and the switch 1234$_2$ is controlled by the control signal 1284$_2$, so that the bleeder current 1290 becomes zero in two stages. For example, in the first stage, the voltage 1286 decreases from the reference voltage 1288$_1$ (e.g., $V_{ref1}$) to the reference voltage 1288$_2$ (e.g., $V_{ref2}$) and the bleeder current 1290 decreases from the current level as determined by Equation 13 to the current level as determined by Equation 14. As an example, in the second stage, the voltage 1286 further decreases from the reference voltage $\mathbf{1288}_2$ (e.g., $V_{ref2}$) to the ground voltage (e.g., zero volts) and the bleeder current 1290 further decreases from the current level as determined by Equation 14 to zero.

According to certain embodiments, the LED lighting system 1200 as shown in FIGS. 12 and 13 provides one or more advantages. For example, if the phase range within which the TRIAC dimmer 1250 is in the conduction state (e.g., on state) is so small that the TRIAC dimmer 1250 is in the conduction state (e.g., on state) only when the rectified voltage 1298 (e.g., VIN) is small and the sensing voltage 1282 (e.g., $V_{sense}$) is smaller than the threshold voltage 1392 (e.g., $V_{th2}$), the LED lighting system 1200 does not allow the bleeder current 1290 to be generated when the voltage 1276 (e.g., $V_{ls}$) is larger than the threshold voltage 1390 (e.g., $V_{th1}$). As an example, if the phase range within which the TRIAC dimmer 1250 is in the conduction state (e.g., on state) is smaller than the predetermined conduction phase threshold, the LED lighting system 1200 allows or does not allow the bleeder current 1290 to be generated based on the comparison between the voltage 1276 (e.g., $V_{ls}$) and the threshold voltage 1390 (e.g., $V_{th1}$), in order to stabilize the conduction state (e.g., on state) of the TRIAC dimmer 1250, stabilize the LED current 1294 (e.g., $I_{LED}$), and/or reduce (e.g., eliminate) blinking of the one or more LEDs 1242.

As discussed above and further emphasized here, FIG. 12 and FIG. 13 are merely examples, which should not unduly limit the scope of the claims. One of ordinary skill in the art would recognize many variations, alternatives, and modifications. In some embodiments, N levels of control mechanisms are used by the bleeder-current control sub-unit 12220 so that gradual (e.g., slow) reduction of the bleeder current 1290 is accomplished in N corresponding stages, where N is an integer larger than 1. For example, N is larger than 2. In certain examples, the change of a control signal $\mathbf{1284}_n$ occurs after a delay of tan from the time when the change of a control signal $\mathbf{1284}_{n-1}$ occurs, where n is an integer larger than 1 but smaller than or equal to N. As an example, the change of the control signal $\mathbf{1284}_2$ occurs after the delay of $t_{d2}$ from the time when the change of the control signal $\mathbf{1284}_1$ occurs. For example, the change of the control signal 12843 occurs after a delay of $t_{d3}$ from the time when the change of the control signal $\mathbf{1284}_2$ occurs. As an example, the change of the control signal $\mathbf{684}_N$ occurs after a delay of $t_{dN}$ from the time when the change of the control signal $\mathbf{684}_{N-1}$ occurs.

In certain embodiments, the bleeder-current control sub-unit 12220 includes amplifiers $\mathbf{1232}_1$, . . . , $\mathbf{1232}_k$, . . . , and $\mathbf{1232}_N$, switches $\mathbf{1234}_1$, . . . , $\mathbf{1234}_k$, . . . , and $\mathbf{1234}_N$, the resistor 1236, and the capacitor 1238, where k is an integer larger than 1 but smaller than N. For example, a negative input terminal of the amplifier $\mathbf{1232}_k$ is coupled to an output terminal of the amplifier $\mathbf{632}_k$. As an example, the capacitor 1238 is biased between the voltage 1286 (e.g., $V_p$) and the ground voltage. In some examples, the positive input terminal of the amplifier $\mathbf{1232}_1$ is biased to the reference voltage $\mathbf{1288}_1$ (e.g., $V_{ref1}$). For example, the switch $\mathbf{1234}_1$ is controlled by the control signal $\mathbf{1284}_1$ (e.g., $Ctr_1$) so that the voltage 1286 (e.g., $V_p$) either equals the reference voltage $\mathbf{1288}_1$ (e.g., $V_{ref1}$) to generate the bleeder current 1290 (e.g., $I_{bleed}$) based at least in part on the reference voltage $\mathbf{1288}_1$ (e.g., $V_{ref1}$), or equals the output voltage of the amplifier $\mathbf{1232}_2$ (e.g., through the resistor 1236) to generate the bleeder current 1290 (e.g., $I_{bleed}$) based at least in part on the output voltage of the amplifier $\mathbf{1232}_2$. As an example, the switch $\mathbf{1234}_2$ is controlled by the control signal $\mathbf{1284}_2$ (e.g., $Ctr_2$) so that the voltage 1286 (e.g., $V_p$) either equals the reference voltage $\mathbf{1288}_2$ (e.g., $V_{ref2}$) to generate the bleeder current 1290 (e.g., $I_{bleed}$) based at least in part on the reference voltage $\mathbf{1288}_2$ (e.g., $V_{ref2}$), or equals the output voltage of the amplifier 12323 to generate the bleeder current 1290 (e.g., $I_{bleed}$) based at least in part on the output voltage of the amplifier 12323. For example, the switch $\mathbf{1234}_k$ is controlled by the control signal $\mathbf{1284}_k$ (e.g., $Ctr_k$) so that the voltage 1286 (e.g., $V_p$) either equals the reference voltage $\mathbf{1288}_k$ (e.g., $V_{refk}$) to generate the bleeder current 1290 (e.g., $I_{bleed}$) based at least in part on the reference voltage $\mathbf{1288}_k$ (e.g., $V_{refk}$), or equals the output voltage of the amplifier $\mathbf{1232}_{k+1}$ to generate the bleeder current 1290 (e.g., $I_{bleed}$) based at least in part on the output voltage of the amplifier $\mathbf{1232}_{k+1}$. As an example, the switch $\mathbf{1234}_N$ is controlled by the control signal $\mathbf{1284}_N$ (e.g., $Ctr_N$) so that the voltage 1286 (e.g., $V_p$) either equals the reference voltage $\mathbf{1288}_N$ (e.g., $V_{refN}$) to generate the bleeder current 1290 (e.g., $I_{bleed}$) based at least in part on the reference voltage $\mathbf{1288}_N$ (e.g., $V_{refN}$), or equals the ground voltage (e.g., zero volts) to reduce the bleeder current 1290 (e.g., $I_{bleed}$) to zero. In certain examples, the reference voltage $\mathbf{1288}_j$ (e.g., $V_{refj}$) is larger than zero volts but smaller than the reference voltage $\mathbf{688}_{j+1}$ (e.g., $V_{ref(j+1)}$), where j is an integer larger than 0 but smaller than N.

In some embodiments, the bleeder control unit 1230 includes comparators 12310 and 12320, delay sub-units $\mathbf{12350}_1$, . . . $\mathbf{12350}_m$, . . . and $\mathbf{12350}_N$, the conduction phase determination sub-unit 12380, and the switch 12370, where N is an integer larger than 1 and m is an integer larger than 1 but smaller than N. For example, the delay sub-unit $\mathbf{12350}_1$ is the delay sub-unit 12350 as shown in FIG. 13. As an example, the delay sub-unit $\mathbf{12350}_2$ is the delay sub-unit 12360 as shown in FIG. 13.

In certain examples, the change of the control signal $\mathbf{1284}_1$ occurs after a delay of tai from the time when the change of the signal 1384 occurs, either in response to the phase range within which the TRIAC dimmer 1250 is in the conduction state (e.g., on state) being smaller than the predetermined conduction phase threshold and the voltage 1276 (e.g., $V_{ls}$) changing from being smaller than the predetermined threshold voltage (e.g., $V_{th1}$) to being larger than the predetermined threshold voltage (e.g., $V_{th1}$), or in response to the phase range within which the TRIAC dimmer 1250 is in the conduction state (e.g., on state) being larger than the predetermined conduction phase threshold and the sensing voltage 1282 (e.g., $V_{sense}$) changing from being smaller than the predetermined threshold voltage (e.g., $V_{th2}$) to being larger than the predetermined threshold voltage (e.g., $V_{th2}$).

In some examples, the change of the control signal $\mathbf{1284}_m$ occurs after a delay of tam from the time when the change of the control signal $\mathbf{1284}_{m-1}$ occurs, either in response to the phase range within which the TRIAC dimmer 1250 is in the conduction state (e.g., on state) being smaller than the predetermined conduction phase threshold and the voltage 1276 (e.g., $V_{ls}$) changing from being smaller than the predetermined threshold voltage (e.g., $V_{th1}$) to being larger than the predetermined threshold voltage (e.g., $V_{th1}$), or in response to the phase range within which the TRIAC dimmer 1250 is in the conduction state (e.g., on state) being larger than the predetermined conduction phase threshold and the sensing voltage 1282 (e.g., $V_{sense}$) changing from being smaller than the predetermined threshold voltage (e.g., $V_{th2}$) to being larger than the predetermined threshold voltage (e.g., $V_{th2}$).

In certain examples, the change of the control signal $1284_N$ occurs after a delay of $t_{dN}$ from the time when the change of the control signal $1284_{N-1}$ occurs, either in response to the phase range within which the TRIAC dimmer 1250 is in the conduction state (e.g., on state) being smaller than the predetermined conduction phase threshold and the voltage 1276 (e.g., $V_{ls}$) changing from being smaller than the predetermined threshold voltage (e.g., $V_{th1}$) to being larger than the predetermined threshold voltage (e.g., $V_{th1}$), or in response to the phase range within which the TRIAC dimmer 1250 is in the conduction state (e.g., on state) being larger than the predetermined conduction phase threshold and the sensing voltage 1282 (e.g., $V_{sense}$) changing from being smaller than the predetermined threshold voltage (e.g., $V_{th2}$) to being larger than the predetermined threshold voltage (e.g., $V_{th2}$).

In some embodiments, the bleeder control unit 1230 outputs the control signal $1284_1$, . . . the control signal $1284_m$, . . . and the control signal $1284_N$ to the bleeder-current control sub-unit 12220. For example, the control signal $1284_1$, . . . the control signal $1284_m$, . . . and the control signal $1284_N$ are used to control the switch $1234_1$, . . . the switch $1234_m$, . . . and the switch $1234_N$.

Figure 14:
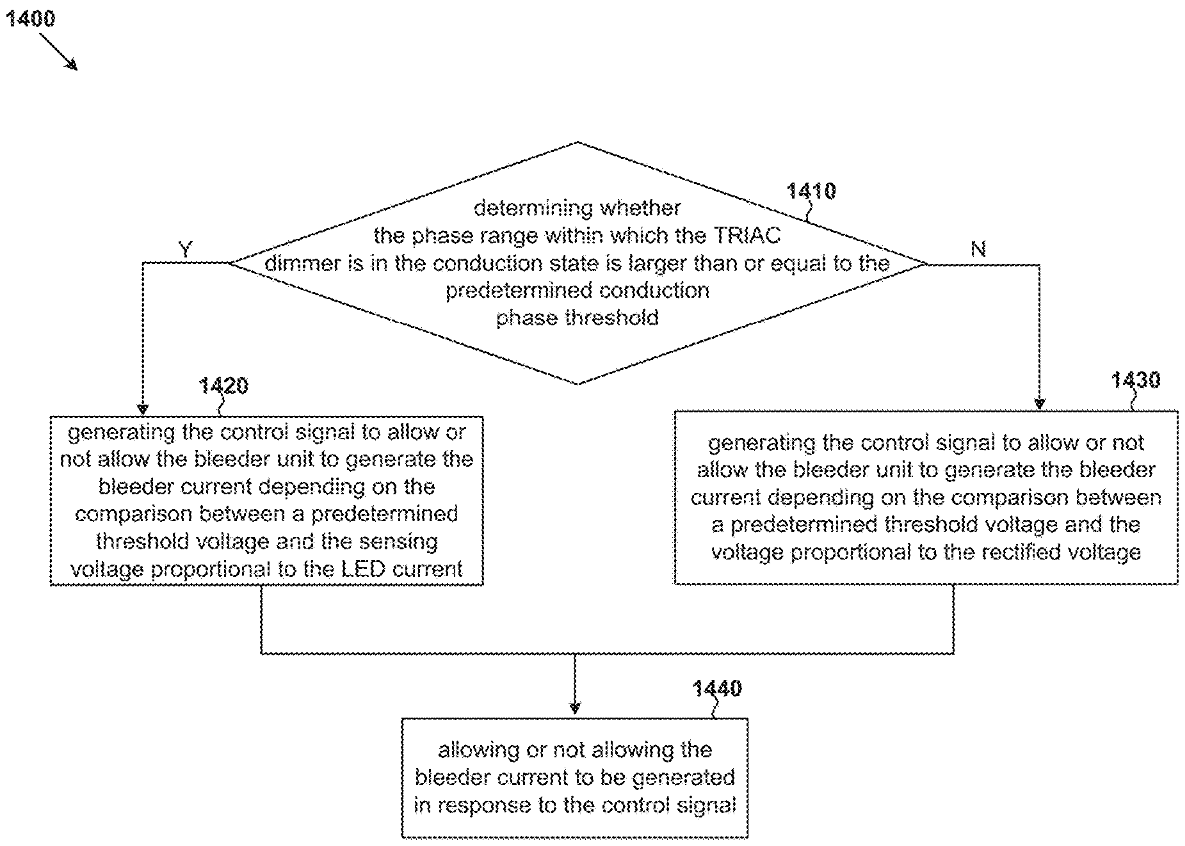
FIG. 14 is a simplified diagram showing a method for the LED lighting system as shown in FIG. 9 according to some embodiments of the present invention.

FIG. 14 is a simplified diagram showing a method for the LED lighting system 900 as shown in FIG. 9 according to some embodiments of the present invention. This diagram is merely an example, which should not unduly limit the scope of the claims. One of ordinary skill in the art would recognize many variations, alternatives, and modifications. As shown in FIG. 14, the method 1400 includes a process 1410 for determining whether the phase range within which the TRIAC dimmer is in the conduction state is larger than or equal to the predetermined conduction phase threshold, a process 1420 for generating the control signal to allow or not allow the bleeder unit to generate the bleeder current depending on the comparison between a predetermined threshold voltage and the sensing voltage proportional to the LED current, a process 1430 for generating the control signal to allow or not allow the bleeder unit to generate the bleeder current depending on the comparison between a predetermined threshold voltage and the voltage proportional to the rectified voltage, and a process 1440 for allowing or not allowing the bleeder current to be generated in response to the control signal. For example, the method 1400 is implemented by at least the LED lighting system 900. Although the above has been shown using a selected group of processes for the method, there can be many alternatives, modifications, and variations. For example, some of the processes may be expanded and/or combined. Other processes may be inserted to those noted above. Depending upon the embodiment, the arrangement of processes may be interchanged with others replaced. Further details of these processes are found throughout the present specification.

At the process 1410, whether the phase range within which the TRIAC dimmer is in the conduction state (e.g., on state) is larger than or equal to the predetermined conduction phase threshold is determined according to certain embodiments. In some examples, the bleeder control unit 930 uses the voltage 976 (e.g., $V_{ls}$) to determine whether the voltage 976 (e.g., $V_{ls}$) indicates that the phase range within which the TRIAC dimmer 950 is in the conduction state (e.g., on state) is larger than or equal to the predetermined conduction phase threshold. As an example, the voltage 976 (e.g., $V_{ls}$) is proportional to the rectified voltage 998 (e.g., VIN) according to Equation 7. For example, if the phase range within which the TRIAC dimmer is in the conduction state (e.g., on state) is determined to be larger than or equal to the predetermined conduction phase threshold, the process 1420 is performed. As an example, if the phase range within which the TRIAC dimmer is in the conduction state (e.g., on state) is determined not to be larger than or equal to the predetermined conduction phase threshold, the process 1430 is performed.

At the process 1420, the control signal is generated to allow or not allow the bleeder unit to generate the bleeder current depending on the comparison between a predetermined threshold voltage and the sensing voltage that is proportional to the LED current according to some embodiments. In certain examples, the bleeder control unit 930 uses the comparison between the sensing voltage 982 (e.g., $V_{sense}$) and the predetermined threshold voltage 1092 (e.g., $V_{th2}$) to generate the control signal 984 in order to allow or not allow the bleeder unit 920 to generate the bleeder current 990. For example, the sensing voltage 982 (e.g., $V_{sense}$) is proportional to the LED current 994 (e.g., $I_{LED}$) (e.g., the sensing voltage 982 being equal to the LED current 994 multiplied by the resistance of the resistor 962).

At the process 1430, the control signal is generated to allow or not allow the bleeder unit to generate the bleeder current depending on the comparison between a predetermined threshold voltage and the voltage that is proportional to the rectified voltage according to certain embodiments. In some examples, the bleeder control unit 930 uses the comparison between the voltage 976 (e.g., $V_{ls}$) and the predetermined threshold voltage 1090 (e.g., $V_{th1}$) to generate the control signal 984 in order to allow or not allow the bleeder unit 920 to generate the bleeder current 990. For example, the voltage 976 (e.g., $V_{ls}$) is proportional to the rectified voltage 998 (e.g., VIN) according to Equation 7.

At the process 1440, the bleeder current is allowed or not allowed to be generated in response to the control signal according to certain embodiments according to some embodiments. In certain examples, the bleeder unit 920 receives the control signal 984 (e.g., the control signal 984 that is generated by the process 1420 or the process 1430) and in response allows or does not allow the bleeder current 990 to be generated. For example, after the predetermined delay (e.g., after $t_d$) provided by the delay sub-unit 9350, the bleeder current 990 changes from being equal to the high current level (e.g., being larger than zero) to being equal to zero gradually (e.g., slowly) during the predetermined time duration as shown by the waveform 1190 in FIG. 11. As an example, the length of the predetermined time duration depends on the resistance of the resistor 936 and the capacitance of the capacitor 938.

As discussed above and further emphasized here, FIG. 14 is merely an example, which should not unduly limit the scope of the claims. One of ordinary skill in the art would recognize many variations, alternatives, and modifications. In some examples, at the process 1410, whether the phase range within which the TRIAC dimmer is in the conduction state (e.g., on state) is larger than or smaller than the predetermined conduction phase threshold is determined. For example, if the phase range within which the TRIAC dimmer is in the conduction state (e.g., on state) is determined to be larger than the predetermined conduction phase threshold, the process 1420 is performed. As an example, if the phase range within which the TRIAC dimmer is in the conduction state (e.g., on state) is determined to be smaller than the predetermined conduction phase threshold, the process 1430 is performed.

Figure 15:
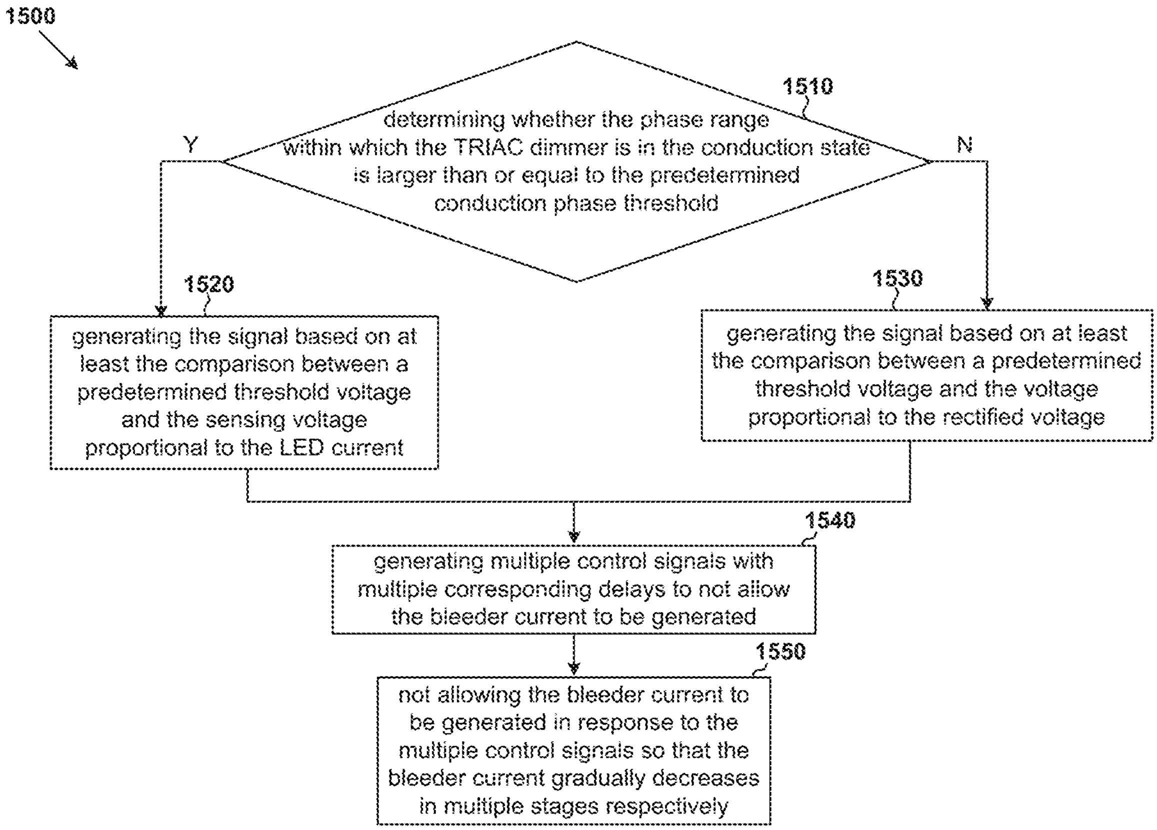
FIG. 15 is a simplified diagram showing a method for the LED lighting system as shown in FIG. 12 according to certain embodiments of the present invention.

FIG. 15 is a simplified diagram showing a method for the LED lighting system 1200 as shown in FIG. 12 according to certain embodiments of the present invention. This diagram is merely an example, which should not unduly limit the scope of the claims. One of ordinary skill in the art would recognize many variations, alternatives, and modifications. As shown in FIG. 15, the method 1500 includes a process 1510 for determining whether the phase range within which the TRIAC dimmer is in the conduction state is larger than or equal to the predetermined conduction phase threshold, a process 1520 for generating the signal based on at least the comparison between a predetermined threshold voltage and the sensing voltage proportional to the LED current, a process 1530 for generating the signal based on at least the comparison between a predetermined threshold voltage and the voltage proportional to the rectified voltage, a process 1540 for generating multiple control signals with multiple corresponding delays to not allow the bleeder current to be generated, and a process 1550 for not allowing the bleeder current to be generated in response to the multiple control signals so that the bleeder current gradually decreases in multiple stages respectively. For example, the method 1500 is implemented by at least the LED lighting system 1200. Although the above has been shown using a selected group of processes for the method, there can be many alternatives, modifications, and variations. For example, some of the processes may be expanded and/or combined. Other processes may be inserted to those noted above. Depending upon the embodiment, the arrangement of processes may be interchanged with others replaced. Further details of these processes are found throughout the present specification.

At the process 1510, whether the phase range within which the TRIAC dimmer is in the conduction state (e.g., on state) is larger than or equal to the predetermined conduction phase threshold is determined according to certain embodiments. In some examples, the bleeder control unit 1230 uses the voltage 1276 (e.g., $V_{ls}$) to determine whether the voltage 1276 (e.g., $V_{ls}$) indicates that the phase range within which the TRIAC dimmer 1250 is in the conduction state (e.g., on state) is larger than or equal to the predetermined conduction phase threshold. As an example, the voltage 1276 (e.g., $V_{ls}$) is proportional to the rectified voltage 1298 (e.g., VIN) according to Equation 11. For example, if the phase range within which the TRIAC dimmer is in the conduction state (e.g., on state) is determined to be larger than or equal to the predetermined conduction phase threshold, the process 1520 is performed. As an example, if the phase range within which the TRIAC dimmer is in the conduction state (e.g., on state) is determined not to be larger than or equal to the predetermined conduction phase threshold, the process 1530 is performed.

At the process 1520, the signal is generated based on at least the comparison between a predetermined threshold voltage and the sensing voltage that is proportional to the LED current according to some embodiments. In certain examples, the bleeder control unit 1230 uses the comparison between the sensing voltage 1282 (e.g., $V_{sense}$) and the predetermined threshold voltage 1392 (e.g., $V_{th2}$) to generate the signal 1384. For example, the sensing voltage 1282 (e.g., $V_{sense}$) is proportional to the LED current 1294 (e.g., $I_{LED}$) (e.g., the sensing voltage 1282 being equal to the LED current 1294 multiplied by the resistance of the resistor 1262).

At the process 1530, the signal is generated based on at least the comparison between a predetermined threshold voltage and the voltage that is proportional to the rectified voltage according to certain embodiments. In some examples, the bleeder control unit 1230 uses the comparison between the voltage 1276 (e.g., $V_{ls}$) and the predetermined threshold voltage 1304 (e.g., $V_{th1}$) to generate the signal 1384. For example, the voltage 1276 (e.g., $V_{ls}$) is proportional to the rectified voltage 1298 (e.g., VIN) according to Equation 11.

At the process 1540, multiple control signals are generated with multiple corresponding delays to not allow the bleeder current to be generated if one or more predetermined conditions are satisfied according some embodiments. In certain examples, the multiple control signals include the control signals $\mathbf{1284}_1$, . . . , $\mathbf{1284}_n$, . . . , and $\mathbf{1284}_N$, where N is an integer larger than 1 and n is an integer larger than 1 but smaller than or equal to N. In some examples, if the voltage 1276 indicates that the phase range within which the TRIAC dimmer 1250 is in the conduction state (e.g., on state) is smaller than the predetermined conduction phase threshold and the voltage 1276 (e.g., $V_{ls}$) changes from being smaller than the predetermined threshold voltage (e.g., $V_{th1}$) to being larger than the predetermined threshold voltage (e.g., $V_{th1}$) or if the voltage 1276 indicates that the phase range within which the TRIAC dimmer 1250 is in the conduction state (e.g., on state) is larger than the predetermined conduction phase threshold and the sensing voltage 1282 (e.g., $V_{sense}$) changes from being smaller than the predetermined threshold voltage (e.g., $V_{th2}$) to being larger than the predetermined threshold voltage (e.g., $V_{th2}$), the change of the control signal $\mathbf{1284}_n$ occurs after a delay of tan from the time when the change of the control signal $\mathbf{1284}_{n-1}$ occurs, where n is an integer larger than 1 but smaller than or equal to N. As an example, the change of the control signal $\mathbf{1284}_2$ occurs after the delay of $t_{d2}$ from the time when the change of the control signal $\mathbf{1284}_1$ occurs. For example, the change of the control signal 12843 occurs after a delay of $t_{d3}$ from the time when the change of the control signal $\mathbf{1284}_2$ occurs. As an example, the change of the control signal $\mathbf{684}_N$ occurs after a delay of $t_{dN}$ from the time when the change of the control signal $\mathbf{684}_{N-1}$ occurs.

At the process 1550, the bleeder current is not allowed to be generated in response to the multiple control signals so that the bleeder current gradually (e.g., slowly) decreases in multiple stages respectively. In certain examples, the bleeder unit 1220 receives the multiple control signals that is generated by the process 1540 (e.g., the control signals $\mathbf{1284}_1$, . . . , $\mathbf{1284}_n$, . . . , and $\mathbf{1284}_N$, where N is an integer larger than 1 and n is an integer larger than 1 but smaller than or equal to N), and in response does not allow the bleeder current 1290 to be generated. In some examples, the bleeder current 1290 decreases gradually (e.g., slowly) during the predetermined time duration. As an example, for the $j^{th}$ stage of the multiple stages, the bleeder current 1290 decreases gradually (e.g., slowly) during the predetermined time duration from the reference voltage $\mathbf{1288}_j$ (e.g., $V_{refj}$) divided by the resistance value (e.g., $R_2$) of the resistor 1226 to the reference voltage $\mathbf{1288}_{j+1}$ (e.g., $V_{ref(j+1)}$) divided by the resistance value (e.g., $R_2$) of the resistor 1226, where j is an integer larger than zero but smaller than N. For example, for the $N^{th}$ stage of the multiple stages, the bleeder current 1290 decreases gradually (e.g., slowly) during the predetermined time duration from the reference voltage $\mathbf{1288}_N$ (e.g., $V_{refN}$) divided by the resistance value (e.g., $R_2$) of the resistor 1226 to zero, where N is an integer larger than 1. In some examples, the length of the predetermined time duration depends on the resistance of the resistor 1236 and the capacitance of the capacitor 1238.

As discussed above and further emphasized here, FIG. 15 is merely an example, which should not unduly limit the scope of the claims. One of ordinary skill in the art would recognize many variations, alternatives, and modifications.

In certain examples, at the process 1510, whether the phase range within which the TRIAC dimmer is in the conduction state (e.g., on state) is larger than or smaller than the predetermined conduction phase threshold is determined. For example, if the phase range within which the TRIAC dimmer is in the conduction state (e.g., on state) is determined to be larger than the predetermined conduction phase threshold, the process 1520 is performed. As an example, if the phase range within which the TRIAC dimmer is in the conduction state (e.g., on state) is determined to be smaller than the predetermined conduction phase threshold, the process 1530 is performed.

According to certain embodiments, the present invention provides one or more systems and/or one or more methods for controlling one or more light emitting diodes. In some examples, an RC filtering circuit is used to control the reduction of a bleeder current so that the bleeder current gradually decreases during a predetermined time duration. As an example, a predetermined delay is used to delay the starting time of the gradual reduction of the bleeder current in order to stabilize the conduction state (e.g., on state) of a TRIAC dimmer. For example, two or more levels of control mechanisms are used so that the gradual reduction of the bleeder current is accomplished in two or more stages respectively to further reduce (e.g., eliminate) the oscillation of a rectified voltage and further reduce (e.g., eliminate) blinking of the one or more LEDs. In certain examples, a phase range within which the TRIAC dimmer is in the conduction state (e.g., on state) is detected and used to either select a sensing voltage proportional to an LED current or select a voltage proportional to the rectified voltage for controlling the bleeder current, in order to stabilize the conduction state (e.g., on state) of the TRIAC dimmer, stabilize the LED current, and/or reduce (e.g., eliminate) blinking of the one or more LEDs. For example, such use of the phase range within which the TRIAC dimmer is in the conduction state (e.g., on state) can, when the phase range is small, prevent the bleeder current from always being allowed to be generated and also prevent the bleeder current changes back and forth between being allowed to be generated and not being allowed to be generated. As an example, such use of the phase range within which the TRIAC dimmer is in the conduction state (e.g., on state) can stabilize the conduction state (e.g., on state) of the TRIAC dimmer.

According to some embodiments, a system for controlling one or more light emitting diodes includes: a current regulator including a first regulator terminal and a second regulator terminal, the first regulator terminal being configured to receive a diode current flowing through the one or more light emitting diodes, the current regulator being configured to generate a sensing signal representing the diode current, the second regulator terminal being configured to output the sensing signal; a bleeder controller including a first controller terminal and a second controller terminal, the first controller terminal being configured to receive the sensing signal from the second regulator terminal, the bleeder controller being configured to generate a first bleeder control signal based at least in part on the sensing signal, the second controller terminal being configured to output the first bleeder control signal, the first bleeder control signal indicating whether a bleeder current is allowed or not allowed to be generated; and a bleeder including a first bleeder terminal and a second bleeder terminal, the first bleeder terminal being configured to receive the first bleeder control signal from the second controller terminal, the second bleeder terminal being configured to receive a rectified voltage associated with a TRIAC dimmer and generated by a rectifying bridge; wherein: the bleeder includes a current controller and a current generator; the current controller is configured to receive the first bleeder control signal and generate an input voltage based at least in part on the first bleeder control signal; and the current generator is configured to receive the rectified voltage and the input voltage and generate the bleeder current based at least in part on the input voltage; wherein, if the first bleeder control signal indicates that the bleeder current is not allowed to be generated: the current controller is configured to gradually reduce the input voltage from a first voltage magnitude at a first time to a second voltage magnitude at a second time; and the current generator is configured to gradually reduce the bleeder current from a first current magnitude at the first time to a second current magnitude at the second time; wherein the second time follows the first time by a predetermined duration of time. For example, the system is implemented according to at least FIG. 3, FIG. 6, FIG. 9, and/or FIG. 12.

As an example, the current controller includes a switch, an amplifier, a resistor, and a capacitor; wherein: the capacitor includes a first capacitor terminal and a second capacitor terminal, the first capacitor terminal being configured to provide the input voltage, the second capacitor terminal being biased to a ground voltage; the resistor includes a first resistor terminal and a second resistor terminal, the second resistor terminal being biased to the ground voltage; and the amplifier includes a first amplifier input terminal, a second amplifier input terminal, and an amplifier output terminal, the second amplifier input terminal being connected to the amplifier output terminal, the first amplifier input terminal being biased to a reference voltage; wherein: the switch is configured to: receive the first bleeder control signal; and based at least in part on the first bleeder control signal, connect the first capacitor terminal to the amplifier output terminal or to the first resistor terminal; and the switch is further configured to: if the bleeder current is allowed to be generated, connect the first capacitor terminal to the amplifier output terminal to generate the bleeder current based at least in part on the reference voltage; and if the bleeder current is not allowed to be generated, connect the first capacitor terminal to the first resistor terminal to gradually reduce the bleeder current from the first current magnitude at the first time to the second current magnitude at the second time.

For example, the bleeder controller includes a comparator and a first delayed-signal generator; wherein: the comparator is configured to receive the sensing signal and a threshold voltage and generate a comparison signal based at least in part on the sensing signal and the threshold voltage; and the first delayed-signal generator is configured to receive the comparison signal and generate the first bleeder control signal based at least in part on the comparison signal; wherein the first delayed-signal generator is further configured to, if the comparison signal indicates that the sensing signal becomes larger than the threshold voltage, change the first bleeder control signal from a first logic level to a second logic level after a first predetermined delay, the first predetermined delay being larger than zero in magnitude; wherein: the first logic level indicates that the bleeder current is allowed to be generated; and the second logic level indicates that the bleeder current is not allowed to be generated.

As an example, the bleeder controller is further configured to generate N bleeder control signals corresponding to N predetermined delays respectively, N being an integer larger than 1; wherein: the N bleeder control signals include a $1^{st}$ bleeder control signal, . . . , an $n^{th}$ bleeder control signal, . . . , and an $N^{th}$ bleeder control signal, n being an integer larger than 1 but smaller than N; and the N predetermined delays include a $1^{st}$ predetermined delay, . . . , an $n^{th}$ predetermined delay, . . . , and an $N^{th}$ predetermined delay; wherein: the $1^{st}$ bleeder control signal is the first bleeder control signal; the $1^{st}$ predetermined delay is the first predetermined delay; and each delay of the N predetermined delays is larger than zero in magnitude; wherein the bleeder controller is further configured to: if the $(n-1)^{th}$ bleeder control signal changes from indicating that the bleeder current is allowed to be generated to indicating that the bleeder current is not allowed to be generated, change the $n^{th}$ bleeder control signal after the $n^{th}$ predetermined delay; and if the $(N-1)^{th}$ bleeder control signal changes from indicating that the bleeder current is allowed to be generated to indicating that the bleeder current is not allowed to be generated, change the $N^{th}$ bleeder control signal after the $N^{th}$ predetermined delay.

For example, the current controller includes N switches, N amplifiers, a resistor, and a capacitor, the N switches and the N amplifiers corresponding to N reference voltages; the N switches include a $1^{st}$ switch, . . . , an $n^{th}$ switch, . . . , and an $N^{th}$ switch; the N amplifiers include a $1^{st}$ amplifier, . . . , an $n^{th}$ amplifier, . . . , and an $N^{th}$ amplifier; and the N reference voltages include a $1^{st}$ reference voltage, . . . , an $n^{th}$ reference voltage, . . . , and an $N^{th}$ reference voltage; wherein: the $1^{st}$ amplifier includes a $1^{st}$ amplifier positive input amplifier, a $1^{st}$ amplifier negative input terminal, and a $1^{st}$ amplifier output terminal, the $1^{st}$ amplifier negative input terminal being connected to the $1^{st}$ amplifier output terminal, the $1^{st}$ amplifier positive input amplifier being biased to the $1^{st}$ reference voltage; the $n^{th}$ amplifier includes an $n^{th}$ amplifier positive input terminal, an $n^{th}$ amplifier negative input terminal, and an $n^{th}$ amplifier output terminal, the $n^{th}$ amplifier negative input terminal being connected to the $n^{th}$ amplifier output terminal; and the $N^{th}$ amplifier includes an $N^{th}$ amplifier positive input terminal, an $N^{th}$ amplifier negative input terminal, and an $N^{th}$ amplifier output terminal, the $N^{th}$ amplifier negative input terminal being connected to the $N^{th}$ amplifier output terminal; wherein: the capacitor includes a first capacitor terminal and a second capacitor terminal, the first capacitor terminal being configured to provide the input voltage, the second capacitor terminal being biased to a ground voltage; and the resistor includes a first resistor terminal and a second resistor terminal, the second resistor terminal being connected to the $2^{nd}$ amplifier output terminal; wherein the $1^{st}$ switch is configured to: receive the $1^{st}$ bleeder control signal; and based at least in part on the $1^{st}$ bleeder control signal, connect the first capacitor terminal to the $1^{st}$ amplifier output terminal or to the first resistor terminal; wherein the $1^{st}$ switch is further configured to: if the $1^{st}$ bleeder control signal indicates that the bleeder current is allowed to be generated, connect the first capacitor terminal to the $1^{st}$ amplifier output terminal; and if the $1^{st}$ bleeder control signal indicates that the bleeder current is not allowed to be generated, connect the first capacitor terminal to the first resistor terminal so that the first capacitor terminal is connected to the $2^{nd}$ amplifier output terminal through the resistor; wherein the $n^{th}$ switch is configured to: receive the $n^{th}$ bleeder control signal; and based at least in part on the $n^{th}$ bleeder control signal, connect the $n^{th}$ amplifier positive input terminal to the $n^{th}$ reference voltage or to the $(n+1)^{th}$ amplifier output terminal; wherein the $n^{th}$ switch is further configured to: if the $n^{th}$ bleeder control signal indicates that the bleeder current is allowed to be generated, connect the $n^{th}$ amplifier positive input terminal to the $n^{th}$ reference voltage; and if the $n^{th}$ bleeder control signal indicates that the bleeder current is not allowed to be generated, connect the $n^{th}$ amplifier positive input terminal to the $(n+1)^{th}$ amplifier output terminal; wherein the $N^{th}$ switch is configured to: receive the $N^{th}$ bleeder control signal; and based at least in part on the $N^{th}$ bleeder control signal, connect the $N^{th}$ amplifier positive input terminal to the $N^{th}$ reference voltage or to the ground voltage; wherein the $N^{th}$ switch is further configured to: if the $N^{th}$ bleeder control signal indicates that the bleeder current is allowed to be generated, connect the $N^{th}$ amplifier positive input terminal to the $N^{th}$ reference voltage; and if the $N^{th}$ bleeder control signal indicates that bleeder current is not allowed to be generated, connect the $N^{th}$ amplifier positive input terminal to the ground voltage; wherein: the $(n-1)^{th}$ reference voltage is larger than the $n^{th}$ reference voltage; the $n^{th}$ reference voltage is larger than the $(n+1)^{th}$ reference voltage; and the $N^{th}$ reference voltage is larger than zero.

As an example, the bleeder controller further includes N delayed-signal generators, the N delayed-signal generators corresponding to the N predetermined delays; and the N delayed-signal generators include a $1^{st}$ delayed-signal generator, . . . , an $n^{th}$ delayed-signal generator, . . . , and an $N^{th}$ delayed-signal generator, the $1^{st}$ delayed-signal generator being the first delayed-signal generator; wherein the first delayed-signal generator is further configured to, if the comparison signal indicates that the sensing signal becomes larger than the threshold voltage, change the first bleeder control signal after the first predetermined delay; wherein the $n^{th}$ delayed-signal generator is configured to: receive the $(n-1)^{th}$ bleeder control signal; generate the $n^{th}$ bleeder control signal based at least in part on the $(n-1)^{th}$ bleeder control signal; and if the $(n-1)^{th}$ bleeder control signal indicates that the sensing signal becomes larger than the threshold voltage, change the $n^{th}$ bleeder control signal after the $n^{th}$ predetermined delay; wherein the $N^{th}$ delayed-signal generator is configured to: receive the $(N-1)^{th}$ bleeder control signal; generate the $N^{th}$ bleeder control signal based at least in part on the $(N-1)^{th}$ bleeder control signal; and if the $(N-1)^{th}$ bleeder control signal indicates that the sensing signal becomes larger than the threshold voltage, change the $N^{th}$ bleeder control signal after the $N^{th}$ predetermined delay.

For example, the current regulator includes an amplifier, a transistor, and a resistor; the transistor includes a gate terminal, a drain terminal, and a source terminal; the amplifier includes an amplifier positive input terminal, an amplifier negative input terminal, and an amplifier output terminal; and the resistor includes a first resistor terminal and a second resistor terminal: wherein: the gate terminal is coupled to the amplifier output terminal; the drain terminal is coupled to the one or more light emitting diodes; the source terminal is coupled to the first resistor terminal; the amplifier positive input terminal is biased to a reference voltage; the amplifier negative input terminal is coupled to the source terminal; and the second resistor terminal is biased to a ground voltage; wherein the first resistor terminal is configured to generate the sensing signal representing the diode current flowing through the one or more light emitting diodes.

As an example, the current generator includes an amplifier, a transistor, and a resistor; the transistor includes a gate terminal, a drain terminal, and a source terminal; the amplifier includes an amplifier positive input terminal, an amplifier negative input terminal, and an amplifier output terminal; and the resistor includes a first resistor terminal and a second resistor terminal; wherein: the gate terminal is coupled to the amplifier output terminal; the drain terminal is biased to the rectified voltage associated with the TRIAC dimmer and generated by the rectifying bridge; the source terminal is coupled to the first resistor terminal; the second resistor terminal is biased to a ground voltage; the amplifier negative input terminal is coupled to the source terminal; and the amplifier positive input terminal is configured to receive the input voltage.

According to certain embodiments, a system for controlling one or more light emitting diodes includes: a current regulator including a first regulator terminal and a second regulator terminal, the first regulator terminal being configured to receive a diode current flowing through the one or more light emitting diodes, the current regulator being configured to generate a sensing signal representing the diode current, the second regulator terminal being configured to output the sensing signal; a voltage divider including a first divider terminal and a second divider terminal, the first divider terminal being configured to receive a rectified voltage associated with a TRIAC dimmer and generated by a rectifying bridge, the voltage divider being configured to generate a converted voltage proportional to the rectified voltage, the second divider terminal being configured to output the converted voltage; a bleeder controller including a first controller terminal, a second controller terminal and a third controller terminal, the first controller terminal being configured to receive the converted voltage from the second divider terminal, the second controller terminal being configured to receive the sensing signal from the second regulator terminal, the bleeder controller being configured to generate a first bleeder control signal based at least in part on the converted voltage, the third controller terminal being configured to output the first bleeder control signal, the first bleeder control signal indicating whether a bleeder current is allowed or not allowed to be generated; and a bleeder including a first bleeder terminal and a second bleeder terminal, the first bleeder terminal being configured to receive the first bleeder control signal from the third controller terminal, the second bleeder terminal being configured to receive the rectified voltage; wherein: the bleeder includes a current controller and a current generator; the current controller is configured to receive the first bleeder control signal and generate an input voltage based at least in part on the first bleeder control signal; and the current generator is configured to receive the rectified voltage and the input voltage and generate the bleeder current based at least in part on the input voltage; wherein, if the first bleeder control signal indicates that the bleeder current is not allowed to be generated: the current controller is configured to gradually reduce the input voltage from a first voltage magnitude at a first time to a second voltage magnitude at a second time; and the current generator is configured to gradually reduce the bleeder current from a first current magnitude at the first time to a second current magnitude at the second time; wherein the second time follows the first time by a predetermined duration of time. For example, the system is implemented according to at least FIG. 9 and/or FIG. 12.

As an example, the bleeder controller includes a conduction phase detector configured to: determine a phase range within which the TRIAC dimmer is in a conduction state based on at least information associated with the converted voltage; and generate a detection signal by comparing the phase range within which the TRIAC dimmer is in the conduction state and a predetermined conduction phase threshold; and the bleeder controller is further configured to: if the phase range within which the TRIAC dimmer is in the conduction state is determined to be larger than the predetermined conduction phase threshold, generate the first bleeder control signal based at least in part on the sensing signal; and if the phase range within which the TRIAC dimmer is in the conduction state is determined to be smaller than the predetermined conduction phase threshold, generate the first bleeder control signal based at least in part on the converted voltage.

For example, the bleeder controller further includes a first comparator, a second comparator, a switch, and a first delayed-signal generator; wherein: the first comparator is configured to receive the converted voltage and a first threshold voltage and generate a first comparison signal based at least in part on the converted voltage and the first threshold voltage; and the second comparator is configured to receive the sensing signal and a second threshold voltage and generate a second comparison signal based at least in part on the sensing signal and the second threshold voltage; wherein the conduction phase detector is further configured to: receive the first comparison signal; and generate the detection signal based at least in part on the first comparison signal; wherein the switch is configured to receive the detection signal; wherein, if the phase range within which the TRIAC dimmer is in the conduction state is determined to be smaller than the predetermined conduction phase threshold: the switch is configured to output the first comparison signal to the first delayed-signal generator; and if the first comparison signal indicates that the converted voltage becomes larger than the first threshold voltage, change the first bleeder control signal from a first logic level to a second logic level after a first predetermined delay; wherein, if the phase range within which the TRIAC dimmer is in the conduction state is determined to be larger than the predetermined conduction phase threshold: the switch is configured to output the second comparison signal to the first delayed-signal generator; and if the second comparison signal indicates that the sensing signal becomes larger than the second threshold voltage, change the first bleeder control signal from the first logic level to the second logic level after the first predetermined delay; wherein: the first predetermined delay is larger than zero in magnitude; the first logic level indicates that the bleeder current is allowed to be generated; and the second logic level indicates that the bleeder current is not allowed to be generated.

As an example, the conduction phase detector includes a duration determination device and a phase detection device; wherein: the duration determination device is configured to receive the first comparison signal, determine a time duration during which the first comparison signal indicates the converted voltage is smaller than the first threshold voltage, and output a timing signal representing the time duration; and the phase detection device is configured to receive the timing signal representing the time duration, compare the time duration and a duration threshold, and generate the detection signal based at least in part on the time duration and the duration threshold, the detection signal indicating whether the time duration is larger than the duration threshold; wherein: if the detection signal indicates that the time duration is larger than the duration threshold, the phase range within which the TRIAC dimmer is in the conduction state is determined to be smaller than the predetermined conduction phase threshold; and if the detection signal indicates that the time duration is smaller than the duration threshold, the phase range within which the TRIAC dimmer is in the conduction state is determined to be larger than the predetermined conduction phase threshold.

For example, the bleeder controller is configured to generate N bleeder control signals corresponding to N predetermined delays respectively, N being an integer larger than 1; wherein: the N bleeder control signals include a $1^{st}$ bleeder control signal, . . . , an $n^{th}$ bleeder control signal, . . . , and an $N^{th}$ bleeder control signal, n being an integer larger than 1 but smaller than N; and the N predetermined delays include a $1^{st}$ predetermined delay, . . . , an $n^{th}$ predetermined delay, . . . , and an $N^{th}$ predetermined delay, each predetermined delay of the N predetermined delays being larger than zero in magnitude; wherein: the $1^{st}$ bleeder control signal is the first bleeder control signal; and the $1^{st}$ predetermined delay is the first predetermined delay; wherein the bleeder controller is further configured to: if the $(n-1)^{th}$ bleeder control signal changes from indicating that the bleeder current is allowed to be generated to indicating that the bleeder current is not allowed to be generated, change the $n^{th}$ bleeder control signal after the $n^{th}$ predetermined delay; and if the $(N-1)^{th}$ bleeder control signal changes from indicating that the bleeder current is allowed to be generated to indicating that the bleeder current is not allowed to be generated, change the $N^{th}$ bleeder control signal after the $N^{th}$ predetermined delay.

As an example, the bleeder controller further includes N delayed-signal generators; and the N delayed-signal generators include a $1^{st}$ delayed-signal generator, . . . , an $n^{th}$ delayed-signal generator, . . . , and an $N^{th}$ delayed-signal generator; wherein the $1^{st}$ delayed-signal generator is the first delayed-signal generator.

According to some embodiments, a system for controlling one or more light emitting diodes includes: a current regulator including a first regulator terminal and a second regulator terminal, the first regulator terminal being configured to receive a diode current flowing through the one or more light emitting diodes, the current regulator being configured to generate a sensing signal representing the diode current, the second regulator terminal being configured to output the sensing signal; a voltage divider including a first divider terminal and a second divider terminal, the first divider terminal being configured to receive a rectified voltage associated with a TRIAC dimmer and generated by a rectifying bridge, the voltage divider being configured to generate a converted voltage proportional to the rectified voltage, the second divider terminal being configured to output the converted voltage; a bleeder controller including a first controller terminal, a second controller terminal and a third controller terminal, the first controller terminal being configured to receive the converted voltage from the second divider terminal, the second controller terminal being configured to receive the sensing signal from the second regulator terminal, the bleeder controller being configured to generate a first bleeder control signal based at least in part on the converted voltage, the third controller terminal being configured to output the first bleeder control signal, the first bleeder control signal indicating whether a bleeder current is allowed or not allowed to be generated; and a bleeder including a first bleeder terminal and a second bleeder terminal, the first bleeder terminal being configured to receive the first bleeder control signal from the third controller terminal, the second bleeder terminal being configured to receive the rectified voltage, the bleeder being configured to generate the bleeder current based at least in part on the first bleeder control signal; wherein the bleeder controller is configured to: determine a phase range within which the TRIAC dimmer is in a conduction state based on at least information associated with the converted voltage; and generate a detection signal by comparing a predetermined conduction phase threshold and the phase range within which the TRIAC dimmer is in the conduction state; wherein the bleeder controller is further configured to: if the detection signal indicates that the phase range within which the TRIAC dimmer is in the conduction state is larger than the predetermined conduction phase threshold, generate the first bleeder control signal based at least in part on the sensing signal; and if the detection signal indicates that the phase range within which the TRIAC dimmer is in the conduction state is determined to be smaller than the predetermined conduction phase threshold, generate the first bleeder control signal based at least in part on the converted voltage; wherein: if the first bleeder control signal indicates that the bleeder current is not allowed to be generated, the current generator is configured to gradually reduce the bleeder current from a first current magnitude at a first time to a second current magnitude at a second time; wherein the second time follows the first time by a predetermined duration of time. For example, the system is implemented according to at least FIG. 9 and/or FIG. 12.

As an example, the bleeder controller further includes a delayed-signal generator; wherein: the delayed-signal generator is configured to change the first bleeder control signal from a first logic level to a second logic level after a predetermined delay, the predetermined delay being larger than zero in magnitude; the first logic level indicates that the bleeder current is allowed to be generated; and the second logic level indicates that the bleeder current is not allowed to be generated.

For example, the bleeder controller further includes N delayed-signal generators, the N delayed-signal generators being configured to generate N bleeder control signals corresponding to N predetermined delays respectively, N being an integer larger than 1; and the bleeder is configured to receive the N bleeder control signals; wherein: the N delayed-signal generators include a $1^{st}$ delayed-signal generator, . . . , an $n^{th}$ delayed-signal generator, . . . , and an $N^{th}$ delayed-signal generator, n being an integer larger than 1 but smaller than N; the N bleeder control signals include a $1^{st}$ bleeder control signal, . . . , an $n^{th}$ bleeder control signal, . . . , and an $N^{th}$ bleeder control signal, the $1^{st}$ bleeder control signal being the first bleeder control signal; and the N predetermined delays include a $1^{st}$ predetermined delay, . . . , an $n^{th}$ predetermined delay, . . . , and an $N^{th}$ predetermined delay, each predetermined delay of the N predetermined delays being larger than zero in magnitude; wherein the $n^{th}$ delayed-signal generator is configured to receive the $(n-1)^{th}$ bleeder control signal and change the $n^{th}$ bleeder control signal after the $n^{th}$ predetermined delay if the $(n-1)^{th}$ bleeder control signal indicates a change from the bleeder current being allowed to be generated to the bleeder current not being allowed to be generated; wherein, the bleeder is further configured to, if the bleeder current changes from being allowed to be generated to not being allowed to be generated, reduce the bleeder current from a $1^{st}$ predetermined magnitude to a $2^{nd}$ predetermined magnitude during a predetermined duration of time in response to at least a change of the $1^{st}$ bleeder control signal; reduce the bleeder current from an $n^{th}$ predetermined magnitude to an $(n+1)^{th}$ predetermined magnitude during the predetermined duration of time in response to at least a change of the $n^{th}$ bleeder control signal; and reduce the bleeder current from an $N^{th}$ predetermined magnitude to zero during the predetermined duration of time in response to at least a change of the $N^{th}$ bleeder control signal; wherein: the $(n-1)^{th}$ predetermined magnitude is larger than the $n^{th}$ predetermined magnitude; the $n^{th}$ predetermined magnitude is larger than the $(n+1)^{th}$ predetermined magnitude; and the $N^{th}$ predetermined magnitude is larger than zero.

According to certain embodiments, a method for controlling one or more light emitting diodes includes: receiving a diode current flowing through the one or more light emitting diodes; generating a sensing signal representing the diode current; outputting the sensing signal; receiving the sensing signal; generating a first bleeder control signal based at least in part on the sensing signal, the first bleeder control signal indicating whether a bleeder current is allowed or not allowed to be generated; outputting the first bleeder control signal; receiving the first bleeder control signal; generating an input voltage based at least in part on the first bleeder control signal; receiving the input voltage and a rectified voltage associated with a TRIAC dimmer; generating the bleeder current based at least in part on the input voltage; wherein: the generating an input voltage based at least in part on the first bleeder control signal includes, if the first bleeder control signal indicates that the bleeder current is not allowed to be generated, gradually reducing the input voltage from a first voltage magnitude at a first time to a second voltage magnitude at a second time; and the generating the bleeder current based at least in part on the input voltage includes, if the first bleeder control signal indicates that the bleeder current is not allowed to be generated, gradually reducing the bleeder current from a first current magnitude at the first time to a second current magnitude at the second time; wherein the second time follows the first time by a predetermined duration of time. For example, the method is implemented according to at least FIG. 3, FIG. 6, FIG. 9, and/or FIG. 12.

According to some embodiments, a method for controlling one or more light emitting diodes includes: receiving a diode current flowing through the one or more light emitting diodes; generating a sensing signal representing the diode current; outputting the sensing signal; receiving a rectified voltage associated with a TRIAC dimmer; generating a converted voltage proportional to the rectified voltage; outputting the converted voltage; receiving the converted voltage and the sensing signal; generating a first bleeder control signal based at least in part on the converted voltage, the first bleeder control signal indicating whether a bleeder current is allowed or not allowed to be generated; outputting the first bleeder control signal; receiving the first bleeder control signal; generating an input voltage based at least in part on the first bleeder control signal; receiving the input voltage and the rectified voltage; and generating the bleeder current based at least in part on the input voltage; wherein: the generating an input voltage based at least in part on the first bleeder control signal includes, if the first bleeder control signal indicates that the bleeder current is not allowed to be generated, gradually reducing the input voltage from a first voltage magnitude at a first time to a second voltage magnitude at a second time; and the generating the bleeder current based at least in part on the input voltage includes, if the first bleeder control signal indicates that the bleeder current is not allowed to be generated, gradually reducing the bleeder current from a first current magnitude at the first time to a second current magnitude at the second time; wherein the second time follows the first time by a predetermined duration of time. For example, the method is implemented according to at least FIG. 9 and/or FIG. 12.

According to certain embodiments, a method for controlling one or more light emitting diodes, the method comprising: receiving a diode current flowing through the one or more light emitting diodes; generating a sensing signal representing the diode current; outputting the sensing signal; receiving a rectified voltage associated with a TRIAC dimmer; generating a converted voltage proportional to the rectified voltage; outputting the converted voltage; receive the converted voltage and the sensing signal; generating a first bleeder control signal based at least in part on the converted voltage, the first bleeder control signal indicating whether a bleeder current is allowed or not allowed to be generated; outputting the first bleeder control signal; receiving the first bleeder control signal and the rectified voltage; and generating the bleeder current based at least in part on the input voltage; wherein the generating a first bleeder control signal based at least in part on the converted voltage includes: determining a phase range within which the TRIAC dimmer is in a conduction state based on at least information associated with the converted voltage; generating a detection signal by comparing a predetermined conduction phase threshold and the phase range within which the TRIAC dimmer is in the conduction state; if the detection signal indicates that the phase range within which the TRIAC dimmer is in the conduction state is larger than the predetermined conduction phase threshold, generating the first bleeder control signal based at least in part on the sensing signal; and if the detection signal indicates that the phase range within which the TRIAC dimmer is in the conduction state is smaller than the predetermined conduction phase threshold, generating the first bleeder control signal based at least in part on the converted voltage; wherein the generating the bleeder current based at least in part on the input voltage includes, if the first bleeder control signal indicates that the bleeder current is not allowed to be generated, gradually reducing the bleeder current from a first current magnitude at a first time to a second current magnitude at a second time; wherein the second time follows the first time by a predetermined duration of time. For example, the method is implemented according to at least FIG. 9 and/or FIG. 12.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for controlling one or more light emitting diodes, the system comprising:

a bleeder configured to receive a first bleeder control signal and a rectified voltage associated with a TRIAC dimmer, the first bleeder control signal indicating whether a bleeder current is allowed or not allowed to be generated;

wherein:

the bleeder includes a current controller and a current generator;

the current controller is configured to receive the first bleeder control signal and generate an input voltage based at least in part on the first bleeder control signal; and the current generator is configured to receive the rectified voltage and the input voltage and generate the bleeder current based at least in part on the input voltage;

wherein, if the first bleeder control signal indicates that the bleeder current is not allowed to be generated, the current controller is configured to gradually reduce the input voltage from a first voltage magnitude at a first time to a second voltage magnitude at a second time; and the current generator is configured to gradually reduce the bleeder current from a first current magnitude at the first time to a second current magnitude at the second time;

wherein the second time follows the first time by a duration of time.

2. The system of claim 1 wherein:

the current controller includes a switch, an amplifier, a resistor, and a capacitor;

wherein:

the capacitor includes a first capacitor terminal and a second capacitor terminal, the first capacitor terminal being configured to provide the input voltage, the second capacitor terminal being biased to a ground voltage;

the resistor includes a first resistor terminal and a second resistor terminal, the second resistor terminal being biased to the ground voltage; and the amplifier includes a first amplifier input terminal, a second amplifier input terminal, and an amplifier output terminal, the second amplifier input terminal being connected to the amplifier output terminal, the first amplifier input terminal being biased to a reference voltage;

wherein:

the switch is configured to:

receive the first bleeder control signal; and based at least in part on the first bleeder control signal, connect the first capacitor terminal to the amplifier output terminal or to the first resistor terminal; and the switch is further configured to:

if the bleeder current is allowed to be generated, connect the first capacitor terminal to the amplifier output terminal to generate the bleeder current based at least in part on the reference voltage; and if the bleeder current is not allowed to be generated, connect the first capacitor terminal to the first resistor terminal to gradually reduce the bleeder current from the first current magnitude at the first time to the second current magnitude at the second time.

3. The system of claim 1, further comprising:

a bleeder controller configured to receive a sensing signal associated with a diode current flowing through the one or more light emitting diodes and generate the first bleeder control signal based at least in part on the sensing signal;

wherein:

the bleeder controller includes a comparator and a first delayed-signal generator;

the comparator is configured to receive the sensing signal and a threshold voltage and generate a comparison signal based at least in part on the sensing signal and the threshold voltage; and the first delayed-signal generator is configured to receive the comparison signal and generate the first bleeder control signal based at least in part on the comparison signal;

wherein the first delayed-signal generator is further configured to, if the comparison signal indicates that the sensing signal becomes larger than the threshold voltage, change the first bleeder control signal from a first logic level to a second logic level after a first predetermined delay, the first predetermined delay being larger than zero in magnitude;

wherein:

the first logic level indicates that the bleeder current is allowed to be generated; and the second logic level indicates that the bleeder current is not allowed to be generated.

4. The system of claim 3 wherein:

the bleeder controller is further configured to generate N bleeder control signals corresponding to N predetermined delays respectively, N being an integer larger than 1;

wherein:

the N bleeder control signals include a $1^{st}$ bleeder control signal, an $n^{th}$ bleeder control signal, and an $N^{th}$ bleeder control signal, n being an integer larger than 1 but smaller than N; and the N predetermined delays include a $1^{st}$ predetermined delay, an $n^{th}$ predetermined delay, and an $N^{th}$ predetermined delay;

wherein:

the $1^{st}$ bleeder control signal is the first bleeder control signal;

the $1^{st}$ predetermined delay is the first predetermined delay; and each delay of the N predetermined delays is larger than zero in magnitude;

wherein the bleeder controller is further configured to:

if an $(n-1)^{th}$ bleeder control signal changes from indicating that the bleeder current is allowed to be generated to indicating that the bleeder current is not allowed to be generated, change the $n^{th}$ bleeder control signal after the $n^{th}$ predetermined delay; and if an $(n-1)^{th}$ th bleeder control signal changes from indicating that the bleeder current is allowed to be generated to indicating that the bleeder current is not allowed to be generated, change the $N^{th}$ bleeder control signal after the $N^{th}$ predetermined delay.

5. The system of claim 4 wherein:

the current controller includes N switches, N amplifiers, a resistor, and a capacitor, the N switches and the N amplifiers corresponding to N reference voltages;

the N switches include a $1^{st}$ switch, an $n^{th}$ switch, and an $N^{th}$ switch;

the N amplifiers include a $1^{st}$ amplifier, an $n^{th}$ amplifier, and an $N^{th}$ amplifier; and the N reference voltages include a $1^{st}$ reference voltage, an $n^{th}$ reference voltage, and an $N^{th}$ reference voltage;

wherein:

the $1^{st}$ amplifier includes a $1^{st}$ amplifier positive input terminal, a $1^{st}$ amplifier negative input terminal, and a $1^{st}$ amplifier output terminal, the $1^{st}$ amplifier negative input terminal being connected to the $1^{st}$ amplifier output terminal, the $1^{st}$ amplifier positive input amplifier being biased to the $1^{st}$ reference voltage;

the $n^{th}$ amplifier includes an $n^{th}$ amplifier positive input terminal, an $n^{th}$ amplifier negative input terminal, and an $n^{th}$ amplifier output terminal, the $n^{th}$ amplifier negative input terminal being connected to the $n^{th}$ amplifier output terminal; and the $N^{th}$ amplifier includes an $N^{th}$ amplifier positive input terminal, an $N^{th}$ amplifier negative input terminal, and an $N^{th}$ amplifier output terminal, the $N^{th}$ amplifier negative input terminal being connected to the $N^{th}$ amplifier output terminal;

wherein:

the capacitor includes a first capacitor terminal and a second capacitor terminal, the first capacitor terminal being configured to provide the input voltage, the second capacitor terminal being biased to a ground voltage; and the resistor includes a first resistor terminal and a second resistor terminal, the second resistor terminal being connected to a $2^{nd}$ amplifier output terminal;

wherein the $1^{st}$ switch is configured to:

receive the $1^{st}$ bleeder control signal; and based at least in part on the $1^{st}$ bleeder control signal, connect the first capacitor terminal to the $1^{st}$ amplifier output terminal or to the first resistor terminal;

wherein the $1^{st}$ switch is further configured to:

if the $1^{st}$ bleeder control signal indicates that the bleeder current is allowed to be generated, connect the first capacitor terminal to the $1^{st}$ amplifier output terminal; and if the $1^{st}$ bleeder control signal indicates that the bleeder current is not allowed to be generated, connect the first capacitor terminal to the first resistor terminal so that the first capacitor terminal is connected to the $2^{nd}$ amplifier output terminal through the resistor;

wherein the $n^{th}$ switch is configured to:

receive the $n^{th}$ bleeder control signal; and based at least in part on the $n^{th}$ bleeder control signal, connect the $n^{th}$ amplifier positive input terminal to the $n^{th}$ reference voltage or to an $(n+1)^{th}$ amplifier output terminal;

wherein the $n^{th}$ switch is further configured to:

if the $n^{th}$ bleeder control signal indicates that the bleeder current is allowed to be generated, connect the $n^{th}$ amplifier positive input terminal to the $n^{th}$ reference voltage; and if the $n^{th}$ bleeder control signal indicates that the bleeder current is not allowed to be generated, connect the $n^{th}$ amplifier positive input terminal to the $(n+1)^{th}$ amplifier output terminal;

wherein the $N^{th}$ switch is configured to:

receive the $N^{th}$ bleeder control signal; and based at least in part on the $N^{th}$ bleeder control signal, connect the $N^{th}$ amplifier positive input terminal to the $N^{th}$ reference voltage or to the ground voltage;

wherein the $N^{th}$ switch is further configured to:

if the $N^{th}$ bleeder control signal indicates that the bleeder current is allowed to be generated, connect the $N^{th}$ amplifier positive input terminal to the $N^{th}$ reference voltage; and if the $N^{th}$ bleeder control signal indicates that bleeder current is not allowed to be generated, connect the $N^{th}$ amplifier positive input terminal to the ground voltage;

wherein:

an $(n+1)^{th}$ reference voltage is larger than the $n^{th}$ reference voltage;

the $n^{th}$ reference voltage is larger than an $(n+1)^{th}$ reference voltage; and the $N^{th}$ reference voltage is larger than zero.

6. The system of claim 4 wherein:

the bleeder controller further includes N delayed-signal generators, the N delayed-signal generators corresponding to the N predetermined delays; and the N delayed-signal generators include a $1^{st}$ delayed-signal generator, an $n^{th}$ delayed-signal generator, and an $N^{th}$ delayed-signal generator, the $1^{st}$ delayed-signal generator being the first delayed-signal generator;

wherein the first delayed-signal generator is further configured to, if the comparison signal indicates that the sensing signal becomes larger than the threshold voltage, change the first bleeder control signal after the first predetermined delay;

wherein the $n^{th}$ delayed-signal generator is configured to:

receive the $(n-1)^{th}$ bleeder control signal;

generate the $n^{th}$ bleeder control signal based at least in part on the $(n-1)^{th}$ bleeder control signal; and if the $(n-1)^{th}$ bleeder control signal indicates that the sensing signal becomes larger than the threshold voltage, change the $n^{th}$ bleeder control signal after the $n^{th}$ predetermined delay;

wherein the $N^{th}$ delayed-signal generator is configured to:

receive the $(N-1)^{th}$ bleeder control signal;

generate the $N^{th}$ bleeder control signal based at least in part on the $(N-1)^{th}$ bleeder control signal; and if the $(N-1)^{th}$ bleeder control signal indicates that the sensing signal becomes larger than the threshold voltage, change the $N^{th}$ bleeder control signal after the $N^{th}$ predetermined delay.

7. The system of claim 3, further comprising:

a current regulator configured to receive the diode current and generate the sensing signal;

wherein:

the current regulator includes an amplifier, a transistor, and a resistor;

the transistor includes a gate terminal, a drain terminal, and a source terminal;

the amplifier includes an amplifier positive input terminal, an amplifier negative input terminal, and an amplifier output terminal; and the resistor includes a first resistor terminal and a second resistor terminal;

wherein:

the gate terminal is coupled to the amplifier output terminal;

the drain terminal is coupled to the one or more light emitting diodes;

the source terminal is coupled to the first resistor terminal;

the amplifier positive input terminal is biased to a reference voltage;

the amplifier negative input terminal is coupled to the source terminal; and the second resistor terminal is biased to a ground voltage.

8. The system of claim 1 wherein:

the current generator includes an amplifier, a transistor, and a resistor;

the transistor includes a gate terminal, a drain terminal, and a source terminal;

the amplifier includes an amplifier positive input terminal, an amplifier negative input terminal, and an amplifier output terminal; and the resistor includes a first resistor terminal and a second resistor terminal;

wherein:

the gate terminal is coupled to the amplifier output terminal;

the drain terminal is biased to the rectified voltage associated with the TRIAC dimmer;

the source terminal is coupled to the first resistor terminal;

the second resistor terminal is biased to a ground voltage;

the amplifier negative input terminal is coupled to the source terminal; and the amplifier positive input terminal is configured to receive the input voltage.

9. A system for controlling one or more light emitting diodes, the system comprising:

a voltage divider configured to receive a rectified voltage associated with a TRIAC dimmer, the voltage divider being configured to generate a converted voltage proportional to the rectified voltage; and a bleeder configured to receive a first bleeder control signal and the rectified voltage, the first bleeder control signal indicating whether a bleeder current is allowed or not allowed to be generated;

wherein:

the bleeder includes a current controller and a current generator;

the current controller is configured to receive the first bleeder control signal and generate an input voltage based at least in part on the first bleeder control signal; and the current generator is configured to receive the rectified voltage and the input voltage and generate the bleeder current based at least in part on the input voltage;

wherein, if the first bleeder control signal indicates that the bleeder current is not allowed to be generated, the current controller is configured to gradually reduce the input voltage from a first voltage magnitude at a first time to a second voltage magnitude at a second time; and the current generator is configured to gradually reduce the bleeder current from a first current magnitude at the first time to a second current magnitude at the second time;

wherein the second time follows the first time by a duration of time.

10. The system of claim 9, further comprising:

a bleeder controller configured to receive a sensing signal associated with a diode current flowing through the one or more light emitting diodes and generate the first bleeder control signal based at least in part on the sensing signal, the bleeder controller including a conduction phase detector;

wherein:

the bleeder controller is configured to:

determine a phase range within which the TRIAC dimmer is in a conduction state based on at least information associated with the converted voltage; and generate a detection signal by comparing the phase range within which the TRIAC dimmer is in the conduction state and a predetermined conduction phase threshold; and the bleeder controller is further configured to:

if the phase range within which the TRIAC dimmer is in the conduction state is determined to be larger than the predetermined conduction phase threshold, generate the first bleeder control signal based at least in part on the sensing signal; and if the phase range within which the TRIAC dimmer is in the conduction state is determined to be smaller than the predetermined conduction phase threshold, generate the first bleeder control signal based at least in part on the converted voltage.

11. The system of claim 10 wherein:

the bleeder controller further includes a first comparator, a second comparator, a switch, and a first delayed-signal generator;

wherein:

the first comparator is configured to receive the converted voltage and a first threshold voltage and generate a first comparison signal based at least in part on the converted voltage and the first threshold voltage; and the second comparator is configured to receive the sensing signal and a second threshold voltage and generate a second comparison signal based at least in part on the sensing signal and the second threshold voltage;

wherein the conduction phase detector is further configured to:

receive the first comparison signal; and generate the detection signal based at least in part on the first comparison signal;

wherein the switch is configured to receive the detection signal;

wherein, if the phase range within which the TRIAC dimmer is in the conduction state is determined to be smaller than the predetermined conduction phase threshold:

the switch is configured to output the first comparison signal to the first delayed-signal generator; and if the first comparison signal indicates that the converted voltage becomes larger than the first threshold voltage, change the first bleeder control signal from a first logic level to a second logic level after a first predetermined delay;

wherein, if the phase range within which the TRIAC dimmer is in the conduction state is determined to be larger than the predetermined conduction phase threshold:

the switch is configured to output the second comparison signal to the first delayed-signal generator; and if the second comparison signal indicates that the sensing signal becomes larger than the second threshold voltage, change the first bleeder control signal from the first logic level to the second logic level after the first predetermined delay;

wherein:

the first predetermined delay is larger than zero in magnitude;

the first logic level indicates that the bleeder current is allowed to be generated; and the second logic level indicates that the bleeder current is not allowed to be generated.

12. The system of claim 11 wherein:

the conduction phase detector includes a duration determination device and a phase detection device;

wherein:

the duration determination device is configured to receive the first comparison signal, determine a time duration during which the first comparison signal indicates the converted voltage is smaller than the first threshold voltage, and output a timing signal representing the time duration; and the phase detection device is configured to receive the timing signal representing the time duration, compare the time duration and a duration threshold, and generate the detection signal based at least in part on the time duration and the duration threshold, the detection signal indicating whether the time duration is larger than the duration threshold;

wherein:

if the detection signal indicates that the time duration is larger than the duration threshold, the phase range within which the TRIAC dimmer is in the conduction state is determined to be smaller than the predetermined conduction phase threshold; and if the detection signal indicates that the time duration is smaller than the duration threshold, the phase range within which the TRIAC dimmer is in the conduction state is determined to be larger than the predetermined conduction phase threshold.

13. The system of claim 11 wherein:

the bleeder controller is configured to generate N bleeder control signals corresponding to N predetermined delays respectively, N being an integer larger than 1;

wherein:

the N bleeder control signals include a $1^{st}$ bleeder control signal, an $n^{th}$ bleeder control signal, and an $N^{th}$ bleeder control signal, n being an integer larger than 1 but smaller than N; and the N predetermined delays include a $1^{st}$ predetermined delay, an $n^{th}$ predetermined delay, and an $N^{th}$ predetermined delay, each predetermined delay of the N predetermined delays being larger than zero in magnitude;

wherein:

the $1^{st}$ bleeder control signal is the first bleeder control signal; and the $1^{st}$ predetermined delay is the first predetermined delay;

wherein the bleeder controller is further configured to:

if an $(n-1)^{th}$ bleeder control signal changes from indicating that the bleeder current is allowed to be generated to indicating that the bleeder current is not allowed to be generated, change the $n^{th}$ bleeder control signal after the $n^{th}$ predetermined delay; and if an $(N-1)^{th}$ bleeder control signal changes from indicating that the bleeder current is allowed to be generated to indicating that the bleeder current is not allowed to be generated, change the $N^{th}$ bleeder control signal after the $N^{th}$ predetermined delay.

14. The system of claim 13 wherein:

the bleeder controller further includes N delayed-signal generators; and the N delayed-signal generators include a $1^{st}$ delayed-signal generator, an $n^{th}$ delayed-signal generator, and an $N^{th}$ delayed-signal generator;

wherein the $1^{st}$ delayed-signal generator is the first delayed-signal generator.

15. A system for controlling one or more light emitting diodes, the system comprising:

a voltage divider configured to receive a rectified voltage associated with a TRIAC dimmer, the voltage divider being configured to generate a converted voltage proportional to the rectified voltage; and a bleeder controller configured to receive the converted voltage and a sensing signal associated with a diode current flowing through the one or more light emitting diodes, the bleeder controller being configured to generate a first bleeder control signal based at least in part on the converted voltage, the first bleeder control signal indicating whether a bleeder current is allowed or not allowed to be generated;

wherein the bleeder controller is configured to:

determine a phase range within which the TRIAC dimmer is in a conduction state based on at least information associated with the converted voltage; and generate a detection signal by comparing a predetermined conduction phase threshold and the phase range within which the TRIAC dimmer is in the conduction state;

wherein the bleeder controller is further configured to:

if the detection signal indicates that the phase range within which the TRIAC dimmer is in the conduction state is larger than the predetermined conduction phase threshold, generate the first bleeder control signal based at least in part on the sensing signal; and if the detection signal indicates that the phase range within which the TRIAC dimmer is in the conduction state is determined to be smaller than the predetermined conduction phase threshold, generate the first bleeder control signal based at least in part on the converted voltage.

16. The system of claim 15 wherein:

the bleeder controller further includes a delayed-signal generator;

wherein:

the delayed-signal generator is configured to change the first bleeder control signal from a first logic level to a second logic level after a predetermined delay, the predetermined delay being larger than zero in magnitude;

the first logic level indicates that the bleeder current is allowed to be generated; and the second logic level indicates that the bleeder current is not allowed to be generated.

17. The system of claim 15, further comprising:

a bleeder configured to receive the first bleeder control signal and the rectified voltage;

wherein:

if the first bleeder control signal indicates that the bleeder current is not allowed to be generated, the bleeder is configured to gradually reduce the bleeder current from a first current magnitude at a first time to a second current magnitude at a second time;

wherein the second time follows the first time by a duration of time;

wherein:

the bleeder controller further includes N delayed-signal generators, the N delayed-signal generators being configured to generate N bleeder control signals corresponding to N predetermined delays respectively, N being an integer larger than 1; and the bleeder is further configured to receive the N bleeder control signals;

wherein:

the N delayed-signal generators include a $1^{st}$ delayed-signal generator, an $n^{th}$ delayed-signal generator, and an $N^{th}$ delayed-signal generator, n being an integer larger than 1 but smaller than N;

the N bleeder control signals include a $1^{st}$ bleeder control signal, an $n^{th}$ bleeder control signal, and an $N^{th}$ bleeder control signal, the $1^{st}$ bleeder control signal being the first bleeder control signal; and the N predetermined delays include a $1^{st}$ predetermined delay, an $n^{th}$ predetermined delay, and an $N^{th}$ predetermined delay, each predetermined delay of the N predetermined delays being larger than zero in magnitude;

wherein the $n^{th}$ delayed-signal generator is configured to receive an $(n-1)^{th}$ bleeder control signal and change the $n^{th}$ bleeder control signal after the $n^{th}$ predetermined delay if the $(n-1)^{th}$ bleeder control signal indicates a change from the bleeder current being allowed to be generated to the bleeder current not being allowed to be generated;

wherein, the bleeder is further configured to, if the bleeder current changes from being allowed to be generated to not being allowed to be generated, reduce the bleeder current from a $1^{st}$ predetermined magnitude to a $2^{nd}$ predetermined magnitude during a predetermined duration of time in response to at least a change of the $1^{st}$ bleeder control signal;

reduce the bleeder current from an $n^{th}$ predetermined magnitude to an $(n+1)^{th}$ predetermined magnitude during the predetermined duration of time in response to at least a change of the $n^{th}$ bleeder control signal; and reduce the bleeder current from an $N^{th}$ predetermined magnitude to zero during the predetermined duration of time in response to at least a change of the $N^{th}$ bleeder control signal;

wherein:

the $(n-1)^{th}$ predetermined magnitude is larger than the $n^{th}$ predetermined magnitude;

the $n^{th}$ predetermined magnitude is larger than the $(n+1)^{th}$ predetermined magnitude; and the $N^{th}$ predetermined magnitude is larger than zero.

18. A method for controlling one or more light emitting diodes, the method comprising:

receiving a first bleeder control signal, the first bleeder control signal indicating whether a bleeder current is allowed or not allowed to be generated;

generating an input voltage based at least in part on the first bleeder control signal;

receiving the input voltage and a rectified voltage associated with a TRIAC dimmer; and generating the bleeder current based at least in part on the input voltage;

wherein:

the generating an input voltage based at least in part on the first bleeder control signal includes, if the first bleeder control signal indicates that the bleeder current is not allowed to be generated, gradually reducing the input voltage from a first voltage magnitude at a first time to a second voltage magnitude at a second time; and the generating the bleeder current based at least in part on the input voltage includes, if the first bleeder control signal indicates that the bleeder current is not allowed to be generated, gradually reducing the bleeder current from a first current magnitude at the first time to a second current magnitude at the second time;

wherein the second time follows the first time by a duration of time.

19. A method for controlling one or more light emitting diodes, the method comprising:

receiving a rectified voltage associated with a TRIAC dimmer;

generating a converted voltage proportional to the rectified voltage;

outputting the converted voltage;

receiving a first bleeder control signal that is generated based at least in part on the converted voltage, the first bleeder control signal indicating whether a bleeder current is allowed or not allowed to be generated;

generating an input voltage based at least in part on the first bleeder control signal;

receiving the input voltage and the rectified voltage; and generating the bleeder current based at least in part on the input voltage;

wherein:

the generating an input voltage based at least in part on the first bleeder control signal includes, if the first bleeder control signal indicates that the bleeder current is not allowed to be generated, gradually reducing the input voltage from a first voltage magnitude at a first time to a second voltage magnitude at a second time; and the generating the bleeder current based at least in part on the input voltage includes, if the first bleeder control signal indicates that the bleeder current is not allowed to be generated, gradually reducing the bleeder current from a first current magnitude at the first time to a second current magnitude at the second time;

wherein the second time follows the first time by a duration of time.

20. A method for controlling one or more light emitting diodes, the method comprising:

receiving a rectified voltage associated with a TRIAC dimmer;

generating a converted voltage proportional to the rectified voltage;

outputting the converted voltage;

receiving the converted voltage and a sensing signal associated with a diode current flowing through the one or more light emitting diodes;

generating a first bleeder control signal based at least in part on the converted voltage, the first bleeder control signal indicating whether a bleeder current is allowed or not allowed to be generated; and outputting the first bleeder control signal;

wherein the generating a first bleeder control signal based at least in part on the converted voltage includes:

determining a phase range within which the TRIAC dimmer is in a conduction state based on at least information associated with the converted voltage;

generating a detection signal by comparing a predetermined conduction phase threshold and the phase range within which the TRIAC dimmer is in the conduction state;

if the detection signal indicates that the phase range within which the TRIAC dimmer is in the conduction state is larger than the predetermined conduction phase threshold, generating the first bleeder control signal based at least in part on the sensing signal; and if the detection signal indicates that the phase range within which the TRIAC dimmer is in the conduction state is smaller than the predetermined conduction phase threshold, generating the first bleeder control signal based at least in part on the converted voltage.

* * * * *